United States Patent
Takahashi et al.

[11] Patent Number: 6,042,212
[45] Date of Patent: Mar. 28, 2000

[54] INK-JET RECORDING APPARATUS AND METHOD USING ASYNCHRONOUS MASKS

[75] Inventors: Kiichiro Takahashi, Kawasaki; Naoji Otsuka, Yokohama; Kazuhiro Nakata, Tokyo; Atsushi Arai, Kawasaki; Kentaro Yano, Yokohama; Osamu Iwasaki, Tokyo; Daigoro Kanematsu, Yokohama; Masao Sasaki, Kawasaki, all of Japan

[73] Assignee: Canon Kabushiki Kaisha, Tokyo, Japan

[21] Appl. No.: 09/104,283

[22] Filed: Jun. 25, 1998

Related U.S. Application Data

[62] Division of application No. 08/266,498, Jun. 27, 1994, Pat. No. 5,818,474.

[30] Foreign Application Priority Data

| Jun. 30, 1993 | [JP] | Japan | 5-161955 |
| Jun. 30, 1993 | [JP] | Japan | 5-162249 |
| Jun. 30, 1993 | [JP] | Japan | 5-162251 |
| Jun. 30, 1993 | [JP] | Japan | 5-162550 |

[51] Int. Cl.$^7$ .............................. B41J 2/205; B41J 2/21
[52] U.S. Cl. .................................. 347/15; 347/43
[58] Field of Search ................. 347/15, 9, 12, 347/13, 41, 43, 115, 172, 232; 358/456, 457; 395/109

[56] References Cited

U.S. PATENT DOCUMENTS

| 4,313,124 | 1/1982 | Hara | 347/57 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/65 |
| 4,608,577 | 8/1986 | Hori | 347/66 |
| 4,622,561 | 11/1986 | Koike | 347/41 |
| 4,723,129 | 2/1988 | Endo et al. | 347/56 |
| 4,740,796 | 4/1988 | Endo et al. | 347/56 |
| 5,111,310 | 5/1992 | Parker et al. | 358/456 |
| 5,233,366 | 8/1993 | Stephany | 347/15 |
| 5,477,246 | 12/1995 | Hirabayashi et al. | 347/12 |
| 5,594,478 | 1/1997 | Matsubara et al. | 347/41 |
| 5,831,642 | 11/1998 | Matsubara et al. | 347/9 |

FOREIGN PATENT DOCUMENTS

| 0546853 | 6/1993 | European Pat. Off. |
| 54-056847 | 5/1979 | Japan |
| 59-123670 | 7/1984 | Japan |
| 59-138461 | 8/1984 | Japan |
| 60-071260 | 4/1985 | Japan |
| 60-107975 | 6/1985 | Japan |

OTHER PUBLICATIONS

L. Smith, "Halftone Image Produced by Pseudo–Random Bit Generator", *IBM Technical Disclosure Bulletin*, vol. 17, No. 7, pp. 1858–1859, Dec. 1974.

*Primary Examiner*—Matthew S. Smith
*Assistant Examiner*—Hoan Tran
*Attorney, Agent, or Firm*—Fitzpatrick, Cella, Harper & Scinto

[57] ABSTRACT

Random masks each having a given size and defining a random array of non-record pixel locations and record pixel locations are placed in association with record areas in mask registers. Using the placed masks, record data is thinned-out and supplied to a recording head. An image is then recorded. Thus, since thinning-out masks do not have periodicity, any inherent density nonuniformity loses periodicity. Consequently, high-definition images can be produced.

29 Claims, 52 Drawing Sheets

FIG. 11-c
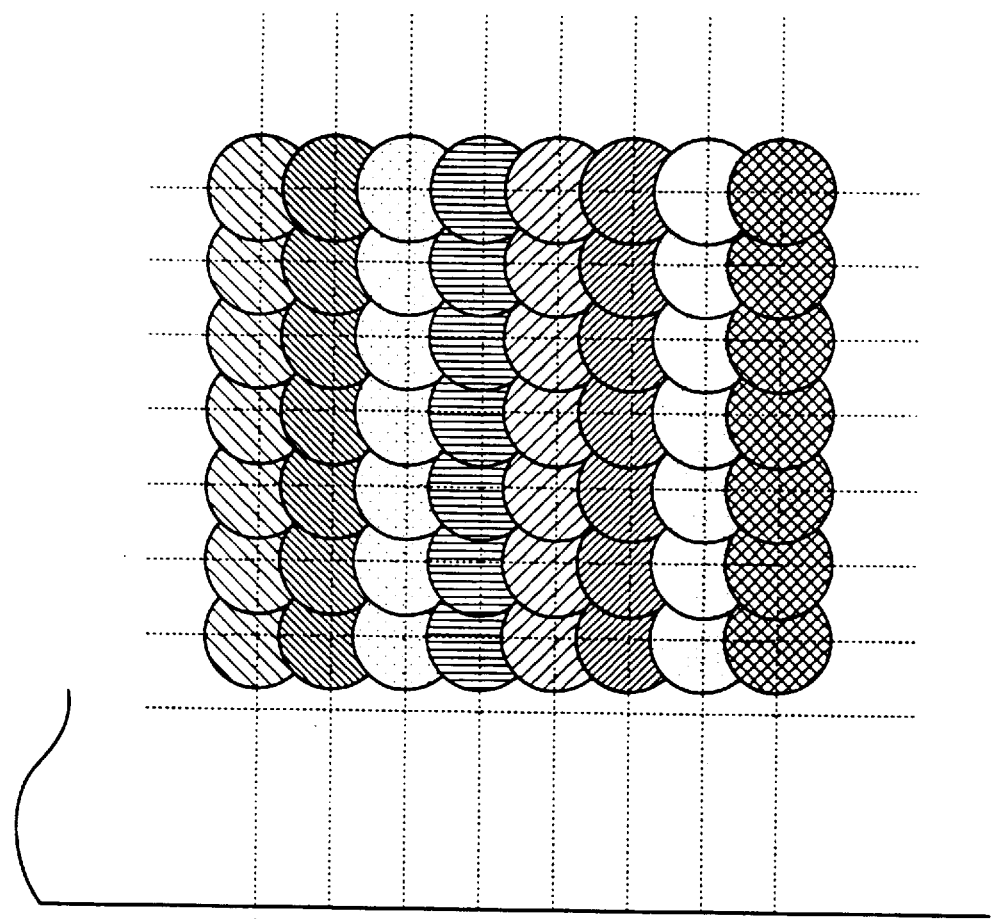
FIG. 11-b
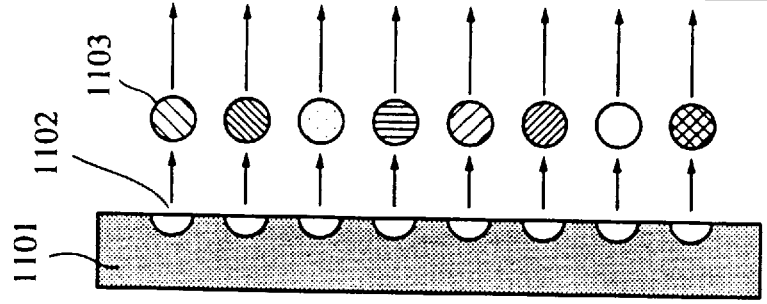
FIG. 11-a

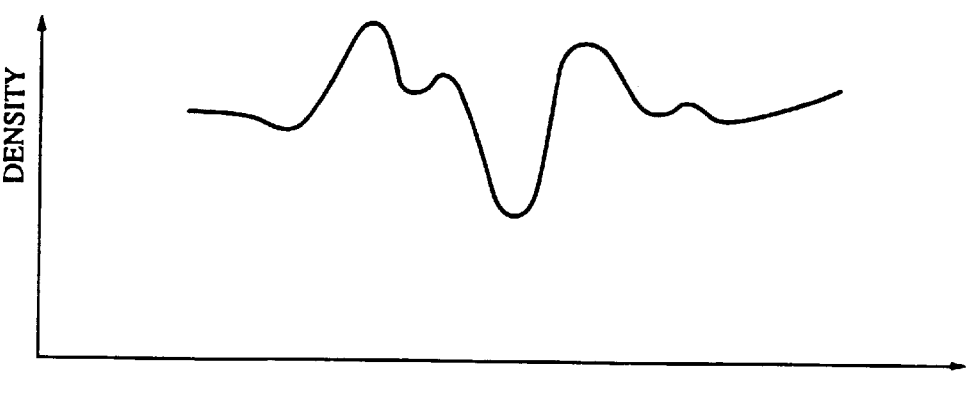
FIG. 12-c
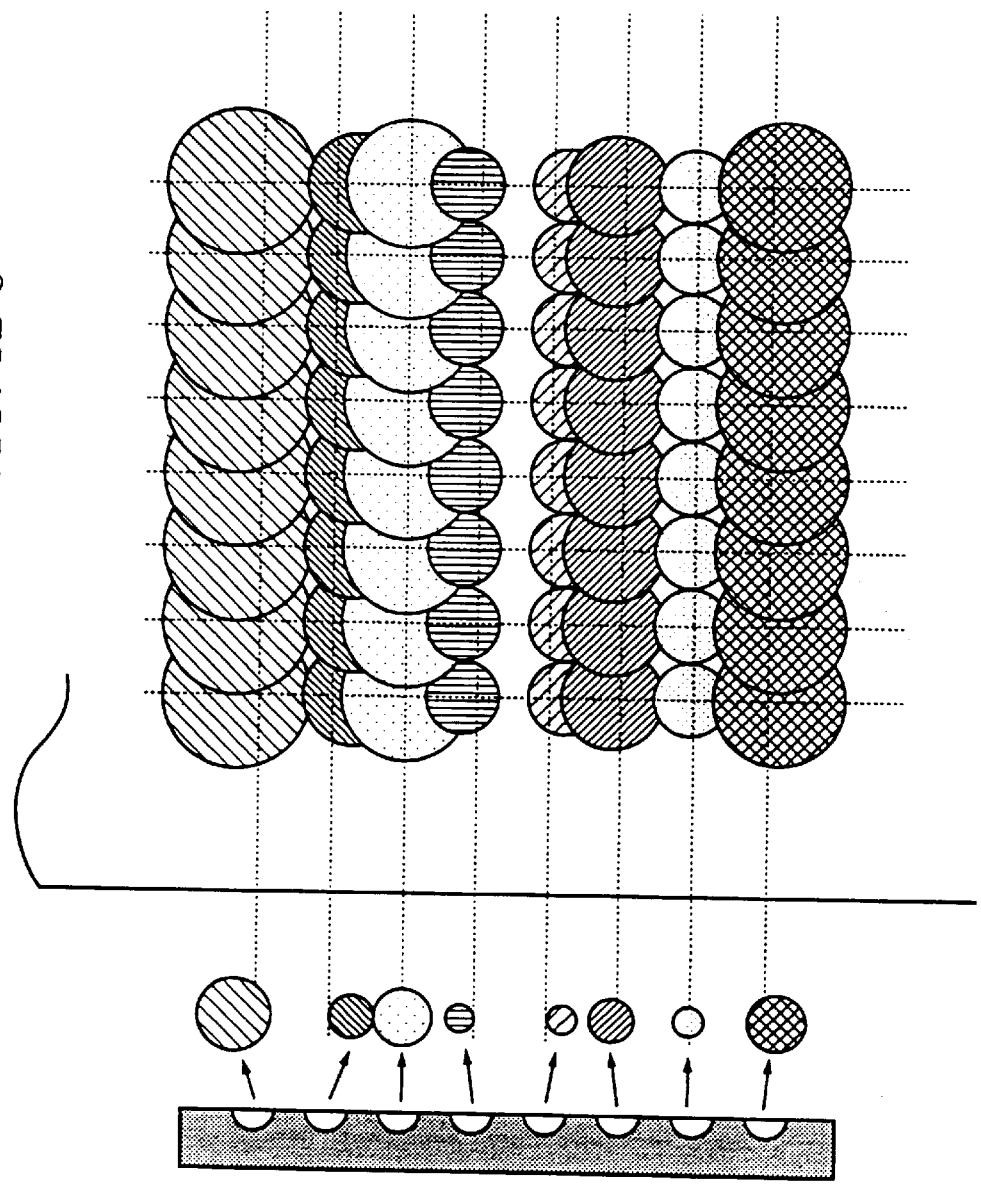
PRIOR ART
FIG. 12-b
FIG. 12-a

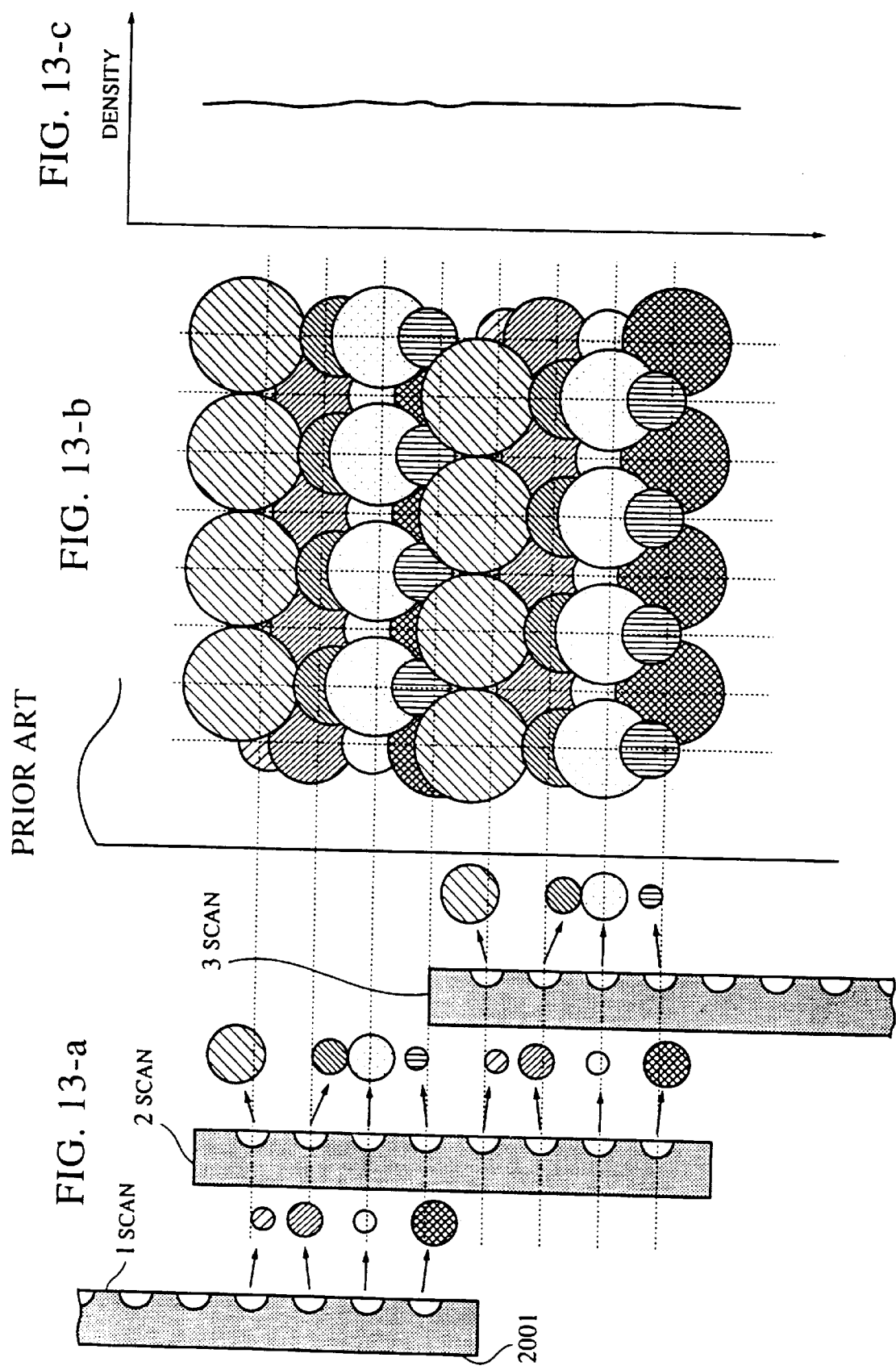

PRIOR ART
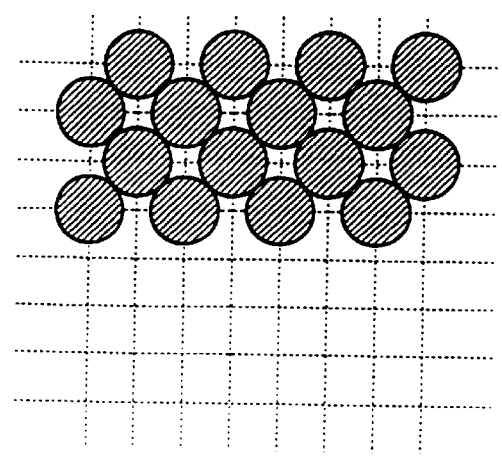
FIG. 14-a
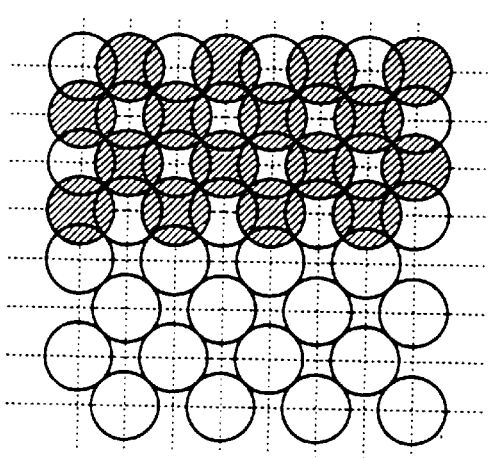
FIG. 14-b
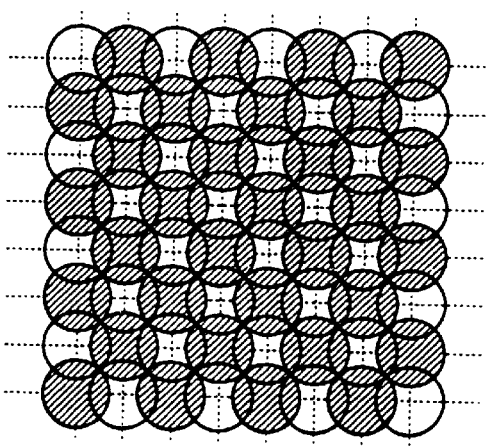
FIG. 14-c
⊘ CHECKER PATTERN
○ INVERSE-CHECKER PATTERN

FIG. 38

CYCLE 1 : A→B→C→D→E→F→G

| MASK | A | B | C | D | E | F | G |
|---|---|---|---|---|---|---|---|
| FIRST CYCLE | ○ | ○ | ○ | ○ | ○ | ○ | ○ |

CYCLE 2 : A→C→E→G→B→D→F

| MASK | A | B | C | D | E | F | G |
|---|---|---|---|---|---|---|---|
| FIRST CYCLE | ○ | | ○ | | ○ | | ○ |
| SECOND CYCLE | | ○ | | ○ | | ○ | |

CYCLE 3 : A→D→G→C→F→B→E

| MASK | A | B | C | D | E | F | G |
|---|---|---|---|---|---|---|---|
| FIRST CYCLE | ○ | | | ○ | | | ○ |
| SECOND CYCLE | | | ○ | | | ○ | |
| THIRD CYCLE | | ○ | | | ○ | | |

CYCLE 4 : A→E→B→F→C→G→D

| MASK | A | B | C | D | E | F | G |
|---|---|---|---|---|---|---|---|
| FIRST CYCLE | ○ | | | | ○ | | |
| SECOND CYCLE | | ○ | | | | ○ | |
| THIRD CYCLE | | | ○ | | | | ○ |
| FOURTH CYCLE | | | | ○ | | | |

FIG. 50

| AMBIENT TEMPERATURE | CORRECTION COEFFICIENT OF QUANTITY OF DISCHARGED INK |
|---|---|
| ~ 10% | 100% |
| ~ 20% | 98% |
| ~ 40% | 95% |
| ~ 60% | 90% |
| ~ 80% | 85% |
| 90% ~ | 70% |

FIG. 51

| TYPE OF RECORDING MEDIUM | CORRECTION COEFFICIENT OF QUANTITY OF DISCHARGED INK |
|---|---|
| A (EXCELLENT FUSIBILITY) | 100% |
| B | 95% |
| C | 90% |
| D (POOR FUSIBILITY) | 80% | ns as shown in the center of FIG. 12-b. Thus-printed dots result in the density distribution shown in FIG. 12-c along the nozzle array. As a result, these phenomena are perceived as nonuniformity of density by normal human eyes.

INK-JET RECORDING APPARATUS AND METHOD USING ASYNCHRONOUS MASKS

This application is a division of U.S. application Ser. No. 08/266,498 filed Jun. 27, 1994, now U.S. Pat. No. 5,818,474.

BACKGROUND OF THE INVENTION

1. Field of the Invention

The present invention relates to a recording apparatus and method, or more particularly, to an ink-jet recording apparatus and method for recording by discharging ink from a recording head.

2. Description of the Related Art

Recording apparatuses such as printers, copying machines, and facsimile machines are designed to record images formed with dot patterns on recording materials such as paper or plastic film according to image information.

When the recording apparatuses are classified in terms of recording modes, they are of an ink-jet type, a wire-dot type, a thermal type, and a laser beam type. The ink-jet type (ink-jet recording apparatus) is designed to effect recording by discharging ink (recording agent) droplets through ink-jet outlets in a recording head and fusing the ink droplets onto a recording member.

In recent years, numerous recording apparatuses have been put to use. These recording apparatuses are being demanded to offer high recording speeds, high resolution, high image quality, and low noise. The ink-jet recording apparatus is a recording apparatus capable of meeting these demands. The ink-jet recording apparatus effects recording by discharging ink from a recording head. Stabilization of ink discharging and quantity (volume) of discharged ink is therefore essential to satisfy the above demands.

The ink-jet recording apparatus has a facility for stabilizing ink discharging. Nevertheless, definition in recorded images depends largely on the performance of an individual recording head. A very small difference of a recording head from others occurring in the process of manufacturing recording heads; such as, a difference in the shape of each ink-discharging outlet (port, orifice) of a recording head or a difference in performance of an electro-thermal converter (discharge heater) affects a quantity of discharged ink or a discharge direction. Consequently, nonuniformity of density occurs in a finalized image, thus deteriorating image definition.

An example of the foregoing problem will be described in conjunction with FIGS. 11-a–11-c and 12-a–12-c. In FIG. 11-a, 1101 denotes a multiple-nozzle recording head or multi-head. For simple illustration, the multi-head shall include eight nozzles 1102. Reference numeral 1103 denotes ink droplets discharged by the multiple nozzles 1102. Normally, it is ideal that ink is discharged with equal quantities of discharged ink in the same direction. If this ink discharging is carried out, as shown in FIG. 11-b, dots of the same size are printed on paper to produce a uniform image unaffected with nonuniformity of density (11-c).

In practice, however, as described previously, nozzles differ from one another. If printing is executed as described above with the nozzles left unchanged, as shown in FIG. 12-a, sizes and orientations of ink droplets discharged by the nozzles differ from one another. The ink droplets are shot at paper as shown in FIG. 12-b. As illustrated, a blank space appears at regular intervals in a main scanning direction of a recording head because ink does not occupy a pixel 100%. Otherwise, dots overlap enormously, or a white band (stripe)

A method described in, for example, Japanese Patent Laid-Open No. 60-107975 has been devised as a solution of the nonuniformity of density. The method will be described in conjunction with FIGS. 13-a–13-c and 14-a–14-c. According to the method, a multi-head 2001 is scanned three times in order to furnish a print area shown in FIGS. 11-b and 12-b. A unit-area of four pixels is furnished by making two passes. Eight nozzles of the multi-head are grouped into four upper nozzles and four lower nozzles. A dot printed by one nozzle during one scan is based on defined image data that has been thinned out according to a certain image data array so as to be about half in amount. Another dot is then printed based on the remaining half of the image data during the second scan. Thus, printing is completed for the unit area of four pixels. The foregoing recording method is referred to as a multi-pass recording method.

When the multi-pass recording method is adopted, even if a multi-head similar to that shown in FIG. 12-a is employed, since influences inherent to the nozzles upon a print image are halved, a printed image appears as shown in FIG. 13-b. A black stripe and a white stripe shown in FIG. 12-b become inconspicuous. The nonuniformity of density shown in FIG. 12-c is considerably alleviated as shown in FIG. 13-c.

When the above recording is carried out, image data is grouped into two complementary portions to be assigned to the first and second scans according to a predetermined array. The image data array (thinning-out pattern) is usually, as shown in FIG. 14-a, a checker pattern in which image data is allocated to every other pixel location lengthwise and sideways.

Printing of a unit print area (of four pixels deep) is therefore completed by performing the first scan during which a checker pattern is printed and the second scan during which an inverse-checker pattern is printed.

Electric control for the foregoing thinned-out printing is illustrated in FIGS. 15 and 16. When print data Si is placed in an 8-bit shift register in response to a print data synchronizing clock CLK and then signals BEI1*, BEI2*, BEI3*, and BEI4* are turned on, in a head unit 28 a transistor array 26 is driven so that a heater 27 generates heat. Thus, printing is effected. Herein, the asterisk * indicates that the signal is low active. A signal LATCH* is a control signal for latching print data. A signal CARESI* is a reset signal for clearing a latch 25. Every heating is initiated with a Heat Trigger signal. A pulse generator 23 outputs the signals BEI1*, BEI2*, BEI3*, and BEI4*. These signals may sometimes be output with time lags between adjoining ones. Herein, they are supposed to be output simultaneously.

For thinning out, a flip-flop 22 shown in FIG. 15 is triggered with the Heat Trigger signal so that signals (for example, the signals BEI1* and BEI3*) to be masked are alternately changed at every heating. In reality, the signals to be masked are changed when an output signal DATA ENB of the flip-flop 22 is driven high or low according to a timing chart shown in FIG. 16. With the Heat Trigger signal, the signals BEI1*, BEI2*, BEI3*, and BEI4* are driven low. Respective nozzles are heated. Dotted lines in FIG. 16 indicate masking durations which occur in line with the cycle time of the signal DATAENB. Signals EVEN and ODD are used for initialization of a mask. When printing is to be performed using a checker-pattern mask, the signal EVEN is fed prior to printing of one line. The flip-flop 22 is then pre-set, whereby printing based on a checker-pattern mask is enabled. For a line on which printing is to be performed using an inverse-checker pattern mask, the signal ODD is fed to pre-set the flip-flop 22. The signals BEI2* and BEI4* are turned on earlier, whereby printing based on an inverse-checker pattern mask is enabled.

FIGS. 14-*a*, 14-*b*, and 14-*c* show how recording of a certain area is completed by applying checker-pattern and inverse-checker pattern masks using a multi-head having eight nozzles as that shown in FIG. 13-*a*. First, during the first scan, four lower nozzles are used to create a checker pattern (hatched circles) (FIG. 14-*a*). Next, during the second scan, paper is fed by a quantity correspondent with a depth of four pixels (half of a head length). An inverse-checker pattern (white circles) is then created (FIG. 14-*b*). During the third scan, the paper is fed by a quantity correspondent with a depth of four pixels (half of the head length) again. A checker pattern is then created (FIG. 14-*c*).

As mentioned above, paper feed is performed in units of four pixels, and checker-pattern and inverse-checker pattern masks are used alternately. A record area of four pixels deep is thus produced with each scan. As described above, two types of nozzles are used for the same area in order to complete printing of the area. This results in a high-quality image unaffected with density nonuniformity. However, even when the foregoing multi-pass recording is adopted, the density nonuniformity may not be eliminated depending on a duty ratio. Especially in half-tone recording, new density nonuniformity may be identified. The phenomenon will be described below.

In general, image data to be recorded in a certain area and received by a printer is regularly formatted as an array. A recording apparatus stocks or stores a certain amount of data in buffers, and applies a new mask having the aforesaid checker or inverse checker pattern (image array pattern) to the data. When the associated pixel locations in the data and mask are turned on, the associated pixels are printed.

FIGS. 17 to 19 explain the above recording procedure. In FIG. 17, 1710 denotes data having been arrayed and placed in a buffer. Reference numeral 1720 denotes a checker-pattern mask indicating locations of pixels allowed to be printed during the first pass. Numeral 1730 denotes an inverse-checker pattern mask indicating locations of pixels allowed to be printed during the second pass. Numerals 1740 and 1750 are illustrations showing pixels to be printed during the first and second passes respectively.

In FIG. 17, arrayed data is stocked in a buffer for 25% of a certain area. The data is usually such print data that is scattered to the greatest extent in an effort to keep the density in the certain area uniform. The fashion of arraying image data depends on what kind of area gray scale is employed for image data processing to be performed before the image data is transferred to a printer. Numeral 1710 denotes a example of an data array of 25% image data. When the data is printed by applying the masks 1720 and 1730, pixels representing exact halves of the original data are recorded as shown in the illustrations 1740 and 1750 after the first and second passes respectively.

However, as shown in FIG. 18, when 50% image data comes in, it is quite probable that data 1810 dispersed to the greatest extent may be consistent with a checker pattern mask 1820 or an inverse-checker pattern mask 1830.

When such an event occurs, printing of all the image data is completed after the first pass (1840). No recording is therefore performed during the second pass (1850). That is to say, the same nozzles are responsible for all the print data 1810. An adverse influence derived from the differences of the nozzles from one another is reflected as density nonuniformity . The fundamental object of the aforesaid division recording is not accomplished.

FIG. 19 shows printed states of arrayed image data offering a higher duty ratio than those shown in FIGS. 17 and 18. As apparent from FIG. 19, the number of printed pixels differs considerably between the first and second passes. Nonuniformity of density which is suppressed at a high duty ratio close to 100% recurs at a low duty ratio below 50%.

Consideration will be taken with regard to printing on transparent film under these circumstances. Printing is completed by making the first and second passes so that as many adjoining dots as possible will not be printed simultaneously. This is intended to prevent occurrence of beading. Nevertheless, the aforesaid print state ensues. This means that the advantage of division printing is not exerted because of a combination of a specific dither pattern and a print pattern. Beading is conspicuous in an area of a produced image corresponding to the combined portion of the patterns. If gradation is printed, a quite unpleasant texture appears in the area of the image.

In FIG. 14, the head always uses all the nozzles to print either the checker or inverse checker pattern. As for an upper half of the print area shown in FIG. 14 having a depth of four pixels, a checker pattern is first printed and an inverse checker pattern is then printed. As for a lower half thereof having a depth of four pixels, an inverse checker pattern is first printed and a checker pattern is then printed. When this printing procedure is discussed in conjunction with the aforesaid problem, it is deduced that a print area in which many dots are created during the first pass and a few dots are created during the second pass, and a print area in which almost no dots are created during the first pass and quite a few dots are created during the second pass appear alternately every other half of the length of a recording head. This phenomenon poses a problem, which will be described below, to occur along a border between print areas during ink-jet recording.

In the ink-jet recording method, when a dot is superposed on a previously recorded dot, the dot deposited after the previously-recorded dot in the superposed area tends to expand in the depth direction of paper.

FIG. 20 is a sectional view schematically showing the expansion. A pigment such as a dye contained in discharged ink is physically and chemically coupled with a recording medium. At this time, the coupling of the pigment with a recording medium P is definite. As long as the coupling force does not differ among pigment types, the coupling of a pigment I1 (crosshatched in FIG. 20) of previously-discharged ink with a recording medium is given priority and therefore mostly left on the surface of the recording medium P. A pigment I2 (hatched in FIG. 20) of ink discharged later is hardly coupled with the recording medium P on the surface of the recording medium P and therefore expands into the recording medium. When a reaction of ink is considered on the level of fibers of the recording medium P, once fibers are coupled with the dye in ink, the fibers are more hydrophilic than they are when they are not coupled therewith. Ink droplets shot (landed) at an area adjacent to a highly hydrophilic area of the recording medium are liable to be attracted toward the area at which previously-discharged ink droplets are shot.

When preceding ink droplets are fused insufficiently, that is, when preceding ink droplets contain more water, an area of a recording medium at which the ink droplets are shot is more hydrophilic. More ink droplets shot at an area adjacent to the area are therefore liable to be attracted to the previous area. When a print area in which many dots are created first and then a few dots are created, and a print area in which almost no dots are created first and then quite a few dots are created during the second pass appear alternately every other half of the length of a recording head, dots printed on the margin of the print area adjacent to the print area at which much ink has been shot are easily attracted, while dots printed on the margin of the print area adjacent to the print area in which little ink has been shot are hardly attracted. Due to this difference in attraction, a high density area and a low density area are created on the border between the print areas. This results in density nonuniformity. The density nonuniformity becomes conspicuous especially in half-tone recording and has such periodicity that density nonuniformity appears every other half of the length of a recording head.

When a specific mask is used to effect thinning-out printing, print data may have the same periodicity as the mask. In other words, the amplitude of density defined with the arrangement of print pixel locations and non-print pixel locations in a mask may be consistent with the amplitude of print data and then be resonant therewith. As a result, a dot array is formed to include a pattern oriented in a certain direction. In general, this phenomenon is referred to a moire pattern. When images on a plurality of lines are based on the same mask, the moire pattern is more conspicuous and more discernible by users. The moire pattern depends largely on the periodicity of a mask.

Due to the aforesaid problems, the multi-pass printing which has been adopted to correct differences of nozzles from one another does not always provide satisfactory image quality because of density nonuniformity. The density nonuniformity has such periodicity that it appears in every other print area having a certain depth. The periodicity facilitates human perception of discerning the density nonuniformity.

Next, consideration will be given to printing on a type of recording medium that is prone to beading and less absorptive, such as transparent film, but not printing on a type of recording medium that is quite absorptive, such as coated paper or plain paper.

If an area of a recording medium, which is prone to beading even in a normal condition, is twisted, the ink beads are stopped by the white stripe and enlarged to produce large streaky patches. This phenomenon is more critical in transparent film than in plain paper or coated paper. In an effort to solve this problem, a proposal has been made for a method of repeating recording a plurality of times in order to complete an image for one line.

However, according to the prior art, a thinning-out mask is a fixed mask. When a thinning-out mask which may cause a great difference between the number of print dots for the first pass and that for the second pass is employed, beading often varies its intensity especially during half-tone recording. That is to say, when a large number of dots are printed during a single pass, beading becomes more intense. The intensity of beading changes with the synchronism of a gray scale pattern with a thinning-out mask pattern for each pass. Aside from this case, when beading occurs between adjoining dots, a half-tone dither pattern may be enlarged or exaggerated to become a conspicuous unpleasant pattern, or a gray scale may be destroyed.

When the conventional fixed mask for regularly thinning-out is used, beading occurs askew and appears with exaggerated askewness because of an inaccurate mounting position of a recording head, unequal speeds of a carriage during a plurality of printing passes, different set positions of a carriage, different paper feed positions, and differences in ink discharging speed of a recording head. When the regularity of a fixed mask is made higher in order to eliminate the influence of beading or the mask size thereof is made larger, if the fixed mask is displaced from an ideal position due to an error, beading becomes more conspicuous. This depends on the pattern of a fixed mask, though. The aforesaid moire pattern is therefore enlarged.

SUMMARY OF THE INVENTION

An object of the present invention is to provide a recording apparatus, and an ink-jet recording apparatus and method that can minimize occurrence of density nonuniformity and offer satisfactory image quality.

Another object of the present invention is to provide an ink-jet recording apparatus and method capable of minimizing occurrence of nonuniform density and offering satisfactory image quality even for a type of recording medium that is prone to beading.

Yet another object of the present invention is to provide a recording apparatus, and an ink-jet recording apparatus and method that can effect successful recording irrelevant of a record image.

To achieve the above objects, the present invention is characterized by a recording apparatus for recording using a recording head having a plurality of recording elements, comprising:

scan controlling means for controlling the recording head to scan the same record area of a recording medium a plurality of times;

producing means for producing a plurality of random masks each having a predetermined size and defining a random array of non-record pixel locations and record pixel locations;

thinning-out means for thinning out record data using the random masks produced by the producing means, the random masks being utilized as thinning-out masks for each record area; and record controlling means for forming thinned-out images by recording the record data thinned out by the thinning-out means during respective scans and thus completing an image.

The present invention is further characterized by a recording apparatus for recording using a recording head having a plurality of recording elements. The apparatus comprises:

scan controlling means for controlling the recording head to scan the same record area of a recording medium a plurality of times;

selecting means for randomly selecting a plurality of masks each having a predetermined size and defining an array of non-record pixel locations and record pixel locations;

thinning-out means for thinning out record data using the masks selected by the selecting means, the randomly-selected masks being utilized as thinning-out masks for each record area; and record controlling means for forming thinned-out images by recording the record data thinned out by the thinning-out means, during respective scans, and thus completing an image.

The present invention is still further characterized by a recording apparatus for recording using a recording head having a plurality of recording elements. The apparatus comprises:

scan controlling means for controlling the recording head to scan the same record area of a recording medium a plurality of times;

producing means for producing a plurality of random masks each having a predetermined size and defining a random array of non-record pixel locations and record pixel locations;

selecting means for randomly selecting a plurality of masks each having a predetermined size and defining an array of non-record pixel locations and record pixel locations;

synthesizing means for synthesizing the masks randomly selected by the selecting means with the random masks produced by the producing means so as to produce synthetic masks providing different thinning-out ratios from the random masks;

thinning-out means for thinning out record data using the synthetic masks produced by the synthesizing means, the synthetic masks being utilized as thinning-out masks for each record area; and recording controlling means for forming thinned-out images by recording the record data thinned out by the thinning-out means, during respective scans, and thus completing an image.

The present invention is further characterized by a recording apparatus for recording using a recording head having a plurality of recording elements, comprising:

scan controlling means for controlling the recording head to scan the same record area of a recording medium a plurality of times;

specifying means for specifying different kinds of masks, each of which defines an array of non-record pixel locations and record pixel locations, for use as thinning-out masks for respective record areas;

thinning-out means for thinning out record data using the different kinds of masks specified by the specifying means; and a record controlling means for forming thinned-out images by recording the record data thinned out by the thinning-out means during respective scans and thus completing an image.

The present invention is yet further characterized by a recording apparatus for recording using a recording head having a plurality of recording elements, comprising:

scan controlling means for controlling the recording head to scan the same record area of a recording medium a plurality of times;

a creating means for creating masks each having a predetermined size and defining an array of non-record pixel locations and record pixel locations;

expanding means for expanding the masks created by the creating means;

thinning-out means for thinning out record data using the masks expanded by the expanding means, the masks being utilized as thinning-out masks for each record area; and record controlling means for forming thinned-out images by recording the record data thinned out by the thinning-out means during respective scans and thus completing an image.

The present invention is yet further characterized by an ink-jet recording apparatus for recording using a recording head having a plurality of ink-jet nozzles for discharging ink, the recording apparatus being operable in a normal recording mode and a thinning-out recording mode, comprising:

a scan controlling means for controlling the recording head to scan the same record area of a recording medium once in the normal recording mode, while controlling the recording head to scan the same record area of the recording medium a plurality of times in the thinning-out recording mode;

record controlling means for controlling complete recording of an image by recording record data during one scan when in the normal recording mode, and by recording thinned-out images using the created thinning-out masks during respective scans when in the thinning-out recording mode; and thinning-out controlling means for selecting the thinning-out recording mode and for setting masks resulting from thinning-out based on pseudo-random numbers in the record controlling means when a recording medium used for recording is of a predetermined type.

The present invention is yet further characterized by a recording method for recording using a recording head having a plurality of recording elements, comprising the steps of:

producing a plurality of random masks each having a predetermined size and defining a random array of non-record pixel locations and record pixel locations;

thinning out record data using the random masks produced, the random masks being utilized as thinning-out masks for each record area; and controlling the recording head to scan the same record area of a recording medium a plurality of times, forming thinned-out images by recording thinned-out record data during respective scans, and thus completing an image.

The present invention is still further characterized by a recording method for recording using a recording head having a plurality of recording elements. The method comprises the steps of:

randomly selecting a plurality of masks each having a predetermined size and defining an array of non-record pixel locations and record pixel locations;

thinning out record data using the masks selected in the selecting step, the random masks being utilized as thinning-out masks for each record area; and controlling the recording head to scan the same record area of a recording medium a plurality of times, forming thinned-out images by recording thinned-out record data during respective scans, and thus completing an image.

The present invention is still further characterized by a recording method for recording using a recording head having a plurality of recording elements, the method comprising the steps of:

producing a plurality of random masks each having a predetermined size and defining a random array of non-record pixel locations and record pixel locations;

randomly selecting a plurality of prestored masks each having a predetermined size and defining an array of non-record pixel locations and record pixel locations;

synthesizing the selected prestored masks with the produced random masks so as to produce synthetic masks providing different thinning-out ratios from the random masks;

thinning out record data using the synthetic masks, the synthetic masks being utilized as thinning-out masks for each record area; and controlling the recording head to scan the same record area of a recording medium a plurality of times, forming thinned-out images by recording thinned-out record data during respective scans, and thus completing an image.

The present invention is yet further characterized by a recording method for recording using a recording head having a plurality of recording elements, comprising the steps of:

specifying different kinds of masks, each of which defines an array of non-record pixel locations and record pixel locations, as thinning-out masks for respective record areas;

thinning out record data using the utilized different kinds of masks; and controlling the recording head to scan the same record area of a recording medium a plurality of times, forming thinned-out images by recording thinned-out record data during respective scans, and thus completing an image.

The present invention is yet further characterized by a recording method for recording using a recording head having a plurality of recording elements, comprising the steps of:

creating masks each having a predetermined size and defining an array of non-record pixel locations and record pixel locations;

expanding the created masks;

thinning out record data using the expanded masks, the masks being utilized as thinning-out masks for each record area;

controlling the recording head to scan the same record area of a recording medium a plurality of times, forming thinned-out images by recording thinned-out record data during respective scans, and thus completing an image.

The present invention is yet further characterized by an ink-jet recording method for recording using a recording head having a plurality of ink-jet nozzles for discharging ink, the recording method being operable in a normal recording mode and a thinning-out recording mode, comprising the steps of:

controlling the recording head to scan the same record area of a recording medium once in the normal recording mode, while controlling the recording head to scan the same record area of the recording medium a plurality of times in the thinning-out recording mode; and controlling complete recording of an image by recording record data during one scan in the normal recording mode, and by recording thinned-out images using created thinning-out masks during respective scans in the thinning-out recording mode, wherein when a recording medium used for recording is of a predetermined type, the thinning-out recording mode is selected and masks resulting from thinning-out based on pseudo-random numbers are utilized as the thinning-out masks.

With the foregoing configurations, when an image is produced with print (record) pixels defined by random masks, the image is unaffected with the periodicity of a thinning-out array mask. Consequently, density nonuniformity resulting from unequal numbers of print pixels printed in the same record area during multiple passes in conventional multi-pass recording can be suppressed because the periodicity of the density nonuniformity is eliminated.

With the aforesaid configurations, since different masks are employed for each print (record) area, a thinning-out array mask will not be applied cyclically to a plurality of lines. The periodicity of density nonuniformity is thus varied so that inherent density nonuniformity becomes inconspicuous. Eventually, high image quality can be realized.

With the aforesaid configurations, when masks are expanded in order to equalize the numbers of print (record) pixels to be rendered during respective recording scans, the periodicity of a mask can be varied. Thus, density nonuniformity can be made inconspicuous and high image quality can be realized.

With the aforesaid configurations, when a recording medium used for recording is of a predetermined type, for example, transparent film that is prone to beading, a thinning-out recording mode is selected and masks resulting from thinning-out based on pseudo-random numbers are used as thinning-out array masks. Any thinning-out array mask will therefore not be applied cyclically to a plurality of lines. Furthermore, the orientation and distribution of beading are randomized so that beading becomes inconspicuous. Eventually, high image quality is realized.

BRIEF DESCRIPTION OF THE DRAWINGS

FIGS. 11-$a$–11-$c$ shows a printed state attained by an ideal ink-jet printer;

FIGS. 12-$a$–12-$c$ show a printed state attained by a conventional ink-jet printer prone to density nonuniformity;

FIGS. 13-$a$–13-$c$ and 14-$a$–14-$c$ are explanatory diagrams concerning conventional division printing;

FIG. 38 is an explanatory diagram concerning control of periodicity of a cyclic mask using a cycle value in the ninth embodiment;

FIG. 50 shows an ink-jet value control table involving ambient humidities in the fifteenth embodiment;

FIG. 51 shows an ink-jet value control table involving types of recording media in the fifteenth embodiment.

DESCRIPTION OF THE PREFERRED EMBODIMENTS

Embodiments of an ink-jet recording apparatus of the present invention will be described in detail with reference to the drawings.

FIGS. 21 to 25 are explanatory diagrams showing an ink jet unit IJU, an ink jet head IJH, an ink tank IT, an ink jet cartridge IJC, a main unit of an ink-jet recording apparatus IJRA, and a carriage HC, and also showing the relationships among these components. Using these drawings, the components will be described.

(i) Brief Description of a Main Unit

Figure 21:
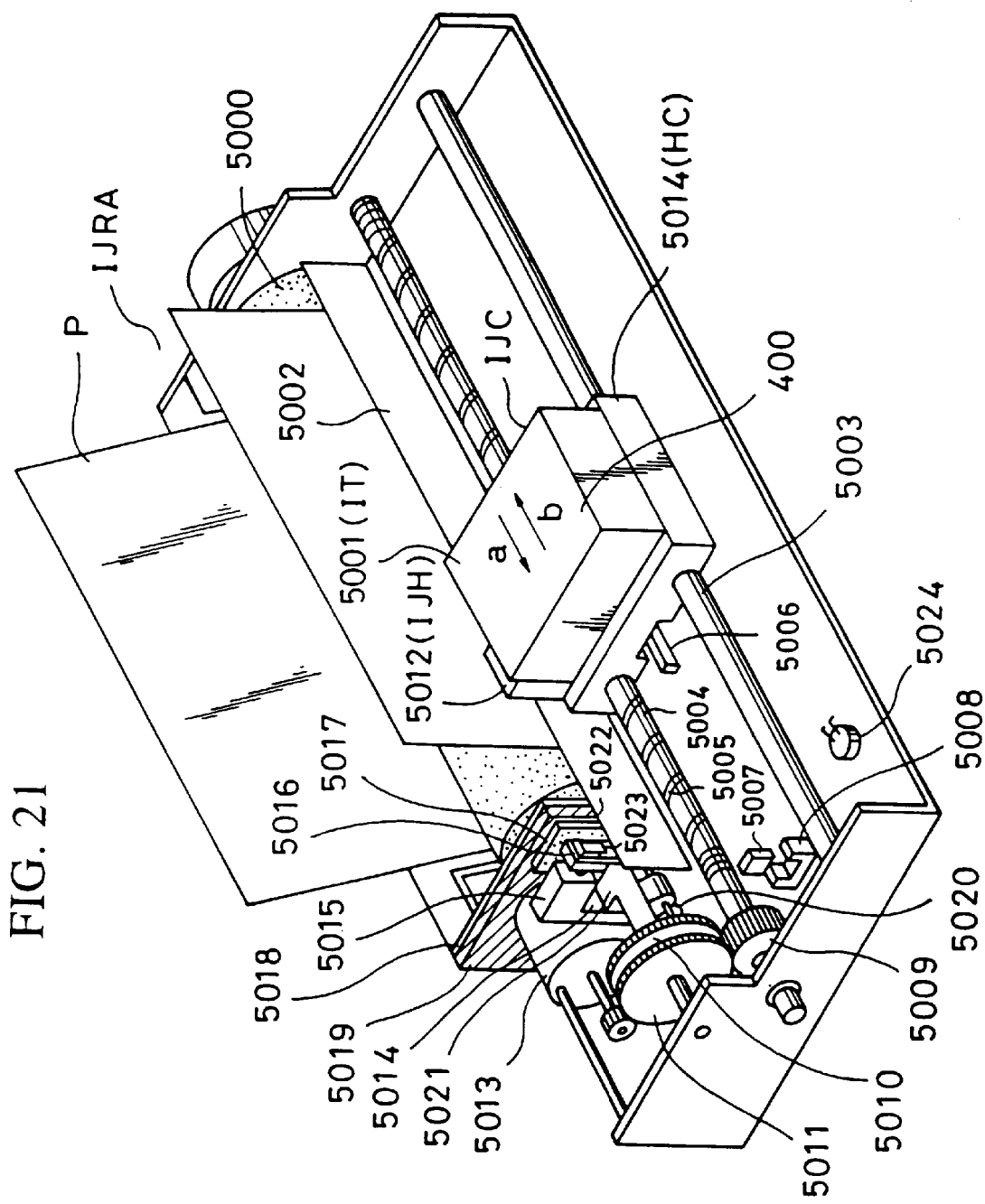
FIG. 21 is an explanatory diagram showing a main unit of an ink-jet recording apparatus to which the present invention applies.

FIG. 21 shows an example of an appearance of an ink-jet recording apparatus IJRA to which the present invention applies. In FIG. 21, a lead screw 5004 is interlocked with a drive motor 5013 via driving force transmission gears 5011 and 5009, and rotates with forward or reverse rotation of the drive motor 5013. A carriage HC engages with a spiral groove 5005 formed on the lead screw 5004 using a pin (not shown), and reciprocates in directions of arrows a and b. The carriage HC loads an ink jet cartridge IJC. Numeral 5002 denotes a paper presser. The paper presser 5002 presses paper to a platen 5000 while the carriage is moving. Numerals 5007 and 5008 denote photo-couplers. The photo-couplers 5007 and 5008 serve as a home-position sensing means that senses the presence of a carriage lever 5006 interposed between the photo-couplers and changes rotating directions of the motor 5013. Numeral 5016 denotes a member for supporting a cap member 5022 for capping the front surface of a recording head. Numeral 5015 denotes an absorbing means for absorbing the contents of the cap member 5022. The absorbing means 5015 thus assists in recovery of the recording head by absorbing the contents of the cap member 5022 through a cap opening 5023. Numeral 5017 denotes a cleaning blade. Numeral 5019 denotes a member for moving the cleaning blade forward and backward. The cleaning blade 5017 and member 5019 are supported by a main unit supporting plate 5018. Needless to say, the cleaning blade 5017 need not be shaped as shown in FIG. 21. Any known cleaning blade can also apply to this embodiment.

Reference numeral 5021 denotes a lever for use in starting recovery absorption. The lever 5021 moves with the movement of a cam 5020 engaging with the carriage. Driving force generated by the drive motor is controlled by a known transmitting means such as a switch using a clutch.

The capping, cleaning, and recovery absorption are initiated at specific positions due to the reaction of the lead screw 5005 against the invasion of the carriage into the home-position area. As long as the capping, cleaning, and recovery absorption are initiated successfully according to known timing, they can be realized in any working modes in this embodiment.

An ink jet cartridge IJC in this embodiment can accommodate a large volume of ink. The tip of an ink jet head IJH projects slightly from the front surface of an ink tank IT. The ink jet cartridge IJC is secured by a positioning means for the carriage HC mounted on the main unit of the ink-jet recording apparatus IJRA and by an electric contact. The ink jet cartridge IJC is dismountable from the carriage HC.

(ii) Description of a Construction of the Ink Jet Unit IJU

The ink jet unit IJU is designed to effect recording using an electro-thermal converter for generating heat energy used to cause film boiling of ink in response to an electric signal.

(iii) Description of a Heat Board

Figure 22:
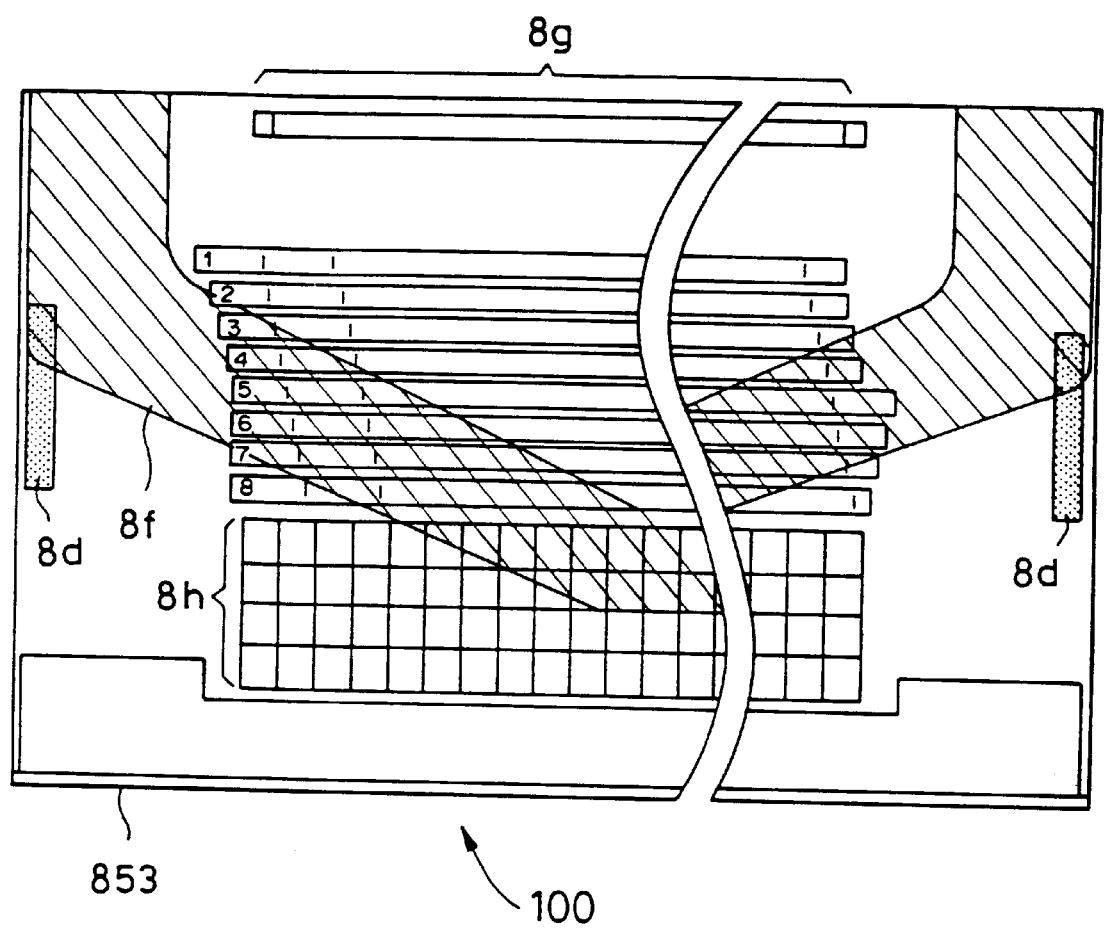
FIG. 22 is an explanatory diagram showing a heater board.

FIG. 22 schematically shows a heater board 100 for a recording head in this embodiment. Temperature control sub-heaters 8d for use in controlling the temperature of the recording head, ink jet rows 8g including ink-jet main heaters for use in discharging ink, and drive elements 8h are formed on a substrate 853 so as to have positional relationships shown in FIG. 22. The elements are thus arranged on the same substrate 853, which facilitates efficiency in detecting and controlling the temperature of the recording head. Moreover, the recording head can be made smaller in size and the manufacturing processes can be reduced in number. FIG. 22 also shows the location of a section 8f of a tabletop against an outer circumferential wall. The tabletop partitions the heater board into an area filled with ink and another area not filled with ink. Spaces along the section 8f of the tabletop against the outer circumferential wall near the ink jet heaters 8d serve as common ink chambers. Grooves formed between adjoining ink jet rows 8g on the section 8f of the tabletop against the outer circumferential wall serve as ink passages.

(iv) Description of a Control Circuitry

Figure 23:
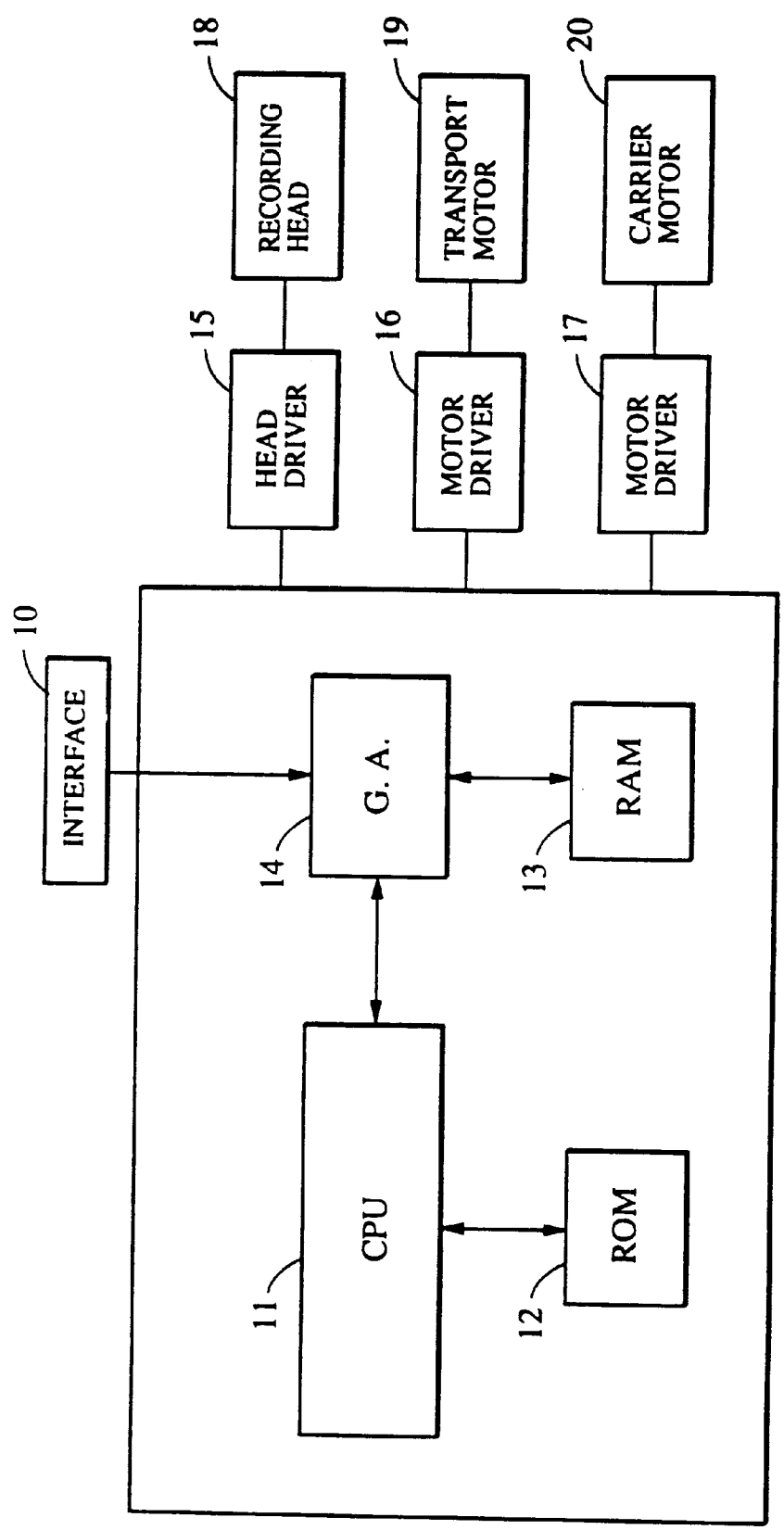
FIG. 23 is a block diagram showing a control circuit.

Next, a control circuitry for executing control of the aforesaid components in a record mode will be described with reference to the block diagram of FIG. 23. In FIG. 23 showing a control circuit, 10 denotes an interface for inputting a record signal, 11 denotes a CPU, 12 denotes a program ROM for storing control programs running under the control of the CPU 11 and 13 denotes a dynamic RAM for storing various data (record signal and record data to be supplied to the recording head). The dynamic RAM 13 also stores the number of print dots and the number of replaced recording heads. Numeral 14 denotes a gate array for controlling supply of record data to the recording head 18. The gate array 14 also controls data transfer among the interface 10, CPU 11, and RAM 13. Numeral 20 denotes a carrier motor for use in transporting the recording head 18, 19 denotes a transport motor for use in transporting recording paper, 15 denotes a head driver for driving the recording head and 16 and 17 denote motor drivers for driving the transport motor 19 and carrier motor 20, respectively.

Figure 24:
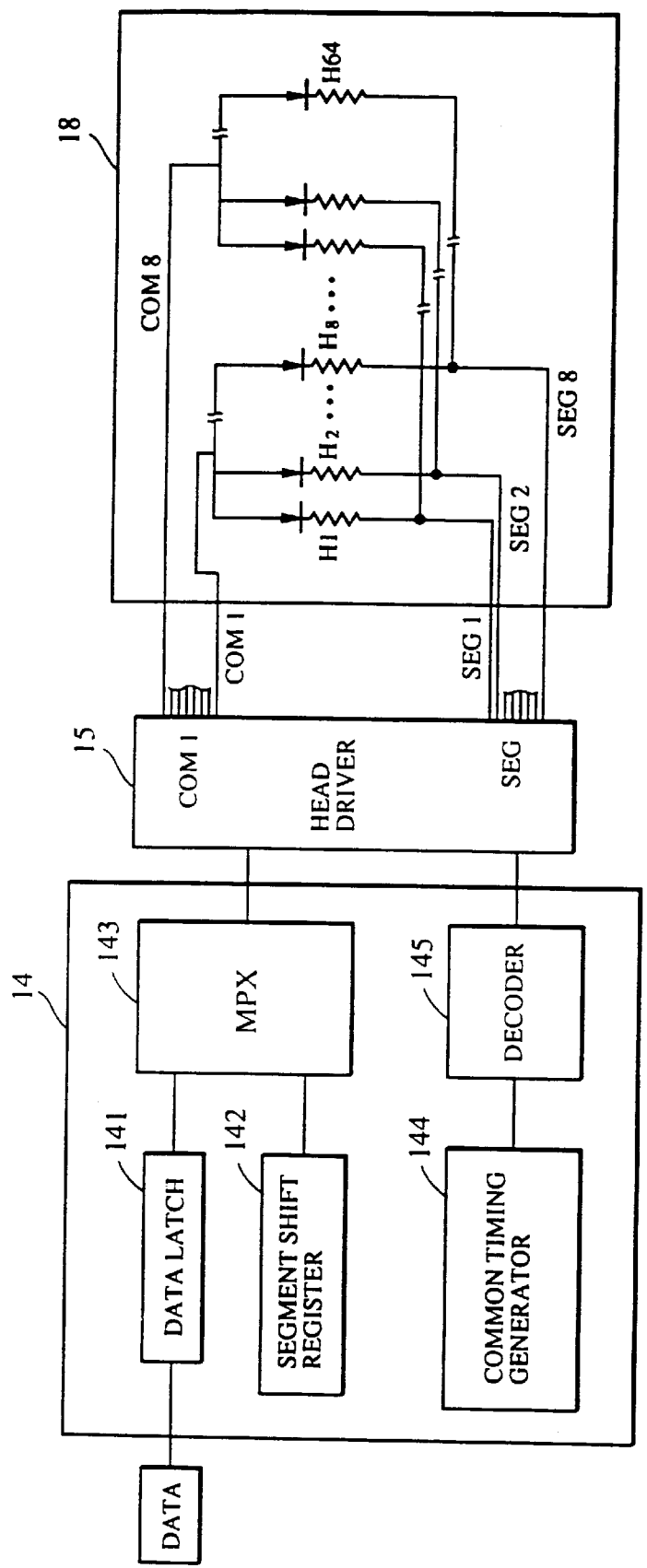
FIG. 24 is a block diagram showing control circuitry.

FIG. 24 is a circuit diagram showing the components shown in FIG. 23 in detail. The gate array 14 comprises a data latch 141, a segment shift register 142, a multiplexer (MPX) 143, a common timing generator 144, and a decoder 145. The recording head 18 is formed with a matrix of diodes. Driving current flows into an ink jet heater (any of HI to H64) selected with a common signal COM and a segment signal SEG, whereby ink is heated and discharged.

The decoder 145 decodes a timing signal generated by the common timing generator 144 and selects any of the common signals COM1 to COM8. The data latch 141 latches record data read from the RAM 13 in units of eight bits. The multiplexer 143 outputs the record data as any of segment signals SEG1 to SEG8 according to the contents of the segment shift register 142. An output of the multiplexer 143 can be modified in units of one, two, or eight bits according to the contents of the shift register 142, which will be described later.

The actions of the aforesaid control circuitry will be described. When the interface 10 receives a record signal, the gate array 14 and CPU 11 convert the record signal into record data to be printed. The motor drivers 16 and 17 are then driven, and the recording head is driven according to the record data fed to the head driver 15. Thus, printing is executed.

Figure 25:
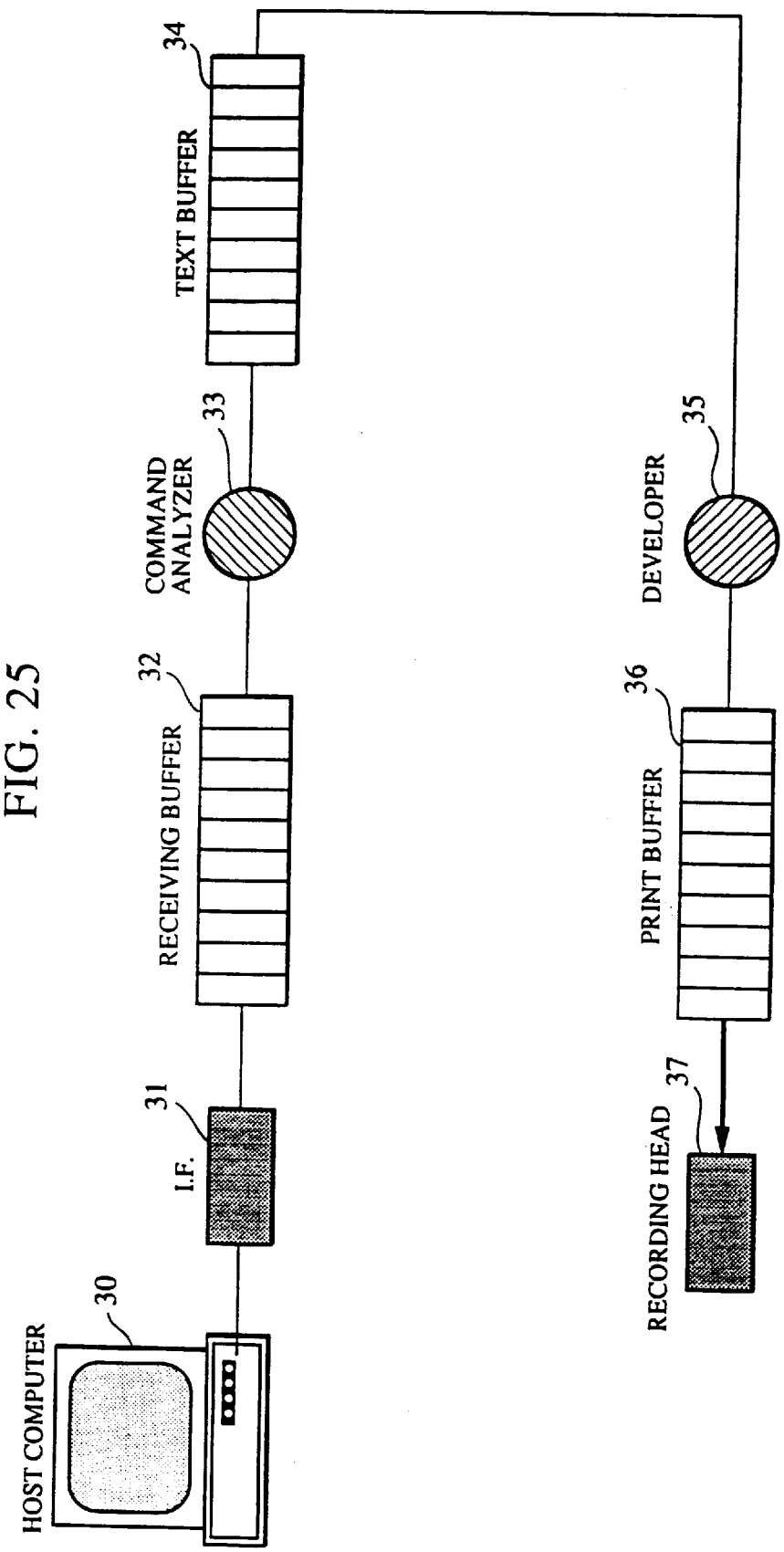
FIG. 25 shows a configuration for explaining the flow of print data.

FIG. 25 shows a configuration of a recording apparatus for explaining the flow of record data. Record data sent from a host computer 30 is placed in a receiving buffer 32 incorporated in the recording apparatus via an interface 31. The receiving buffer 32 has a storage capacity of several kilobytes to several tens of kilobytes. A command analyzer 33 analyzes a command specified in the record data existent in the receiving buffer 32, and sends the record data to a text buffer 34. In the text buffer 34, the record data is held as data for one line in an intermediate format, and appended a print position, a type of modification, a size, a character code, and a font address which are defined for each character. The storage capacity of the text buffer 34 differs among types of recording apparatuses. For serial printers, the text buffer has a storage capacity of data for several lines. For page printers, the text buffer has a storage capacity of data for one page. A developer 35 develops the record data existent in the text buffer 34 and feeds the record data in binary representation to a print buffer 36. The binary data is provided as an output signal to a recording head 37. Eventually, recording is executed. In this embodiment, the binary data placed in the print buffer 36 is multiplied (ANDed) by mask pattern data (random mask data) which will be described later, and then sent to the recording head 37. This makes it possible to specify mask data after checking data existent in the print buffer 36. Depending on the type of recording apparatus, the text buffer may not need be included. In this case, the record data placed in the receiving buffer 32 is developed during command analysis and then written in the print buffer 36.

Using an ink-jet recording apparatus having the aforesaid configuration, exemplary embodiments of the present invention will be described below.

First Embodiment

The first embodiment will be described in conjunction with the drawings. In an ink-jet recording apparatus of the first embodiment, thinning-out masks that are random masks are employed.

Figure 1A:
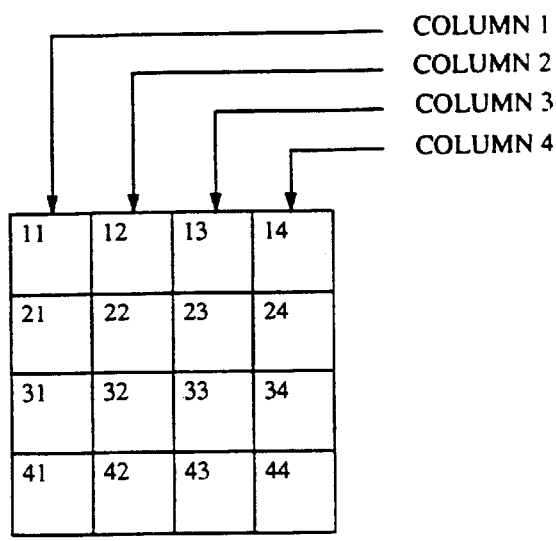
FIGS. 1(A)–1(E) show creation of a random mask in the first embodiment of the present invention.
Figure 1B:
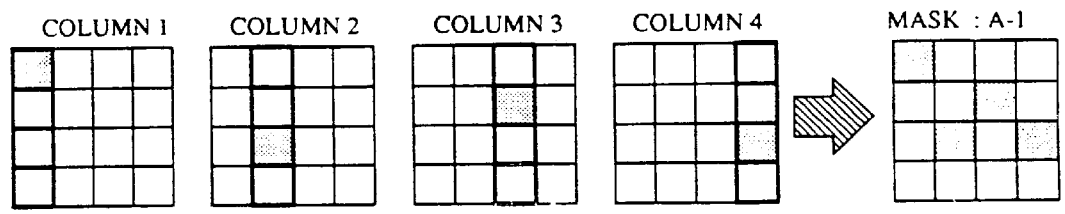

Production of random masks will be described in conjunction with FIG. 1. This embodiment employs 4-by-4 thinning-out masks each offering a duty ratio of 25% for use in four-pass printing. In FIG. 1A, whether or not printing is effected is specified for each pixel location in a 4-by-4 mask, and the pixel locations are assigned numbers in the form of a matrix having four lines and four columns. The columns are defined as column 1, column 2, column 3, and column 4 from left to right. A method for creating random masks in the form of the above matrix will be described below.

First, any one of pixel locations 11, 21, 31, and 41 is selected for column 1 at random. In this embodiment, pixel location 11 is selected. For the selection, a random number is produced to determine a pixel location. Similarly, any one of four pixel locations is selected for each of columns 2, 3, and 4. In due course, a thinning-out mask offering a duty ratio 25%, mask A-1, is completed.

Figure 1C:
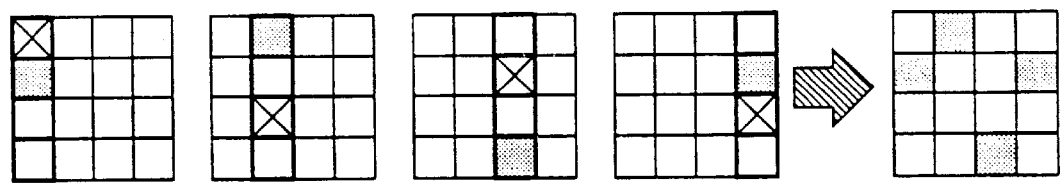

Next, any one of three pixel locations (pixel locations 21, 31, and 41) except pixel location 11 used in the mask A-1 is selected for column 1 as shown in FIG. 1C. In this embodiment, pixel location 21 is selected. Similarly, any one of three pixel locations is selected for each of columns 2, 3, and 4. Thus, a mask A-2 is completed.

Figure 1D:
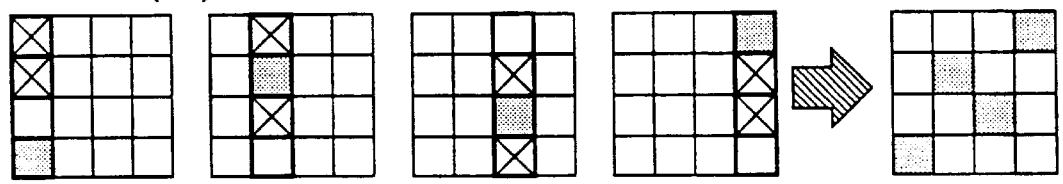
Figure 1E:
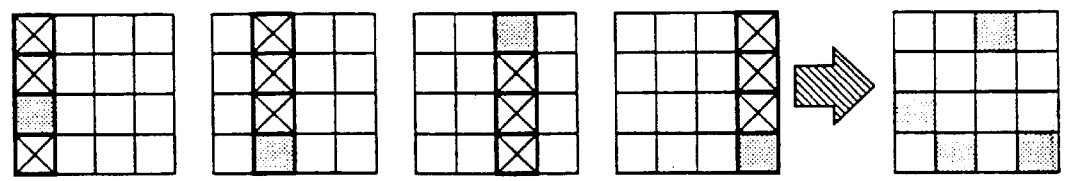

Next, any one of two pixel locations is selected for each of columns 1, 2, 3, and 4 as shown in FIG. 1D. Thus, a mask A-3 is produced. Finally, a mask A-4 having the remaining pixel locations set for the respective columns is produced. Thus, four thinning-out random masks each offering a duty ratio of 25% are produced.

When printing is executed using these four masks, a print area can be 100% furnished with four passes. In this embodiment, 4-by-4 thinning-out masks each offering a duty ratio of 25% are employed. The aforesaid method can apply to thinning-out masks each offering a duty ratio of 50% for two-pass printing or thinning-out random masks each offering a duty ratio of 12.5% for eight-pass printing. Moreover, 6-by-6 masks or 8-by-8 masks can be employed. In any case, random masks can be created to furnish a print area 100% by making the number of passes that defines the associated printing mode.

Figure 2:
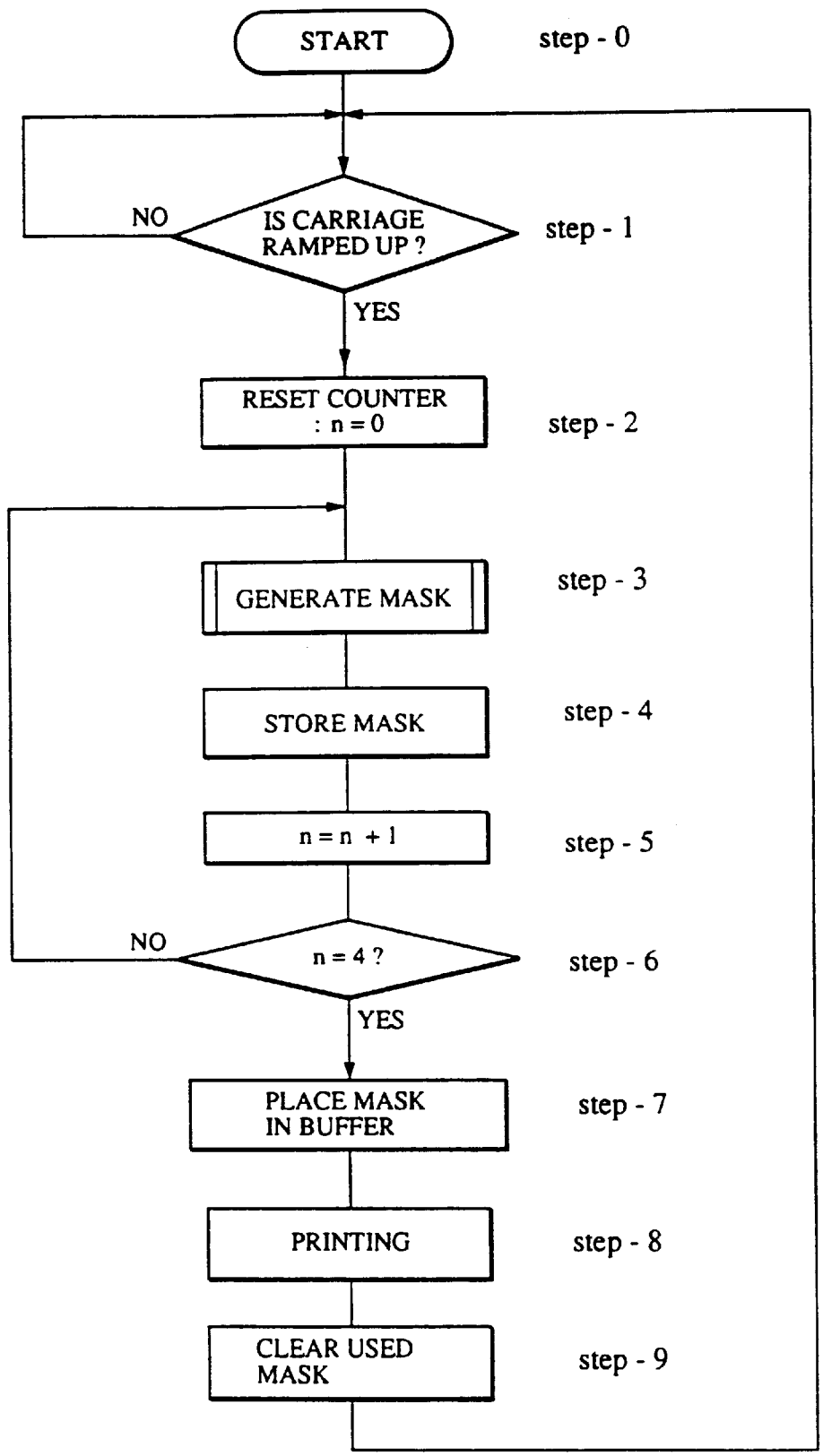
FIG. 2 shows a sequence of creating random masks and executing printing using the masks according to the first embodiment.

Next, timing of creating random masks will be described. FIG. 2 shows a sequence of creating random masks for four-pass printing which is executed by the CPU 11. This sequence is initiated when print data has come in. When it is confirmed that print data has been transmitted, the carriage is ramped up at step 1. A counter in the CPU is used to manage the number of produced random masks. After the carriage is ramped up, the counter is reset at step 2. Masks are then produced at step 3. Mask production is shown in FIG. 3.

Figure 3:
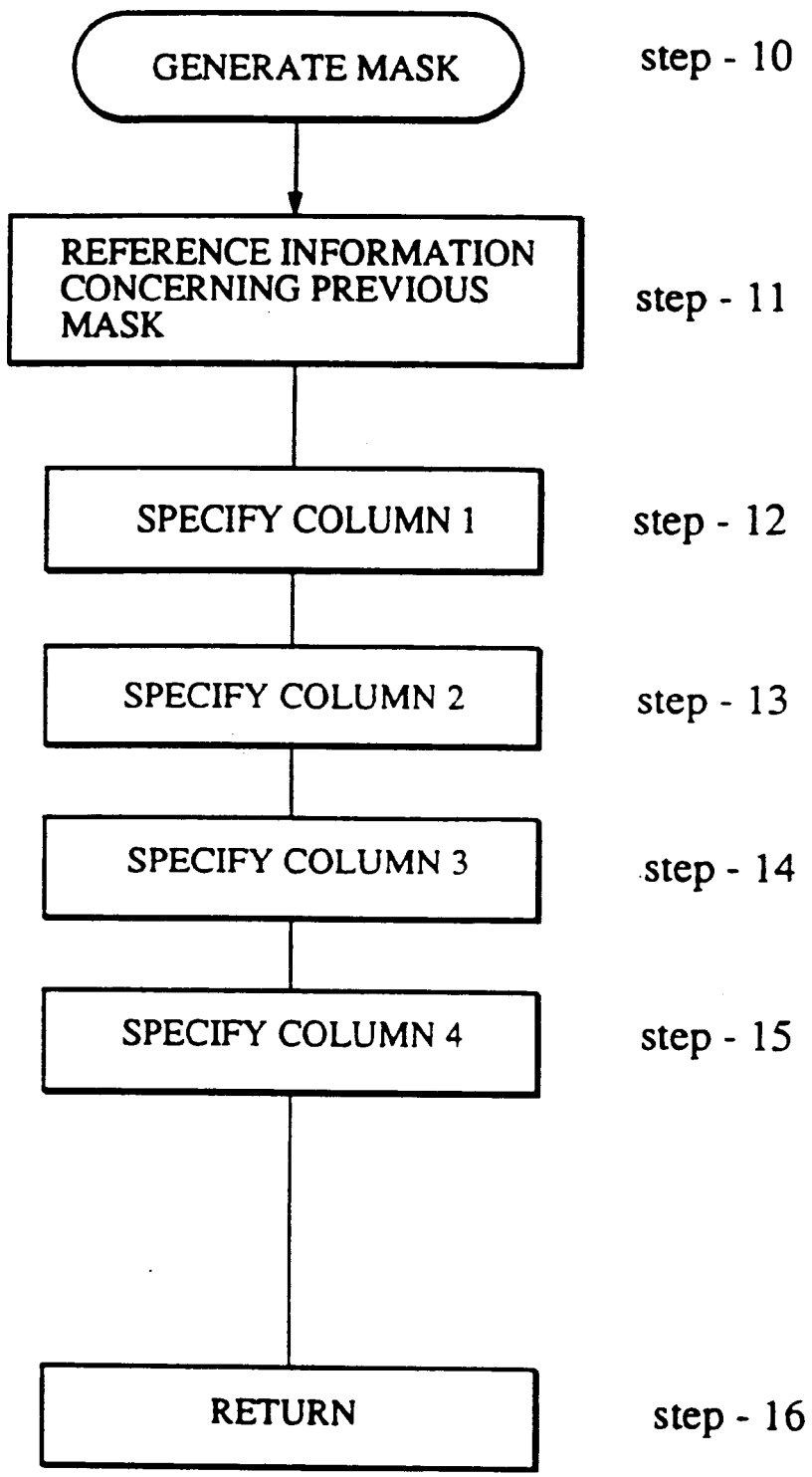
FIG. 3 shows a sequence of creating random masks according to the first embodiment.

In FIG. 3, first, information concerning masks having already been produced and stored for the print data is referenced at step 11. If masks have already been produced, as described in conjunction with FIG. 1, pixel locations except those set in the masks are selected using random numbers in order to produce a random mask. Specifically, first, a pixel location for column 1 is specified. Next, a pixel location for each of columns 2, 3, and 4 is specified. Thus, a mask is created. The mask production then terminates (steps 12 to 16).

Back to the sequence in FIG. 2, a mask produced at step 4 is stored. For storage, a nonvolatile RAM or a memory such as the RAM 13 is employed. After storage is completed, the counter is incremented at step 5. Control is then returned to the mask production sequence. Thus, four masks are produced. The mask production is then terminated at step 6. The produced masks are buffered in the RAM 13 shown in FIG. 23. Herein, the produced masks (4-by-4 masks in FIG. 1) are repeatedly placed in a plurality of storage areas so that a whole print area (for example, 64 columns by 1 line) will be covered with the masks.

The print data stored in the print buffer is masked (ANDed) using the masks buffered. At step 8, printing is executed based on the masked print data. Finally, the random masks used for printing are deleted at step 9. Control is passed to printing for another pass.

Produced masks need not be held until a print area is 100% furnished. A mask is deleted soon after it is used for printing. However, although a print area has not been 100% furnished, if next print data is transmitted and random mask production is executed, other masks can be produced and stored in addition to masks being used for furnishing.

In the four-pass printing according to this embodiment, when four new random masks are to be produced, a nonvolatile RAM or memory should merely store masks resulting from three past scans. Masks used for printing are deleted. The total number of masks is therefore calculated by adding up four new masks, three of four masks resulting from the first past recording scan, two to four masks resulting from the second past recording scan, and one of four masks resulting from the third past recording scan. Thus, the total number of masks comes to 10. The nonvolatile RAM or memory has a storage capacity large enough to store these masks.

As described above, according to this embodiment, the ink-jet recording apparatus is used to perform multi-pass recording in which printing is effected with a plurality of movements and recording scans. Herein, a plurality of random masks can be created according to the number of recording scans or passes. Printing of a print area can be completed using a plurality of random masks. The random masks can be produced so that a print area can be 100% furnished without fail. Furthermore, random masks can be produced and stored uniquely to different print areas.

Respective print areas are therefore printed using unique random masks. The periodicity of density nonuniformity in which density nonuniformity occurs in every other print area having a certain width can be eliminated. Thus, the point does not lie in suppression of density nonuniformity itself. Consequently, high-definition images can be recorded.

Random masks are not periodic. In theory, the random masks will therefore not be synchronous with various dither patterns applied to print data. If a random mask gets partly synchronous with a dither pattern though the probability is very low, the synchronous portion is quite small and will not be identified as density nonuniformity resulting from a difference in the number of print dots by users. Furthermore, since the masks are not periodic, a moire pattern dependent on the periodicity of a mask will not occur. Thus, when random masks are employed, periodicity of density nonuniformity can be eliminated. Eventually, high-definition images can be recorded.

Second Embodiment

Next, the second embodiment will be described. The second embodiment provides a four-pass printing method in which masks are pre-set in the ROM 12 or RAM 13 so that they can be selected at random for printing.

Figure 4:
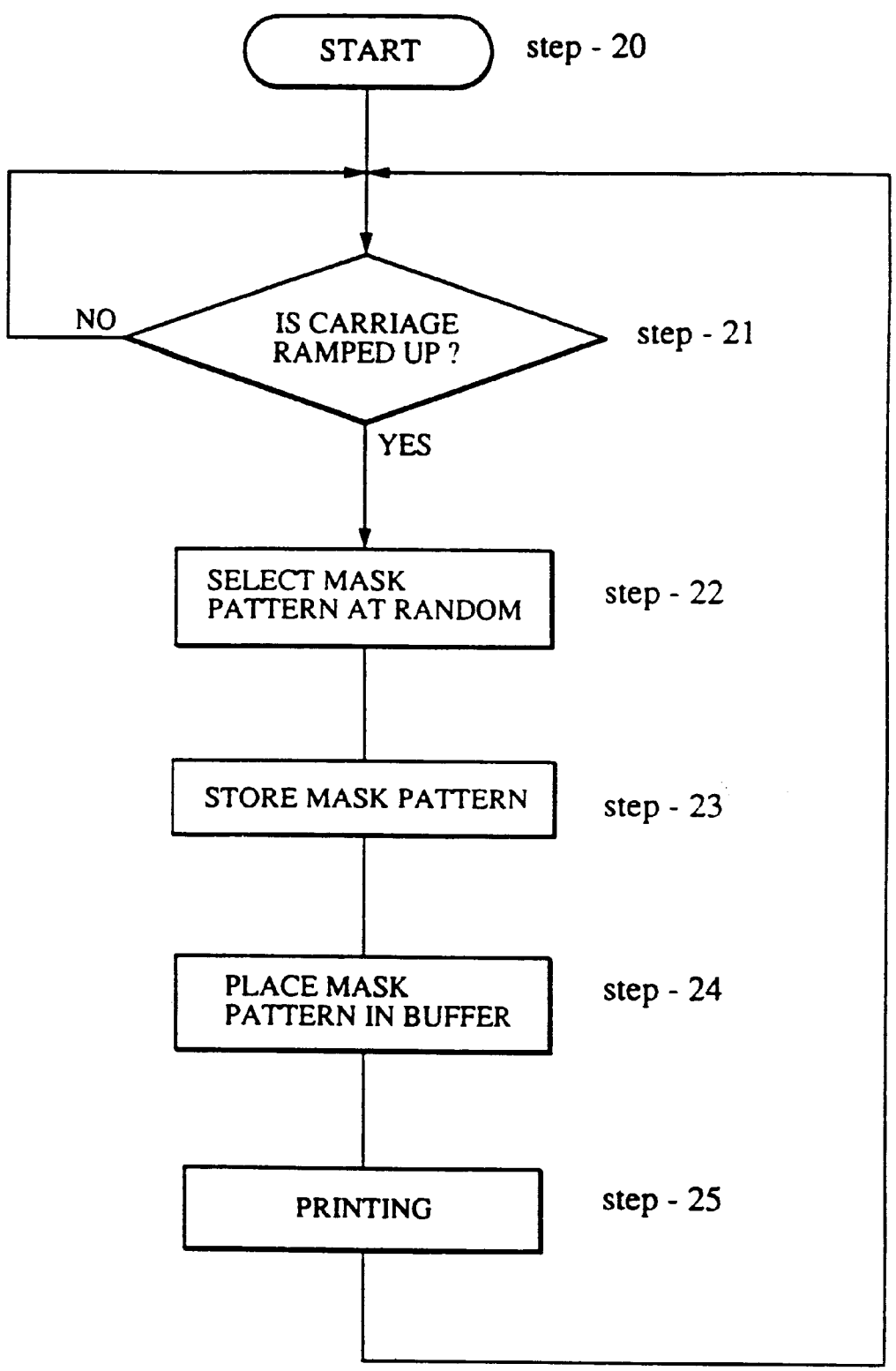
FIG. 4 shows a sequence of selecting masks at random and executing printing using the masks according to the second embodiment.
Figure 5:
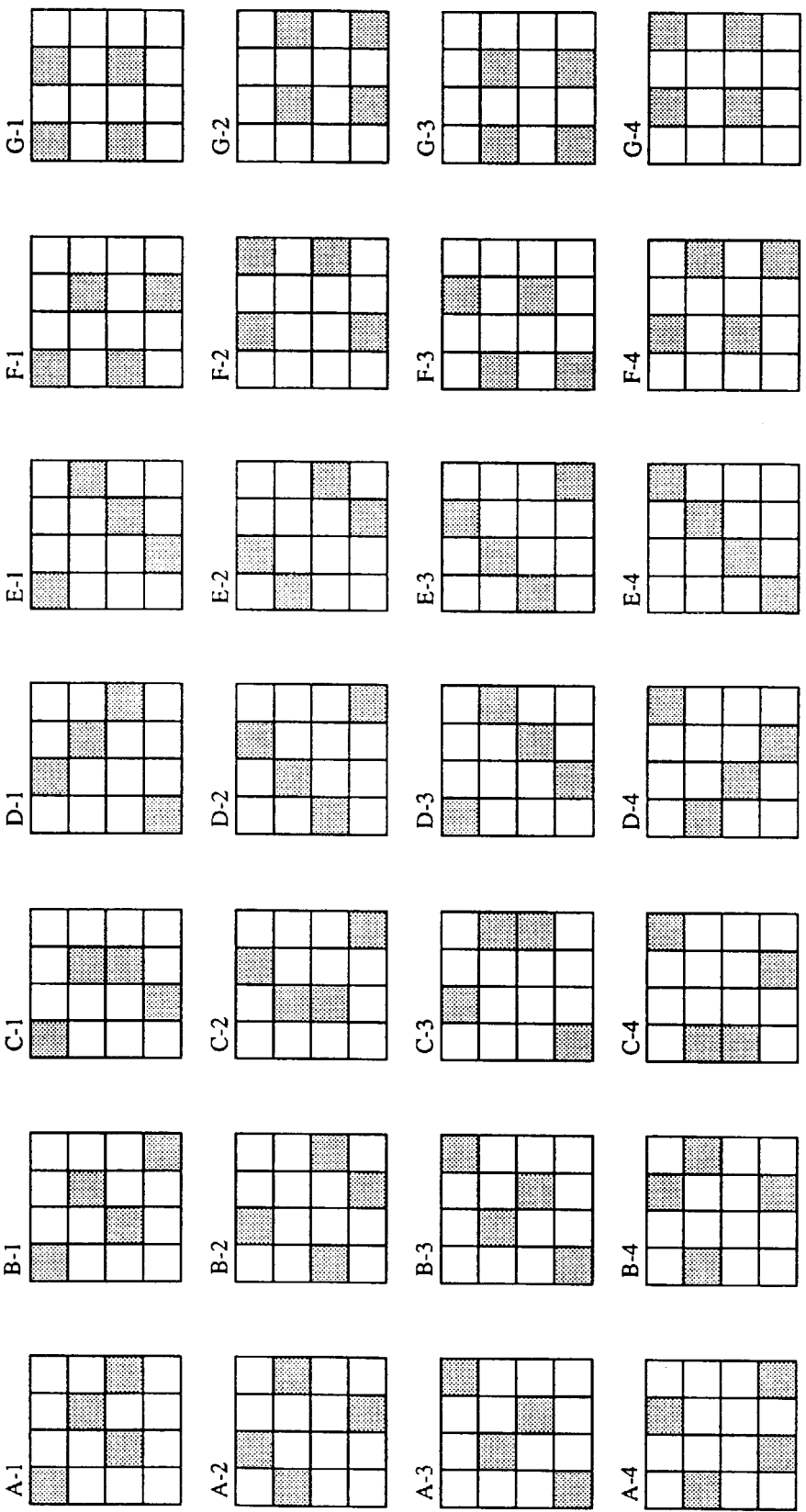
FIGS. 5(A)–5(G) show a plurality of masks in a storage area which are subjected to random selection.

FIG. 4 shows a sequence of selecting masks at random which is executed by the CPU 11. This sequence is initiated when print data has been inputted. When it is confirmed that print data has been transmitted, the carriage is ramped up at step 21. When the carriage is ramped up, the CPU 11 selects a set of masks at random from a plurality of thinning-out masks each offering a duty ratio of 25% existent in the ROM 12 or RAM 13. Since the masks are designed for thinning-out at a duty ratio of 25%, four masks are required to furnish a print area 100%. For random selection, random numbers are produced to select any one from a plurality of masks. At step 23, randomly-selected masks are stored in a rewritable storage area different from the one containing the plurality of masks. The masks are buffered at step 24. The print data in the print buffer is masked using the masks, and then printed at step 25.

FIGS. 5(A)–5(G) show exemplary masks. In FIGS. 5(A)–5(G), seven kinds of masks A to G are shown. These masks are pre-set in the ROM 12 or RAM 13. Alternatively, if a rewritable storage area is available, it may be preprogrammed such that with power on, masks are created according to the random mask production sequence presented in the first embodiment. Random masks employed need not be fixed masks. In this embodiment, seven kinds of masks are employed. The larger the number of kinds of masks, the larger the number of options becomes available. Consequently, randomness in selecting masks increases. The masks A to G are grouped in sets of four. Four masks can furnish a print area 100%.

As described above, when the ink-jet recording apparatus is used to perform multi-pass recording in which printing is effected with a plurality of movements and recording scans, unique masks can be specified for each print area by selecting masks at random for each print area. The periodicity of density nonuniformity in which density nonuniformity occurs in every other print area having a certain width during recording based on fixed masks can be eliminated.

Third Embodiment

Next, the third embodiment will be described. The third embodiment provides a printing method using random masks each having m lines and n columns.

Figure 6:
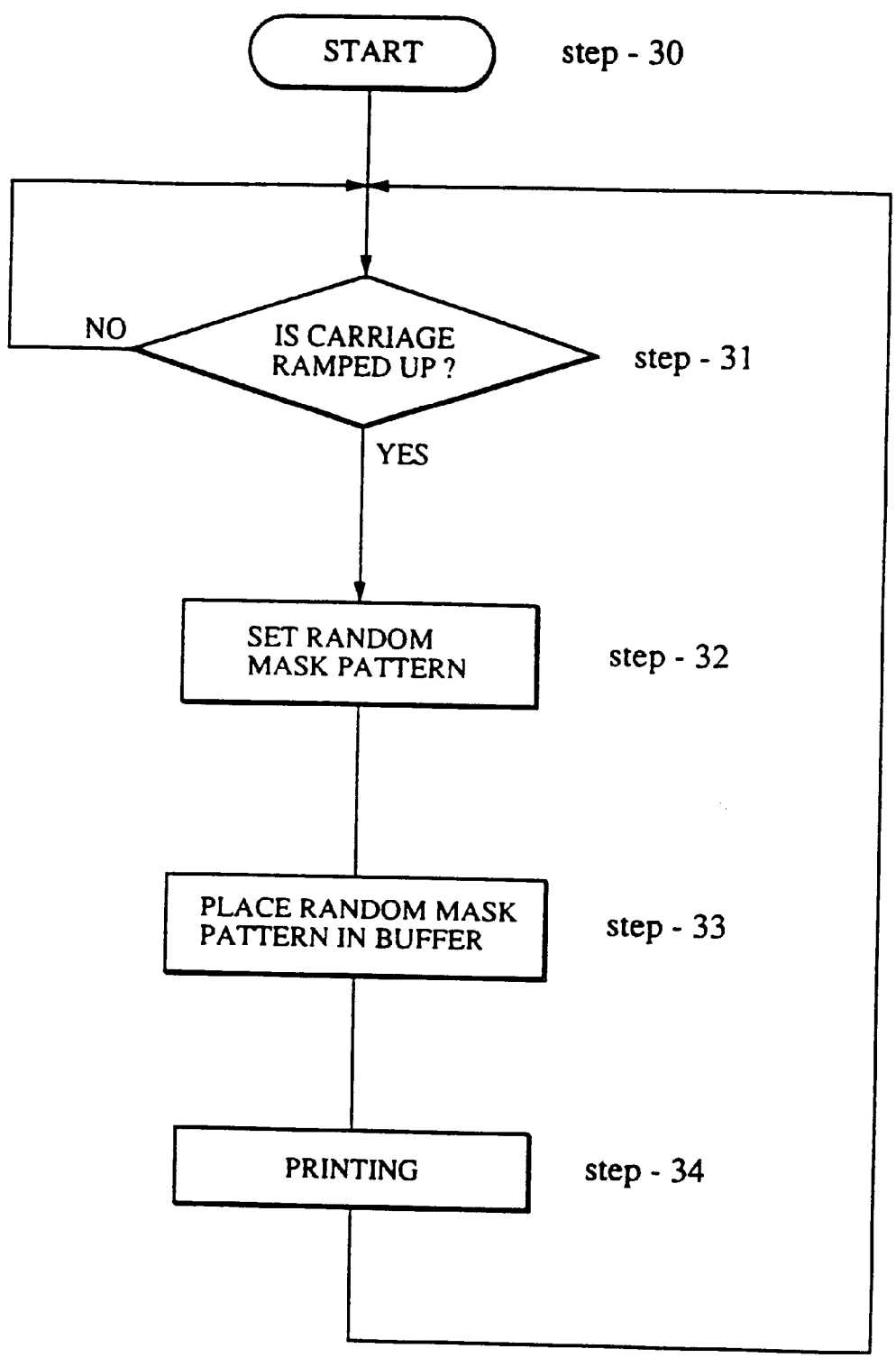
FIG. 6 shows a sequence of creating random masks and executing printing using the masks according to the third embodiment.

FIG. 6 shows a sequence of producing random masks which is executed by the CPU 11. This sequence is initiated, similarly to that in the first or second embodiment, when print data has been inputted. At step 31, it is confirmed that print data has been transmitted, and the carriage is ramped up. Random masks are then created at step 32. The masks are buffered at step 33. The print data in the print buffer is masked using the masks in step 33, and then printed at step 34.

Figure 7:
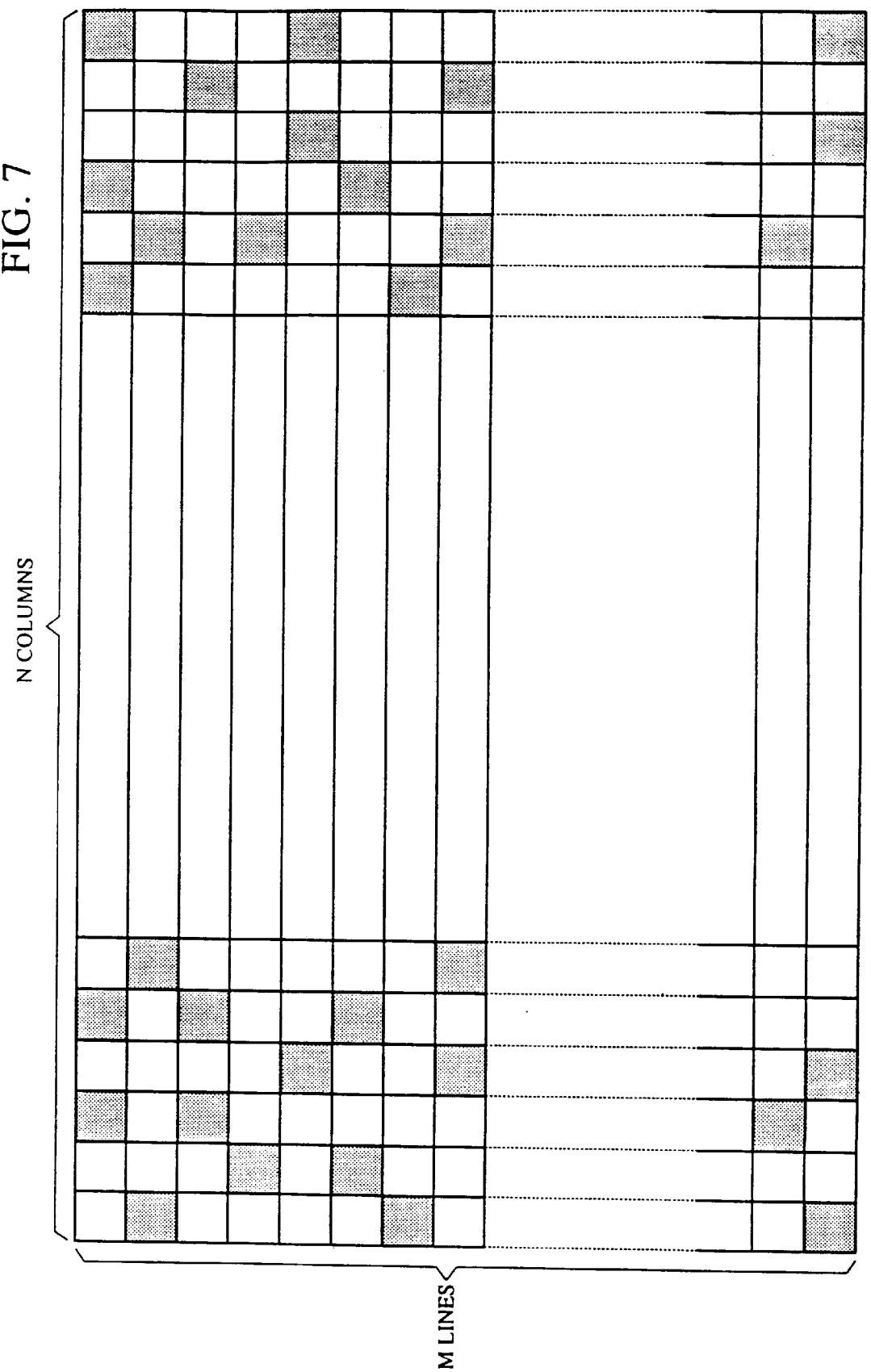
FIG. 7 shows a random mask having m lines and n columns.

FIG. 7 shows a random mask pattern having m lines and n columns. In this embodiment, unlike the first embodiment, pixel locations are not selected column by column at random. Random numbers are used to specify pixel locations for a whole matrix composed of m lines and n columns, whereby a mask is produced. For producing thinning-out masks each offering a print duty ratio of 25% for four-pass printing, a probability of generation of random numbers is set to ¼. All four masks may be produced using random numbers, which, however, cannot achieve 100% furnishing. In this embodiment, therefore, the first three masks are produced using random numbers and the fourth mask is produced so that pixels which have not been furnished by the three masks can be printed.

This enables 100% furnishing. However, the fourth mask is a thinning-out mask for use in printing at a duty ratio of 25% or higher. The three previous masks have been produced using random numbers, in which the same pixel location may be specified for printing though this probability is quite low. In this case, printing is therefore achieved at a duty ratio 100% or higher.

Normally, when a plurality of recording scans are performed, ink blots or soaks into a recording medium differently from that when recording is completed with only one scan. Optical density tends to deteriorate slightly. In this embodiment, since masks produced at random are used, the density drop can be minimized.

As mentioned above, when the ink-jet recording apparatus is used to perform multi-pass recording in which printing is achieved with a plurality of movements and recording scans, random masks each having m lines and n columns are produced for printing. Similarly to the first and second embodiments, periodicity of density nonuniformity can be eliminated. This embodiment is especially effective for printing using relatively large masks.

Fourth Embodiment

Next, the fourth embodiment will be described. The fourth embodiment provides a printing method in which random masks each having m lines and n columns, which have been described in the third embodiment, are used in combination with fixed masks selected at random, which have been described in the second embodiment.

Figure 8:
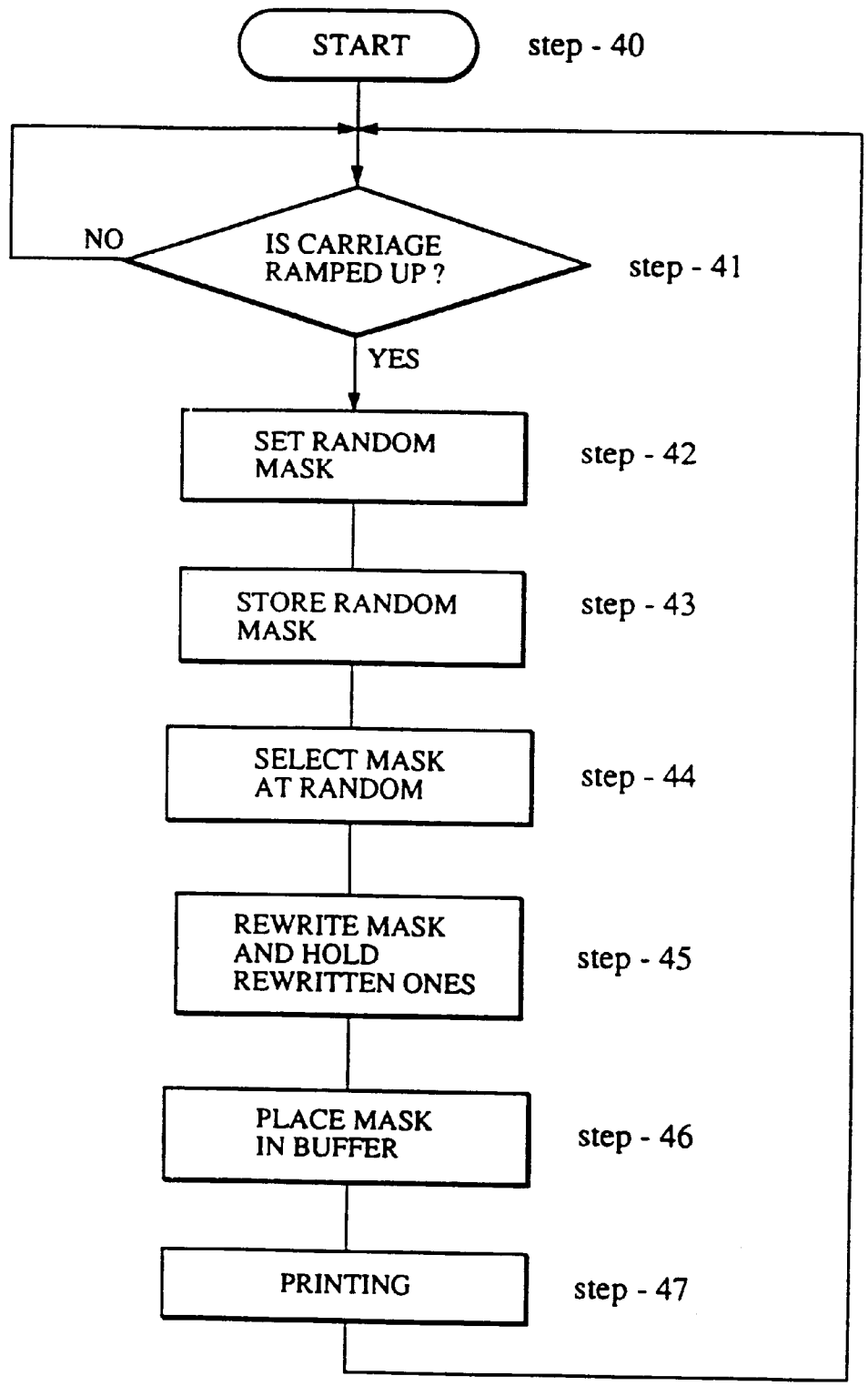
FIG. 8 shows a sequence of producing a random mask, selecting masks at random, and executing printing using the masks according to the fourth embodiment.

FIG. 8 shows a sequence of combining random masks and fixed masks which is executed by the CPU 11. This embodiment adopts thinning-out masks each offering a 25% print duty ratio for four-pass printing.

In FIG. 8, when the carriage is ramped up, a random mask having m lines and n columns is produced. The production sequence is the same as that in the third embodiment (steps 41 and 42). However, in this embodiment, a thinning-out mask offering a 50%-duty ratio is produced. The produced random mask is temporarily stored in a nonvolatile RAM or a memory realized with the RAM 13 at step 43. With the random mask stored, at step 44, thinning-out fixed masks each offering a 50% print duty ratio are created by executing the random mask selection mentioned in the second embodiment. The two kinds of masks are combined to produce thinning-out masks each offering a 25%-print duty ratio. The thinning-out masks each offering a 25%-print duty ratio are stored in a nonvolatile RAM or a memory realized with the RAM 13 at step 45. The stored random fixed masks are buffered at step 46. Print data in the print buffer is then masked using the buffered masks, and then printed at step 47.

Figure 9:
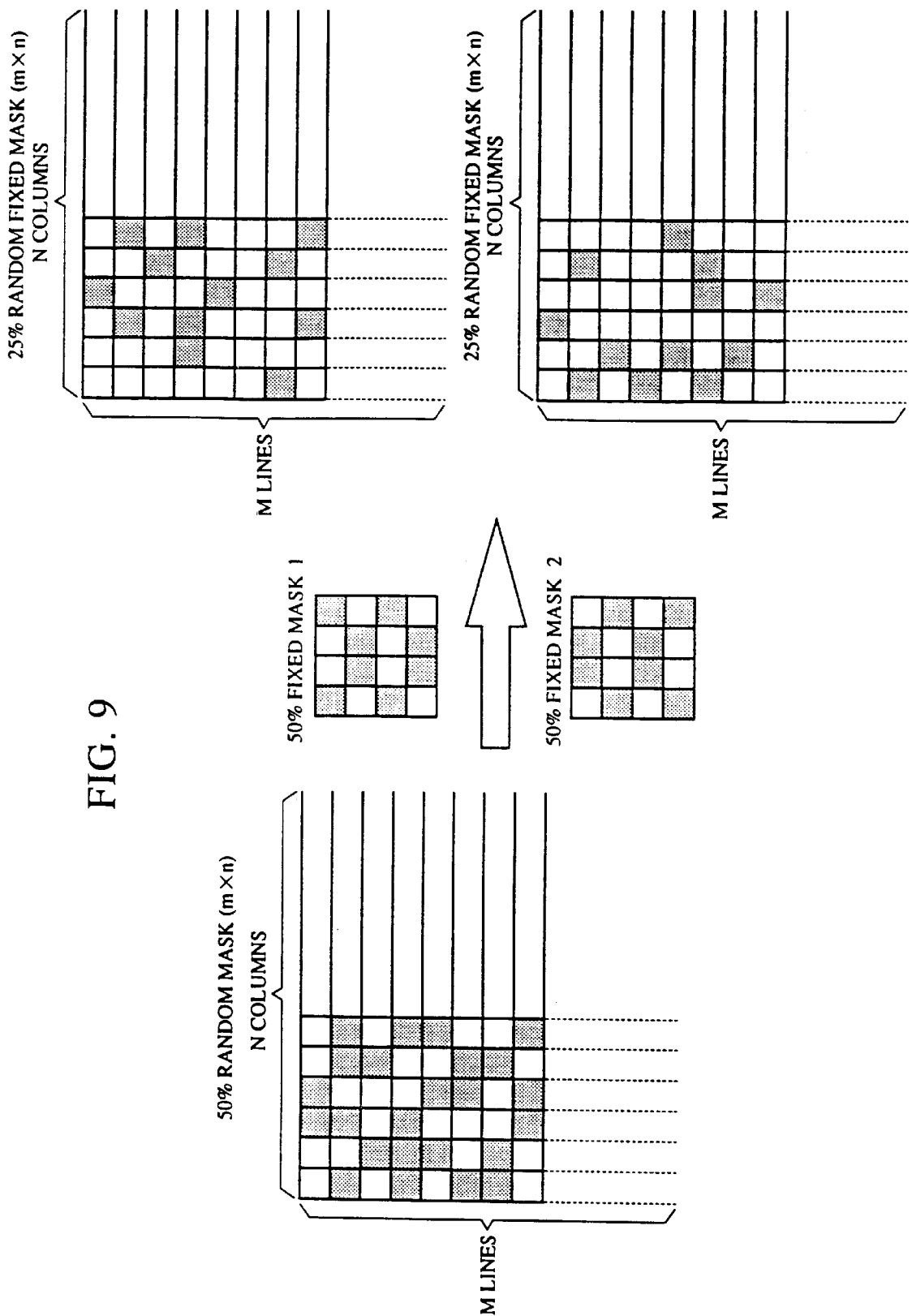
FIG. 9 is an explanatory diagram concerning creation of random fixed masks according to the fourth embodiment.

FIG. 9 shows the flow of producing masks. First, a random mask offering a 50%-print duty ratio and having m lines and n columns is produced using random numbers. This random mask is masked with two fixed masks each offering a 50%-print duty ratio, thus producing two random masks each offering a 25%-print duty ratio and having m lines and n columns. When a reverse pattern of the first random mask pattern offering a 50%-print duty ratio and having m lines and n columns is masked with the same fixed mask patterns, two other random masks each offering a 25%-print duty ratio and having m lines and n columns are produced. This procedure is not illustrated. Thus, a total of four masks are produced.

Using this embodiment, mask patterns offering different duty ratios can be produced using two kinds of masks; a random mask and fixed masks. Moreover, random fixed masks can be produced to have the randomness characteristic of random masks and the certainty characteristic of fixed masks in offering different printing duty ratios. When mere random masks are employed, an image produced may give a slight sense of coarseness due to irregularity though it depends on the mask patterns. The sense of coarseness on an image can be suppressed by combining a random mask with fixed masks.

Instead of fixed masks, masks expanded along lines or columns may be employed. Even this variant can suppress the sense of coarseness on an image.

Fifth Embodiment

Next, a pattern check feature for random masks will be described.

Figure 10:
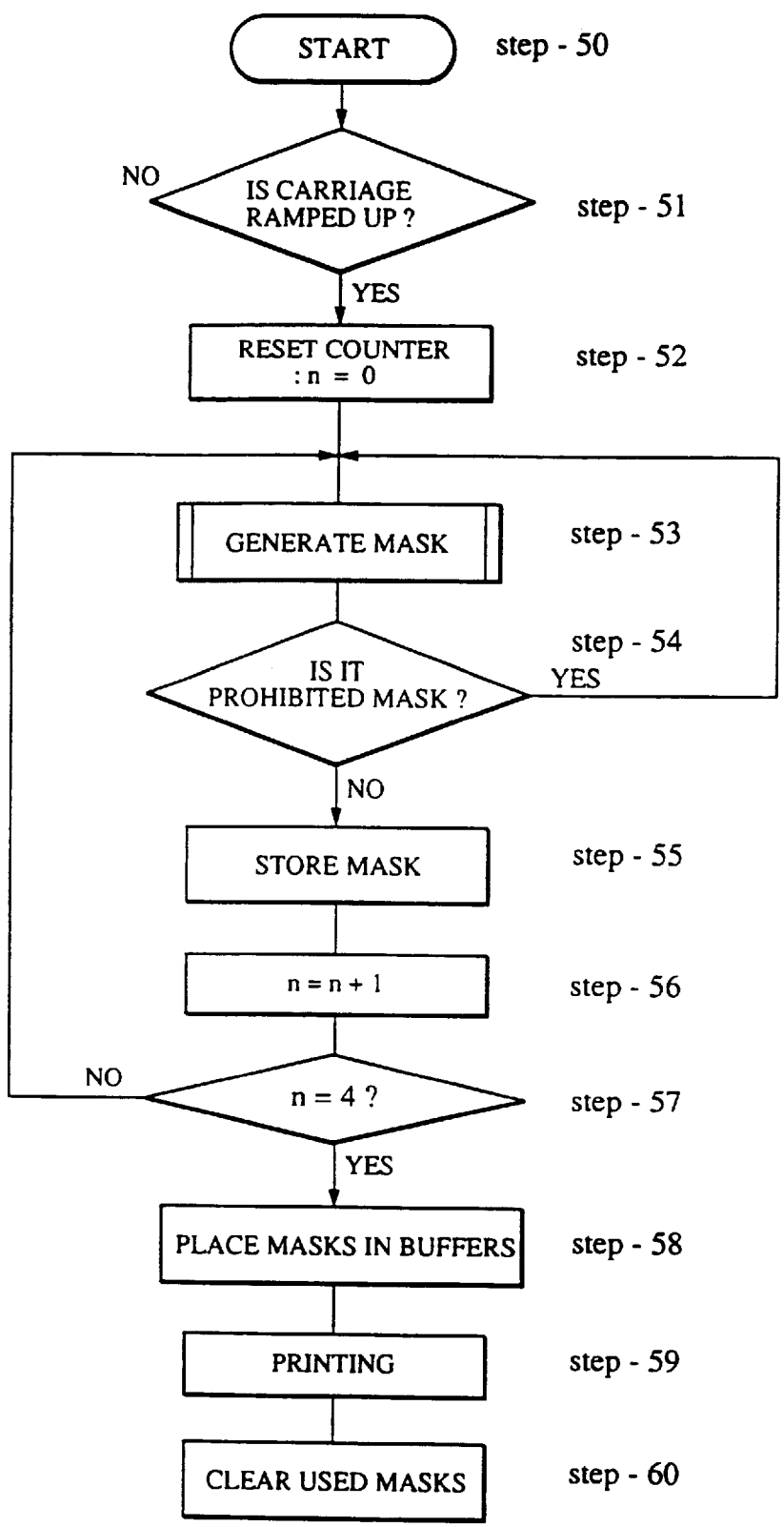
FIG. 10 shows a sequence implemented in the fifth embodiment having a mask pattern check feature.
Figure 15:
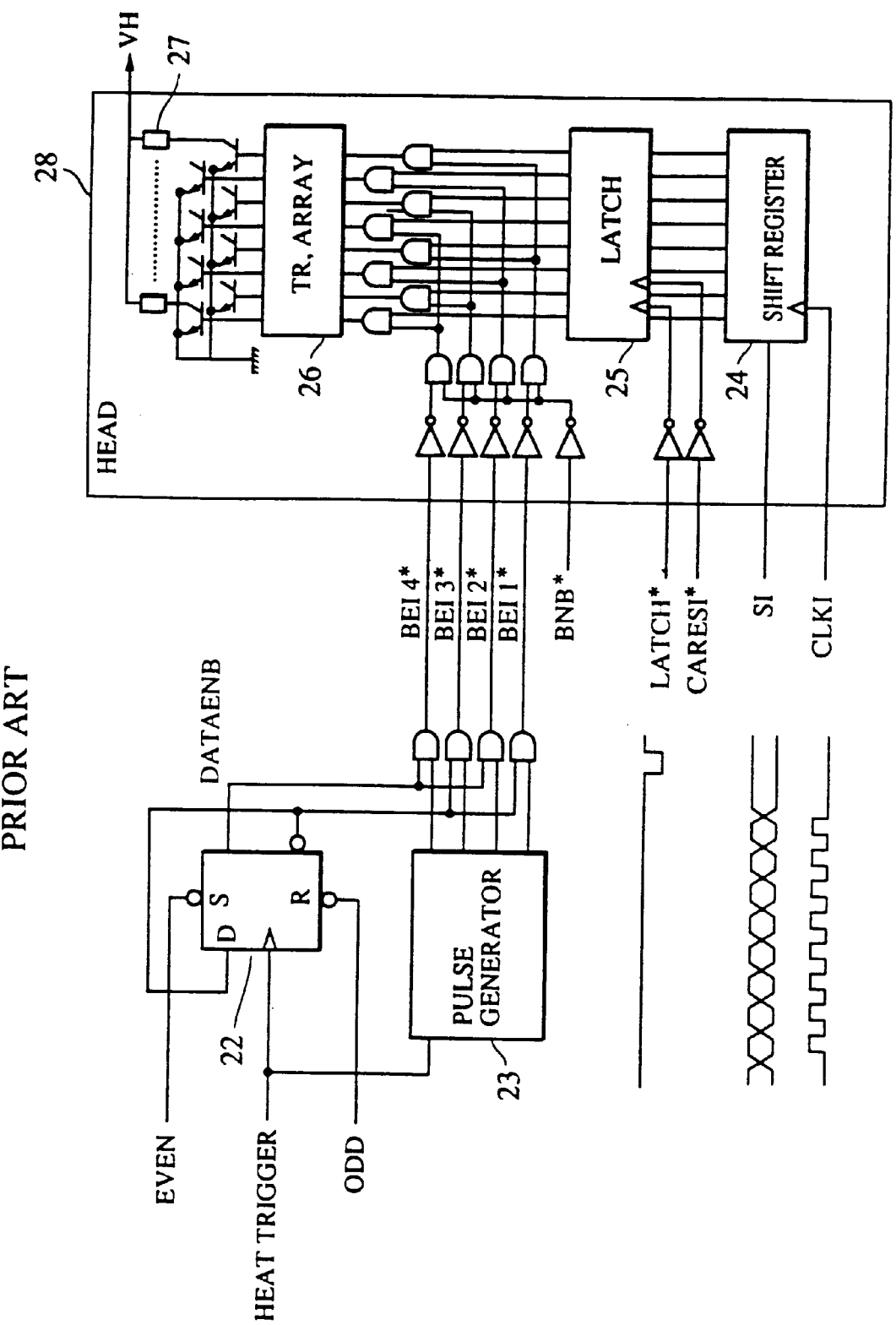
FIG. 15 shows an electric circuit for producing thinning-out masks according to the prior art.
Figure 16:
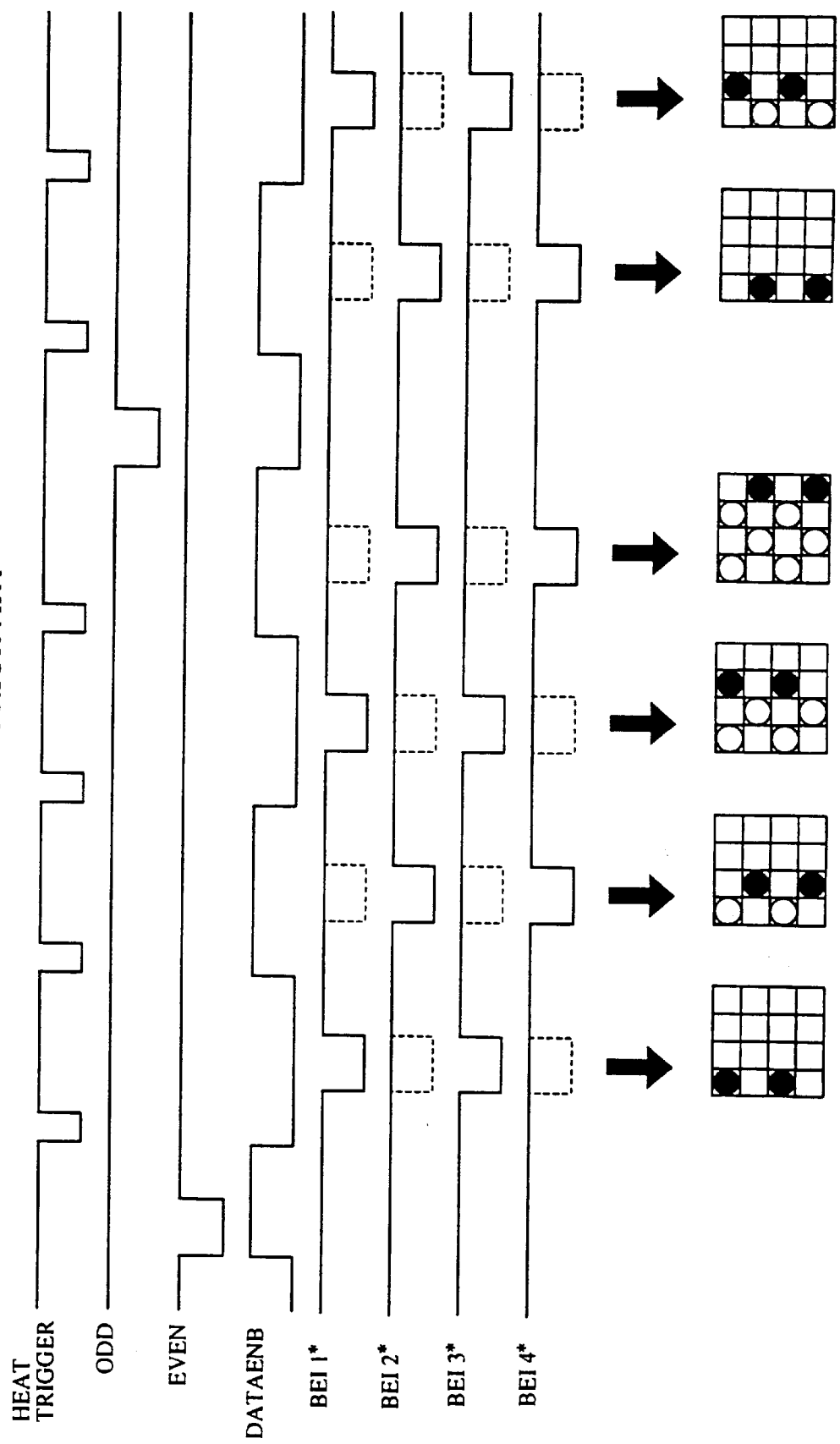
FIG. 16 is a timing chart concerning heat pulses according to the prior art.
Figure 17:
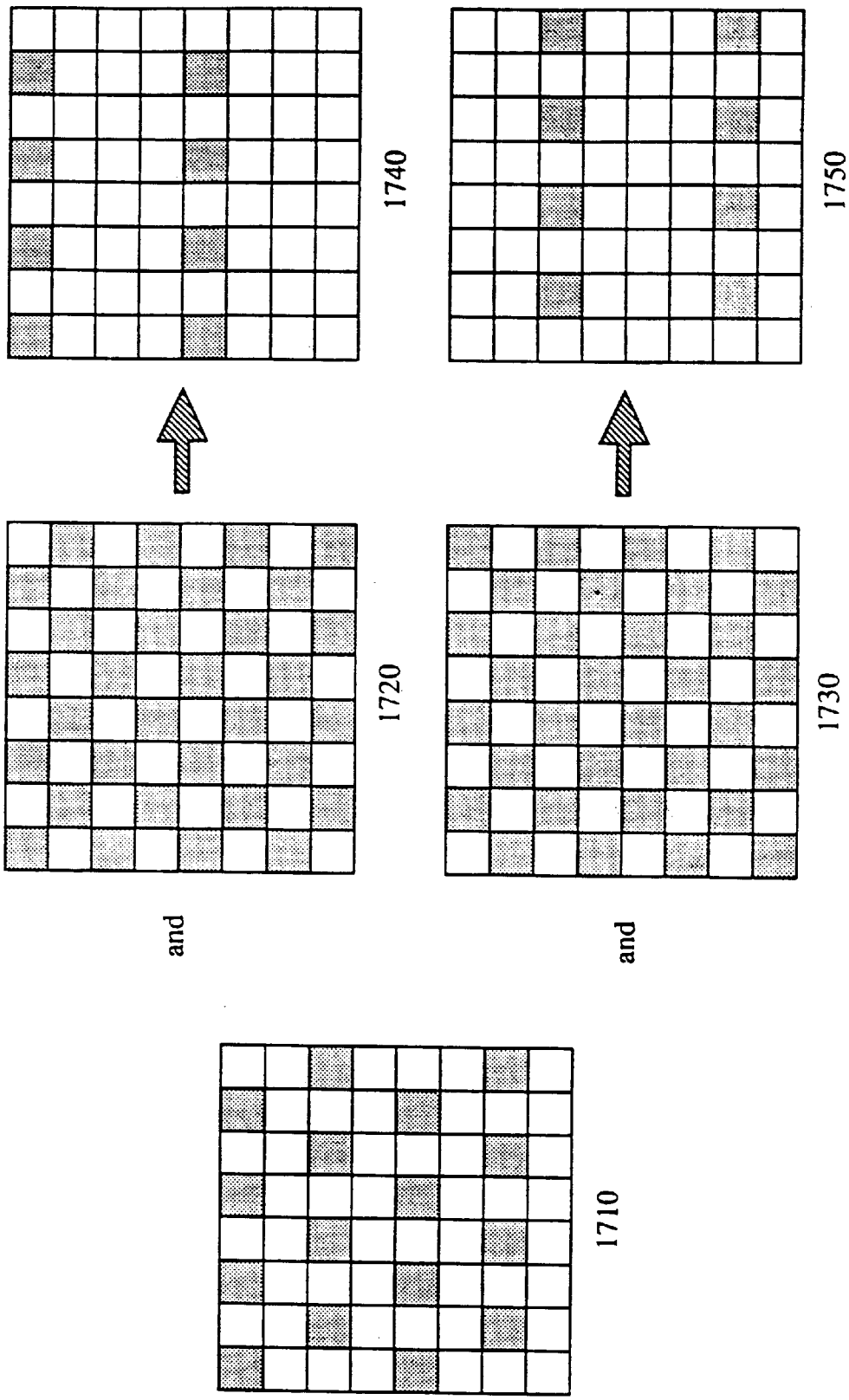
FIGS. 17, 18, and 19 show 25%-, 50%-, and 63%-thinned out data manipulated during conventional division printing and resultant print dots.
Figure 18:
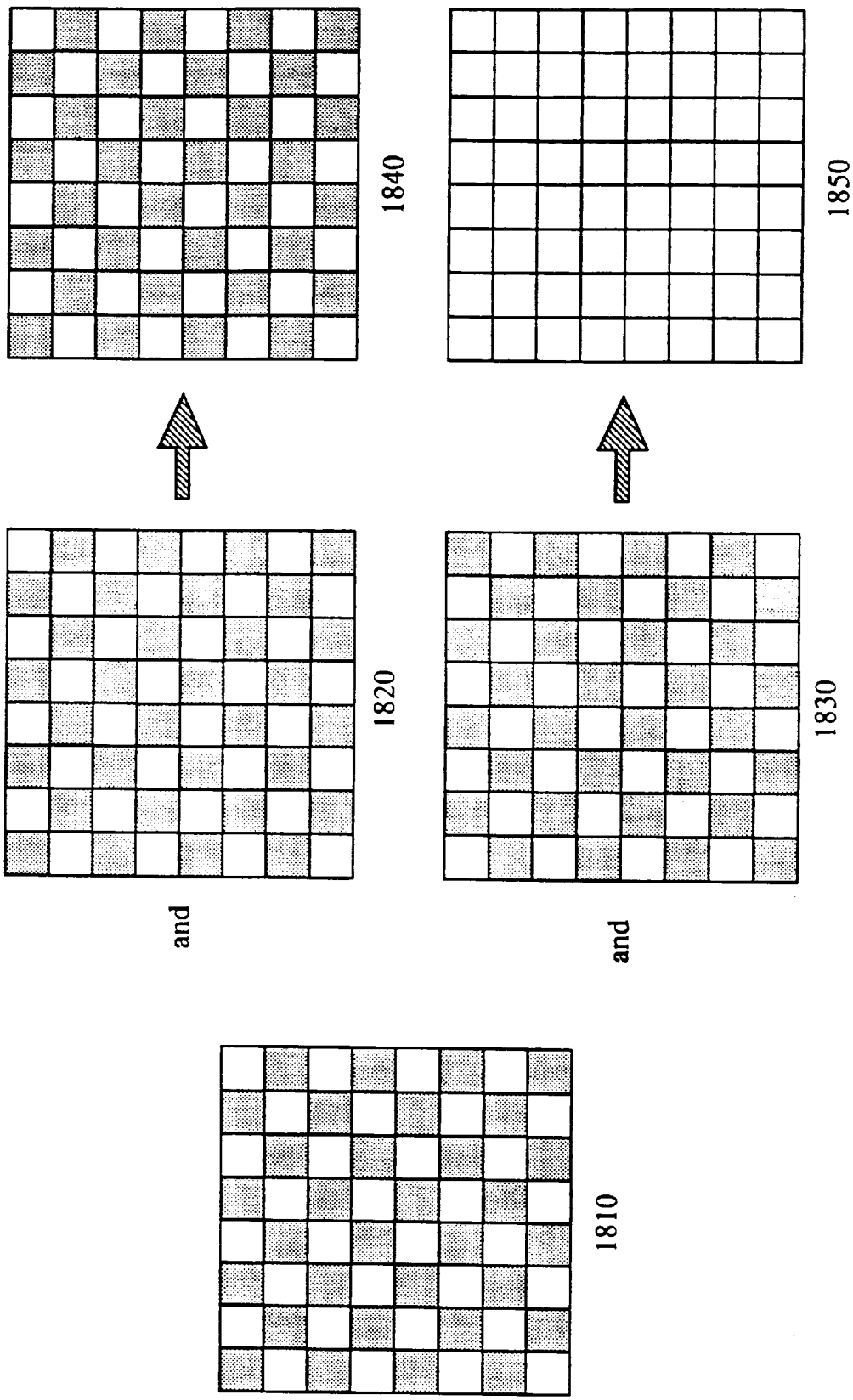
Figure 19:
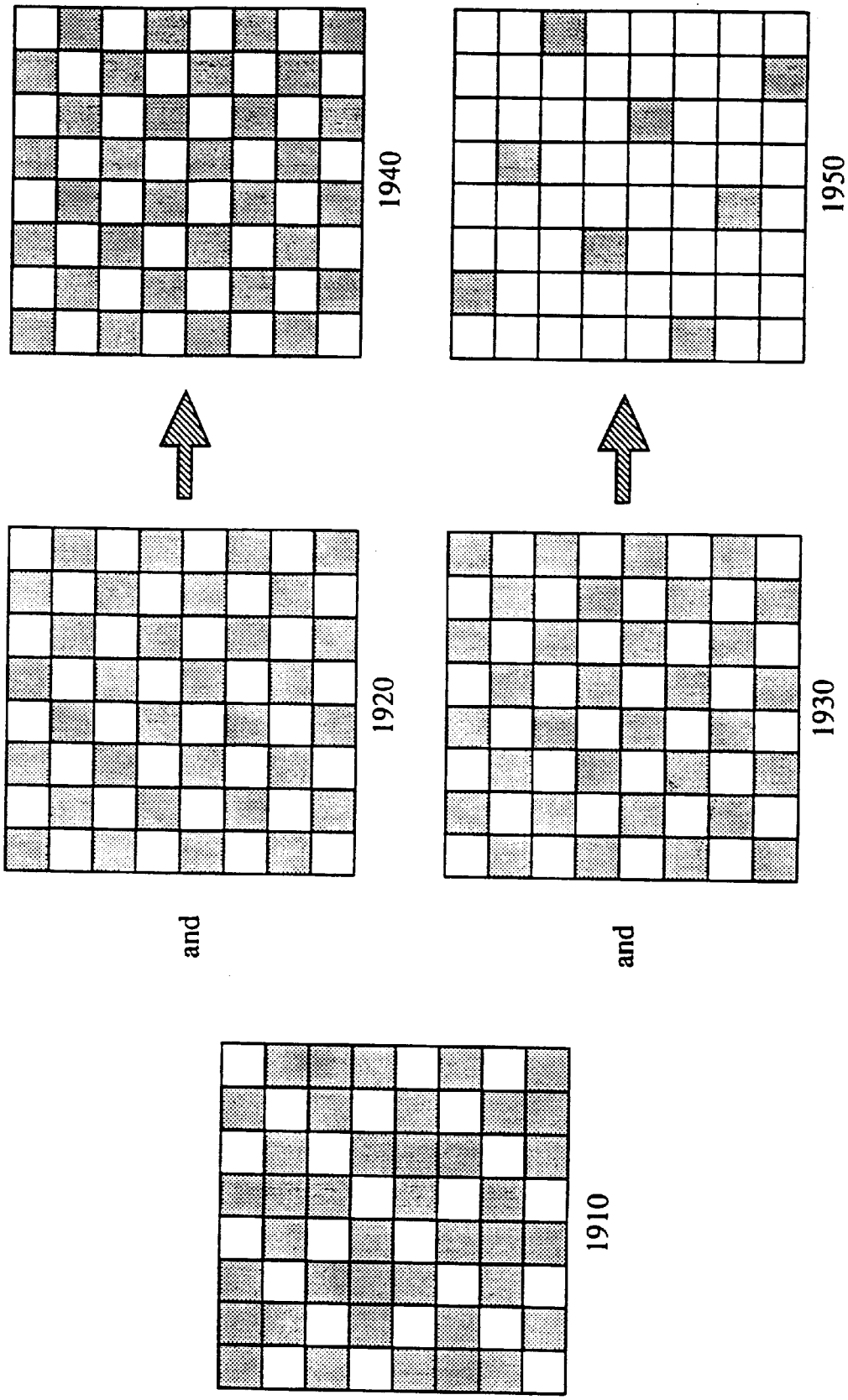
Figure 20:
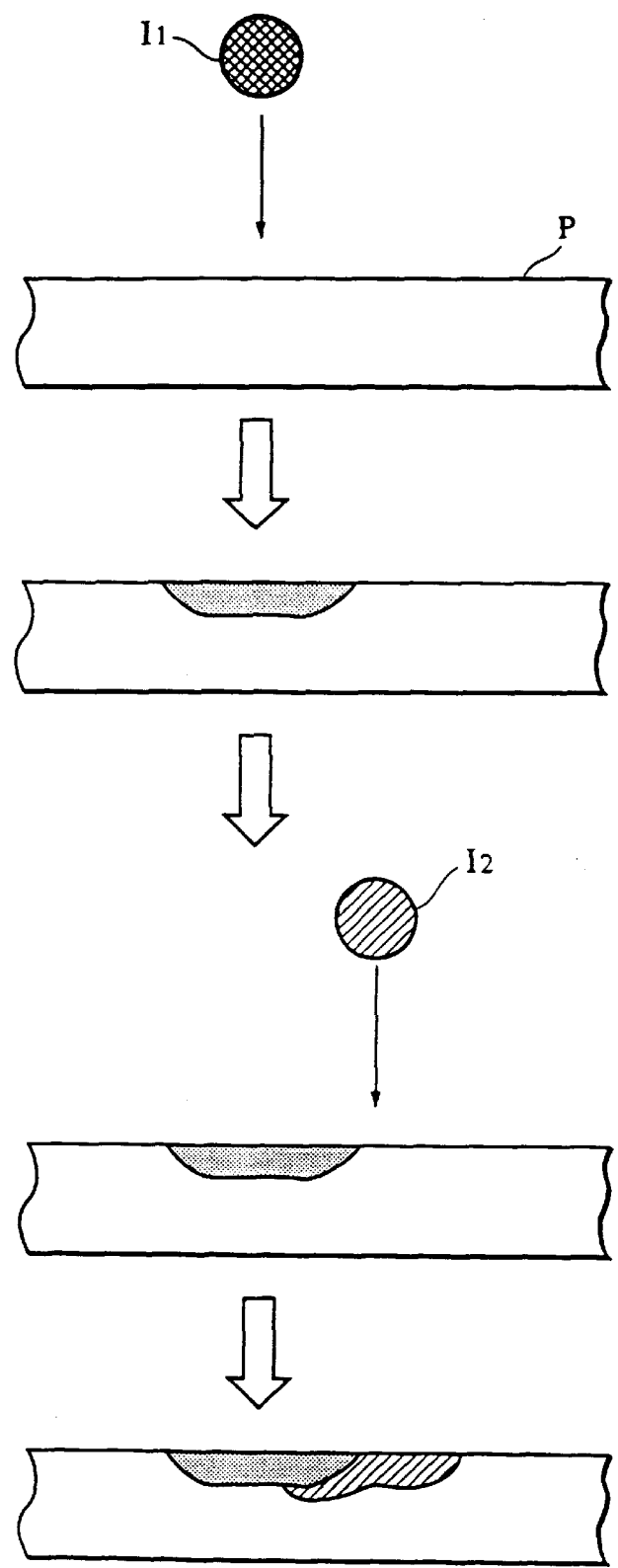
FIG. 20 is a sectional view showing two dots being superposed on a recording medium.

This embodiment includes a feature for preventing a mask produced using random numbers from being synchronous with print data. FIG. 10 shows a sequence executed by the CPU 11 using the pattern check feature. This sequence is a combination of the sequence in FIG. 1 with the processing by the pattern check feature.

Only the processing performed by the pattern check feature will be described and other processing will not. Pattern check is such that immediately after a mask is produced at step 53, before the mask is stored at step 54, it is checked if the mask is consistent with a prohibited mask which has been pre-set. If the masks are consistent with each other, control is returned to a step of mask pattern production. Another mask is then produced. The prohibited mask is a mask liable to get synchronous with print data, such as a checker-pattern or inverse-checker pattern mask described in conjunction with FIG. 14. Thus, when a random mask is produced, the mask can offer more reliable randomness.

Sixth Embodiment

Figure 26:
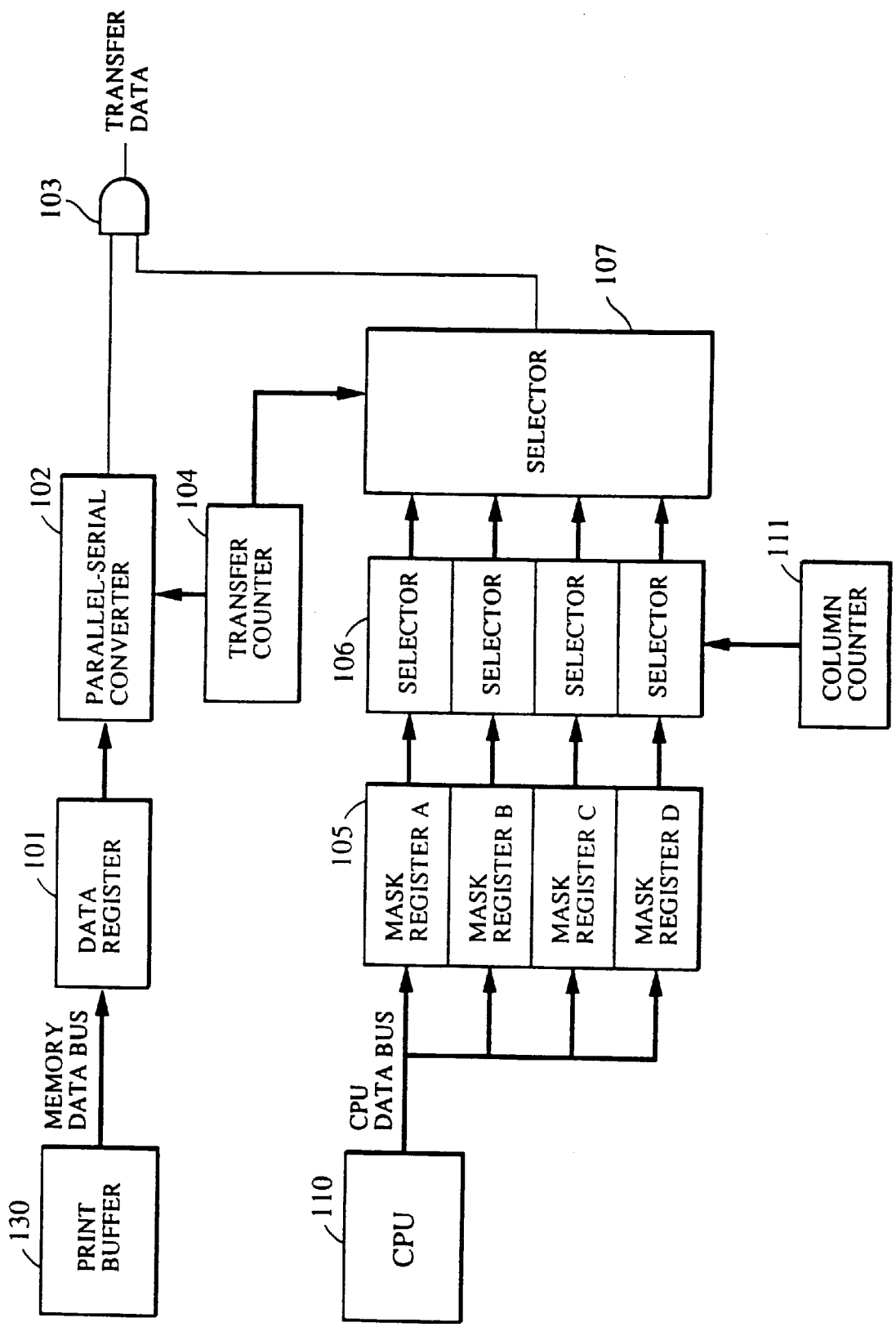
FIG. 26 is a block diagram showing circuit elements of a data transfer circuit according to the sixth embodiment of the present invention.

FIG. 26 is a block diagram showing circuit elements of a data transfer circuit in which the present invention is implemented. In FIG. 26, 101 denotes a data register connected over a memory data bus and designed to temporarily store print data read from a print buffer 130 in a memory (equivalent to the RAM 13 in FIG. 23). Numeral 102 denotes a parallel-serial converter for converting the data stored in the data register 101 into serial data, 103 denotes an AND gate for masking serial data and 104 denotes a counter for use in managing the number of data transfers.

Reference numeral 105 denotes a register connected to a CPU 110 (equivalent to the CPU 11 in FIG. 23) over a CPU data bus and designed to store masks. Numeral 106 denotes a selector for specifying a column position in a mask, 107 denotes a selector for specifying a line position in a mask and 111 denotes a counter for use in managing column positions.

The data transfer circuit shown in FIG. 26 transfers 128-bit print data to the recording head in a serial transfer mode in response to a print command signal sent from the CPU 110. Print data stored in the print buffer 130 in the memory is temporarily stored in the data register 101 and converted into serial data by the parallel-serial converter 102. The converted serial data is masked by the AND gate 103, and then transferred to the recording head. The transfer counter 104 counts the number of transferred bits and terminates data transfer when it has counted 128 transferred bits.

The mask register 105 consists of four mask registers A, B, C, and D, and stores masks written by the CPU 110. Each of the registers A, B, C, and D stores a mask of four bits high and four bits wide. The selector 106 receives a count value of the column counter 111 as a select signal and selects mask data associated with the column position represented by the select signal. The selector 107 receives a count value of the transfer counter 104 as a select signal and selects mask data associated with the line position represented by the select signal. The AND gate 103 masks transferred data using the mask data selected by the selectors 106 and 107. The 4-by-4 masks stored in the registers A to D in the register 105 are specified eight times or set in eight storage areas equivalent to a depth of 32 bits by means of the selector 106, and then specified repetitively or set in consecutive storage areas equivalent to one line by means of the selector 107.

In this embodiment, masked transfer data is supplied directly to the recording head. Alternatively, the masked transfer data may be placed temporarily in the print buffer.

Seventh Embodiment

Next is a printing method in which random masks are specified for each print area and displaced for each pass.

Figure 27:
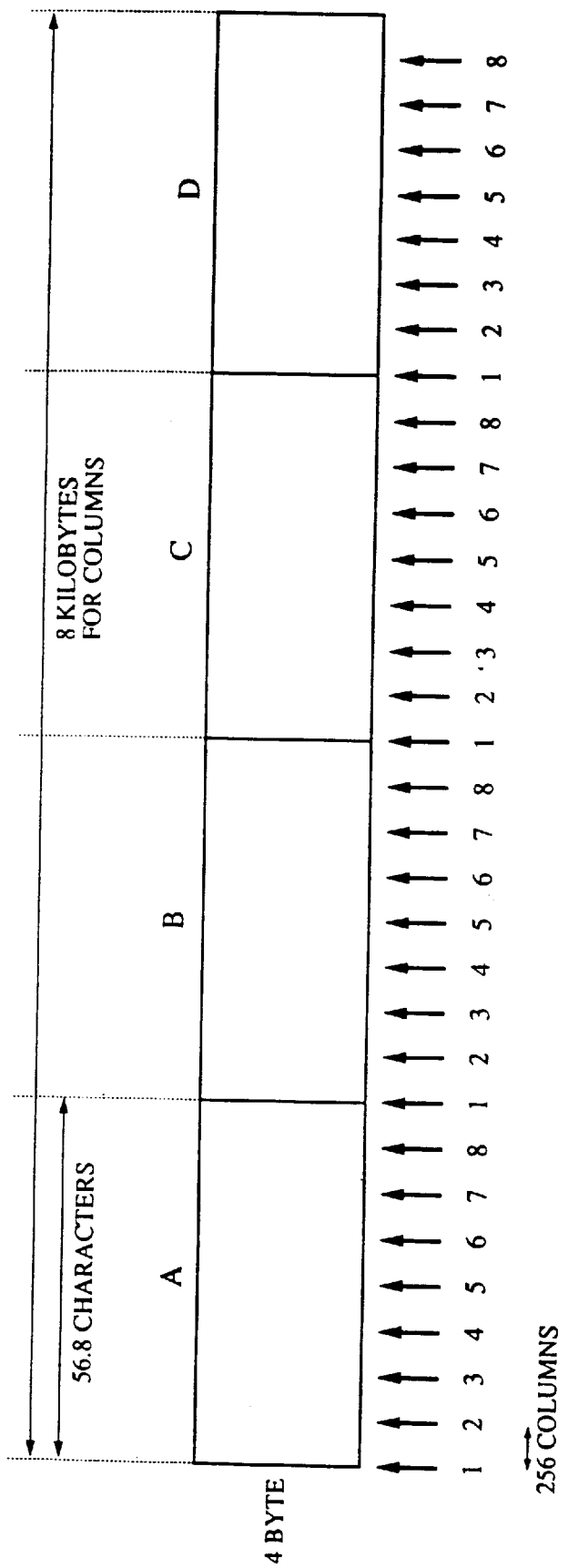
FIG. 27 shows a random mask according to the seventh embodiment.

FIG. 27 shows random masks employed in this embodiment.

This embodiment employs masks each having a data size of 2 kilobytes (4 bytes along columns by 8 kilobytes along rasters). The masks are used for four-pass printing. Since the random masks in this embodiment are designed for four-pass printing, they are dedicated to areas A, B, C, and D. The four masks are concatenated to produce a single mask. The random masks are recorded in the RAM 13. Read-out positions (pointers) can be set freely. Moreover, the pointers can be displaced for each print area.

Figure 28:
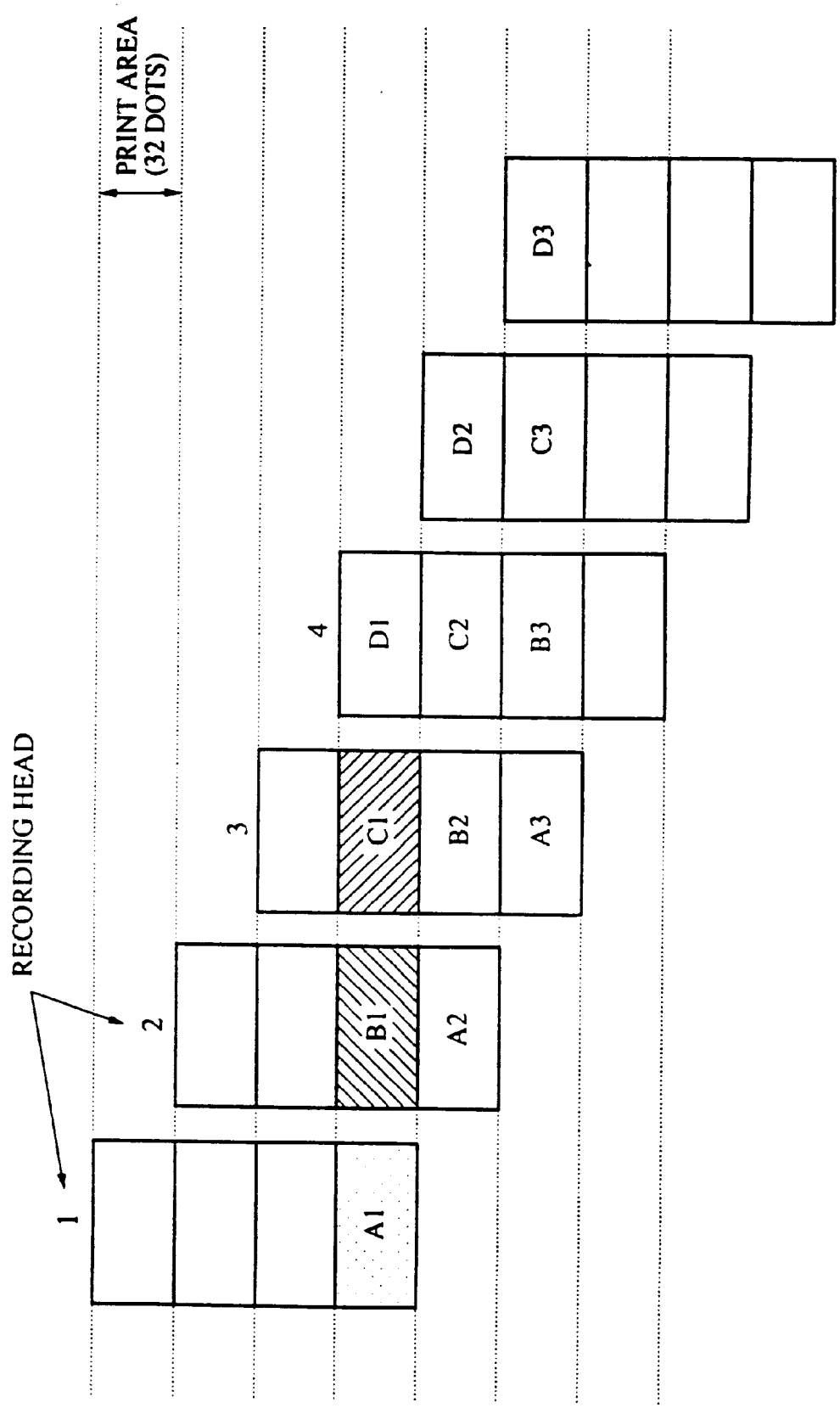
FIG. 28 shows a recording head positioned at consecutive print areas and masks employed according to the seventh embodiment.

FIG. 28 shows a moving recording head and masks employed for respective print areas. During the first recording scan, a mask A1 is used for printing. During the subsequent recording scans, masks B1, C1, and D1 are used for printing. Thus, recording is completed. The mask A1 corresponds to a mask allocated to an area A in FIG. 27, of which pointer points to a position 1. Similarly, the masks B1, C1, and D1 correspond to masks allocated to areas B, C, and D in FIG. 27, of which pointers point to positions 1. For the next print area, masks A2, B2, C2, and D2 are employed. The pointers of the masks A2, B2, C2, and D2 point to positions displaced from those pointed to by the pointers of the previous masks. The displacement can be set to any value. In this embodiment, the displacement between adjoining print areas is 256 columns. The pointers return to the same positions every nine recording scans. The masks applied to two neighboring print areas look as if they were originated from different masks. With this mask displacement, the advantage provided by using different masks can be gained merely by displacing the pointers of sub-masks forming a single mask.

Figure 29:
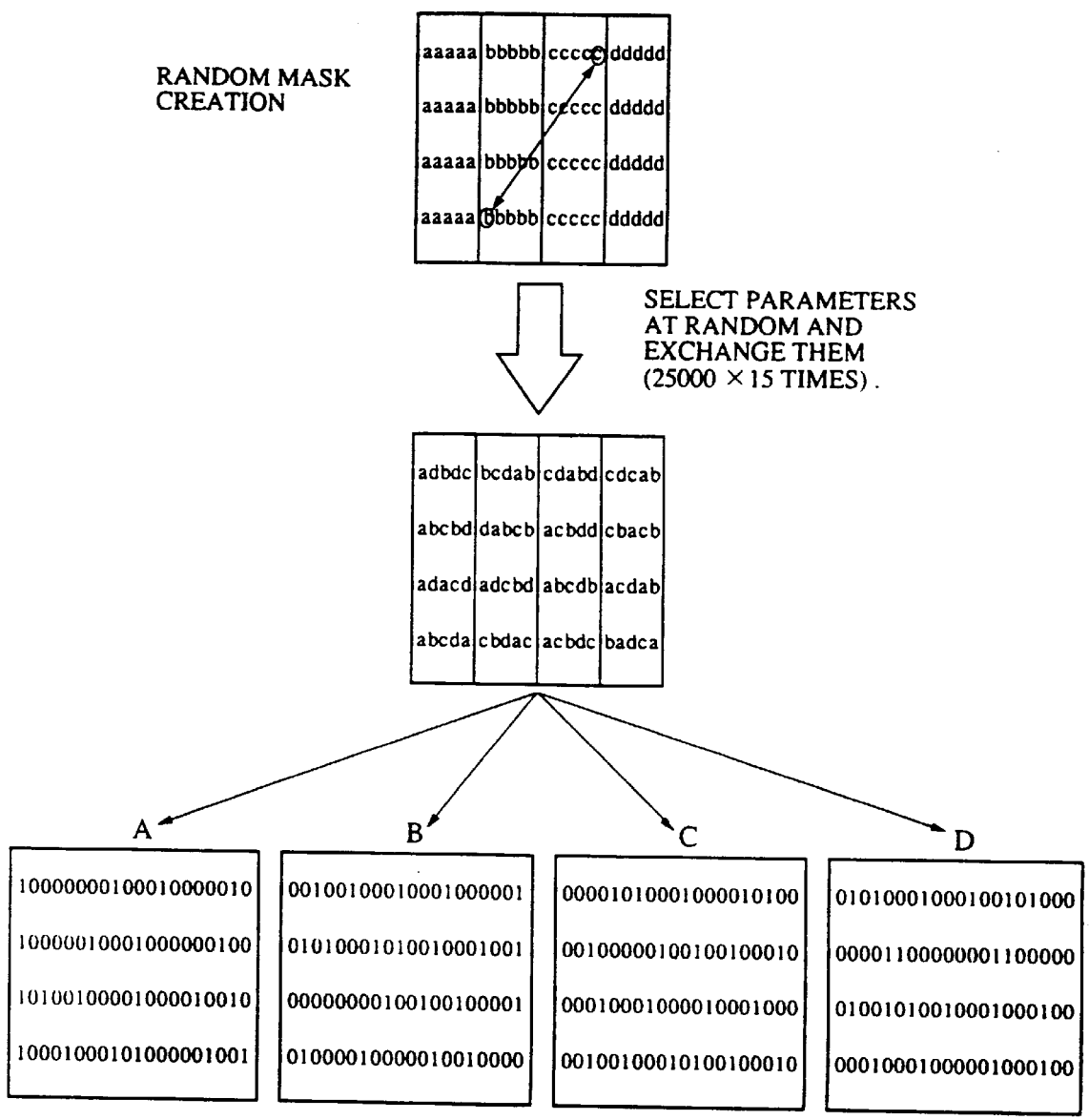
FIG. 29 is a block diagram showing creation of random masks according to the seventh embodiment.

Next, a random mask production sequence will be described. FIG. 29 is a block diagram showing random mask production. This embodiment is concerned with four-pass printing. First, a mask of a specific size is created and filled with the same numbers of four kinds of parameters (a, b, c, and d). Two of the parameters are exchanged with each other using random numbers. This exchange is repeated a plurality of times in order to produce a mask in which the parameters of different kinds are allocated at random. The exchange frequency can be set to any value as long as a mask to be produced has randomness. In this embodiment, the exchange frequency is set to a product of 25000 by 15 times.

The random array mask of parameters is stored in the ROM 12. Based on the mask, thinning-out masks are created. For example, the parameters a, b, c, and d are associated with masks A, B, C, and D. Bits positioned at the locations of associated parameters are turned on, thus creating a mask. Since the parameters are allocated at random, a created mask is a random mask of a random array. Furthermore, since a single mask is used to create various masks, the created random masks enable 100% furnishing without fail. This sequence is executed by the CPU 11. Created masks are stored in the RAM 13 for future use.

Figure 30:
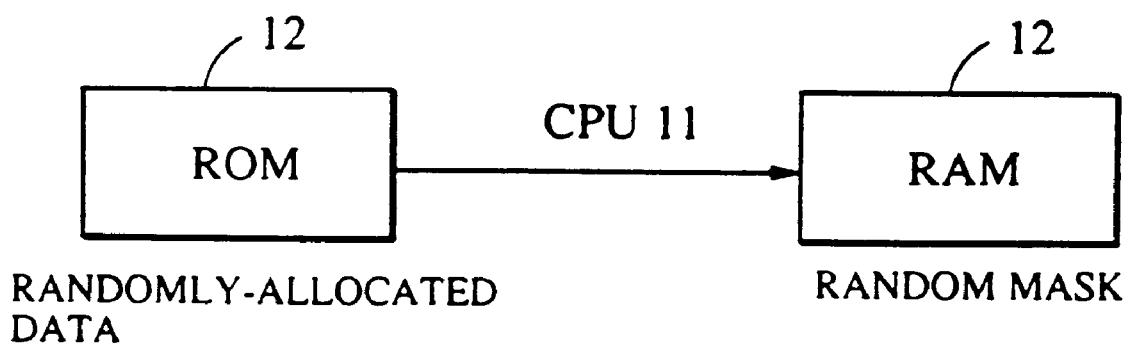
FIG. 30 is a block diagram showing the relationships among a CPU, a ROM, and a RAM in the seventh embodiment.

FIG. 30 shows the relationships among the CPU 11, ROM 12, and RAM 13. When a printer itself executes the above sequence, a random array of data is stored in the ROM 12. With power on, the aforesaid random masks are created and stored in the RAM 13 as they are. When the carriage is ramped up for each recording scan, a random mask is read from the RAM 13. The read random mask and print data in the print buffer are ANDed for printing.

In creation of random masks, masks can be varied depending on print modes. For example, the same random array of data is used to create random masks for two-pass printing, four-pass printing, and eight-pass printing. Applicable print modes are determined by the number of kinds of parameters used to structure the random array of data (four kinds in FIG. 29). Assuming that 24 kinds of parameters (for example, 0 to 23) are used to structure data, random masks based on the data are applicable to print modes determined with the numbers of passes corresponding to the divisors of 24. That is to say, when a divisor 2 of 24 is concerned, two random masks are created in association with parameters 0 to 11 and 12 to 23, and applicable to a print mode determined with two passes. When a divisor 3 of 24 is concerned, three random masks are created in association with parameters 0 to 7, 8 to 15, and 16 to 23, and applicable to a print mode determined with three passes. The same applies to divisors 4, 6, 8, 12 and 24.

In the above description, one parameter is associated with one mask. Alternatively, a plurality of parameters may be associated with one mask. This enables not only furnishing at 100% or higher but also double printing at a certain ratio. Moreover, the furnishing ratio can be incremented at a certain rate dependent on the number of kinds of parameters. In the above example in which 24 kinds of parameters are employed, when two random masks are created in association with parameters 0 to 15 and 8 to 23, the furnishing ratio is 133%. When two random masks are created in association with parameters 0 to 17 and 6 to 23, the furnishing ratio is 150%.

As described above, in this embodiment, a random array of data residing in the ROM 12 is used to create random masks. The random masks are stored in the RAM 13, and then read therefrom for printing. The read-out positions of the random masks are displaced between respective print areas. The random masks in neighboring print areas look as if they were originated from different masks. Thus, random masks can be used more effectively because of their asynchronism with print data.

According to the aforesaid first to seventh embodiments, a plurality of random masks each defining a random array of non-print pixel locations and print pixel locations are created, or masks are selected at random. Thinning-out masks will therefore lose periodicity. Consequently, an image produced is unaffected with the periodicity of density nonuniformity resulting from unequal numbers of print pixels to be printed in the same print area during several passes of conventional multi-pass printing. Thus, high-definition images can be produced.

Eighth Embodiment

Next, the eighth embodiment will be described in conjunction with the drawings. In an ink-jet recording apparatus of the eighth embodiment, masks are specified for each print area in order to produce an image. The print area means a division in a recording scan direction of an area recordable during one scan. In this embodiment, the area recordable during one scan is divided into four portions.

Recording accompanied by creation of masks for each print area will be described in conjunction with FIG. 31. This embodiment adopts four-pass printing in which recording of one print area is completed by performing recording scan four times. Masks employed are 4-by-4 thinning-out masks each offering a 25%-print duty ratio. Whether or not a pixel is printed is specified for each pixel locations in each mask. First, the first print area is recorded using a mask A-1 during the first recording scan. Next, the first print area is recorded using a mask A-2 during the second recording scan. At the same time, the second print area is recorded using a mask B-1 different from those for the first print area. During the third recording scan, the first print area is recorded using a mask A-3, the second print area is recorded using a mask B-2, and the third print area is recorded using a mask C-1 different from those for the second print area. During the fourth record scan, the first print area is recorded using a mask A-4 and thus recording of the first print area is completed. Similarly, recording of the second print area is completed with masks B-1, B-2, B-3, and B-4. Recording of the third print area is completed with masks C-1, C-2, C-3, and C-4. Recording of the fourth print area proceeds using masks D-1, D-2, and D-3.

As mentioned above, different masks are used to record each print area. In this embodiment, four kinds of masks are employed. The same masks are shared between the first and fifth print areas, and the same masks are shared between the second and sixth print areas. Depending on the number of kinds of masks created, print areas to be recorded using the same masks may be located closely to each other or separated from each other by several lines. By changing the number of kinds of masks retained, the number of print areas to be recorded using the same masks can be controlled.

FIGS. 32(A)–32(D) show an example of four kinds of masks employed in this embodiment. In FIGS. 32(A)–32(D), each mask is a 4-by-4 thinning-out mask offering a 25%-print duty ratio. Masks A-1, A-2, A-3, and A-4 are grouped together for use in recording a single print area. Masks B-1, B-2, B-3, and B-4 are grouped together. Masks C-1, C-2, C-3, and C-4 are grouped together. Masks D-1, D-2, D-3, and D-4 are grouped together. These mask groups provide different arrays of dots to be printed.

Figure 33:
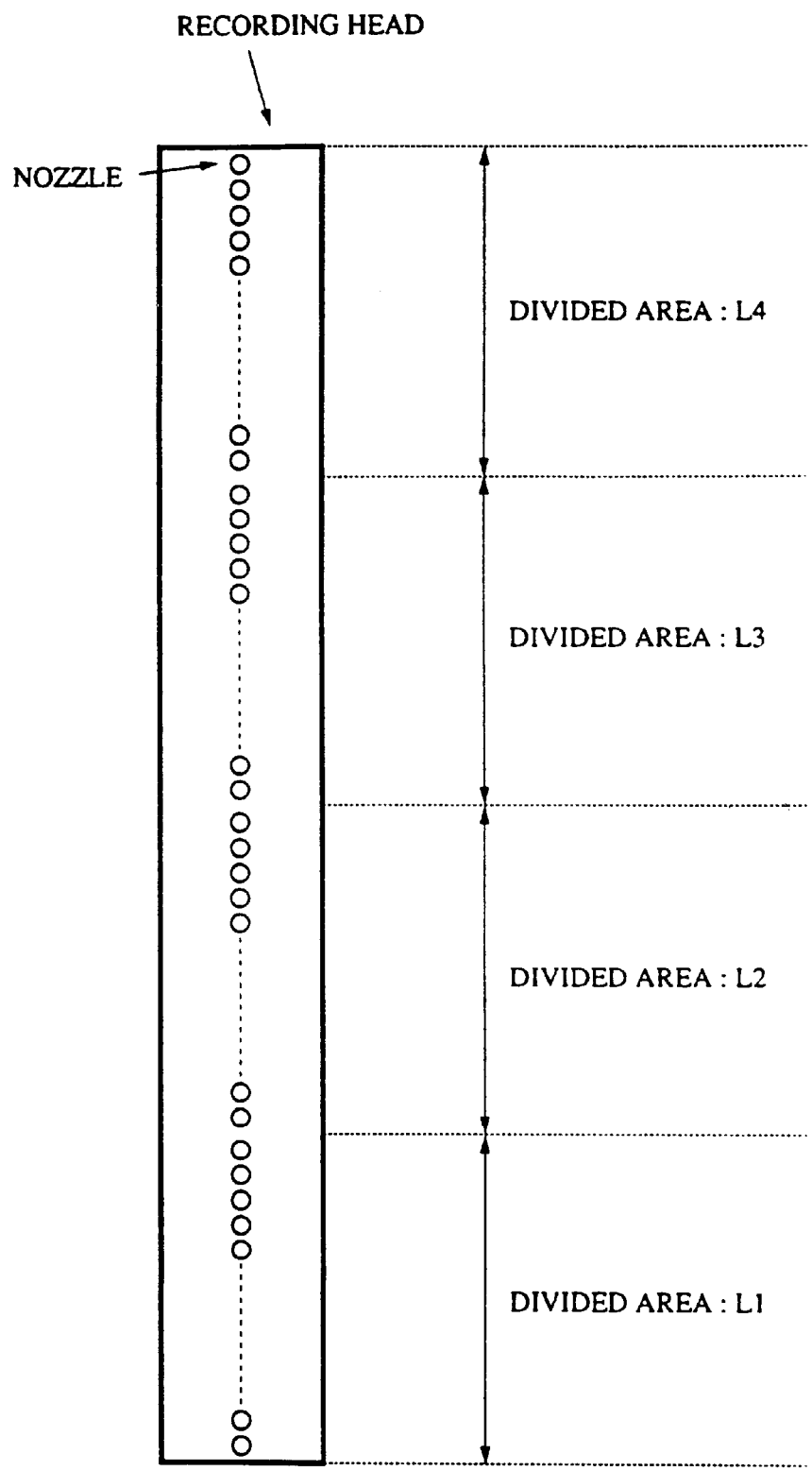
FIG. 33 is an explanatory diagram concerning segments of a recording head correspondent with print areas according to the eighth embodiment.

The recording head for which masks are set will be described in conjunction with FIG. 33. The recording head shown in FIG. 33 has a plurality of nozzles each of which can be used for printing. This embodiment adopts four-pass printing. The nozzles in the recording head are therefore grouped into four divided areas. The divided areas are indicated by L1, L2, L3, and L4. Different masks can be set independently for the divided areas. For example, during the fourth recording scan shown in FIG. 1, mask A-4 is set for divided area L4, mask B-3 is set for divided area L3, mask C-2 is set for divided area L2, and mask D-1 is set for divided area L1. During the fifth recording scan, mask B-4 is set for divided area L4, mask C-3 is set for divided area L3, mask D-2 is set for divided area L2, and mask A-1 is set for divided area L1. Thus, different masks are set independently for respective divided areas.

Figure 34:
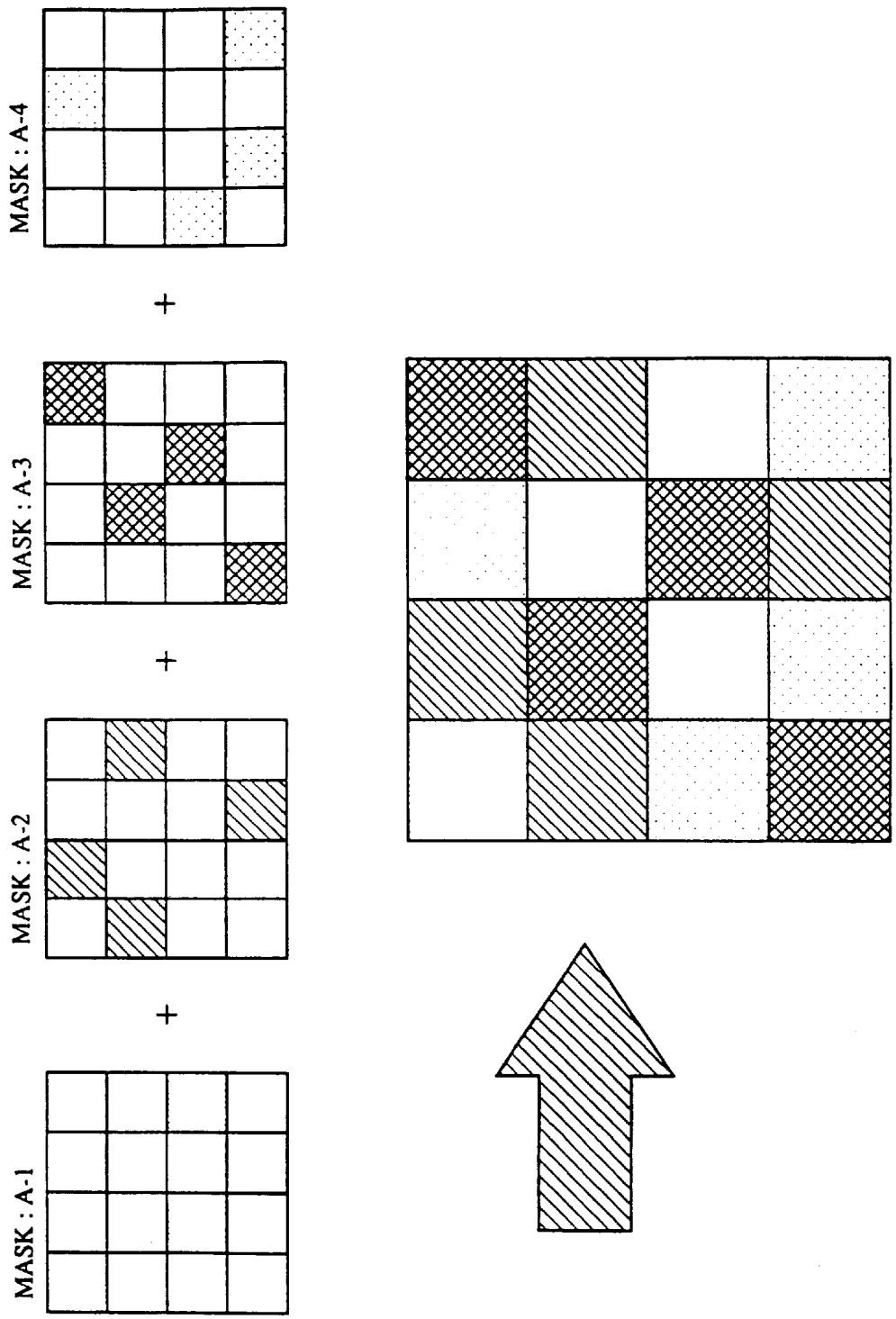
FIG. 34 is an explanatory diagram showing 100% furnishing using four 4-by-4 masks in the eighth embodiment.

The 4-by-4 thinning-out masks each offering a 25%-print duty ratio shown in FIGS. 32(A)–32(D) can furnish a certain print area, which will be described using FIG. 34. In FIG. 34, masks A-1, A-2, A-3, and A-4 are employed. The printable pixel locations differ among four masks. A print area is not furnished 100% until all the four masks have been applied. Any printable pixel location in one mask is not duplicated in another mask pattern. The above relationships among four masks is true for the other mask groups. Masks used for a single print area achieve 100% furnishing but are not duplicate.

Figure 35:
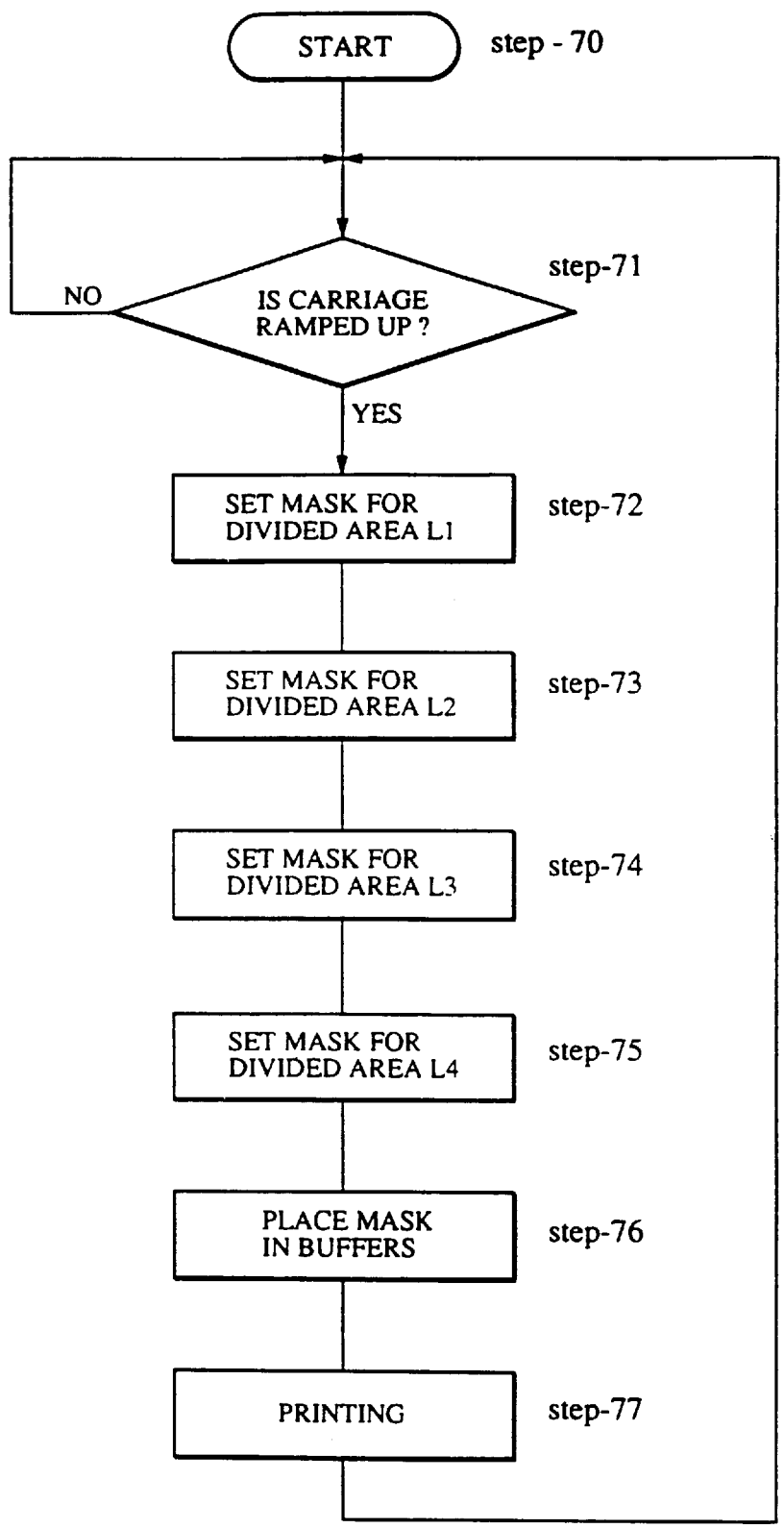
FIG. 35 shows a sequence of specifying masks for each print area according to the eighth embodiment.

Next, the timing according to which the CPU 11 specifies masks for each print area will be described. FIG. 35 shows a sequence of four-pass printing. This sequence is initiated when print data has been inputted. When it is confirmed that print data has been transmitted, the carriage is ramped up. When the carriage is ramped up, masks are specified. The carriage is ramped up at step 71. A mask is set for divided area L1 in the recording head at step 72. One of the examples of masks shown in FIGS. 32(A)–32(D) is selected as the mask. Similarly, a mask is set for divided area L2 at step 73.

A mask is set for divided area L3 at step 74. A mask is set for divided area L4 at step 75. At step 76, the masks are buffered. At step 77, printing is executed. Control is then returned to step 71. When masks are to be specified for a print area, the masks are selected so that the print area can be 100% furnished with print data.

Any masks can be selected freely for a new print area or an unprinted area. Masks may be pre-set in a storage area in the ROM 12 or the like, so that when masks are to be specified, any masks can be retrieved. Alternatively, a facility for creating masks may be installed, so that when masks are to be specified, masks can be created and stored temporarily in a nonvolatile RAM or the like for future use.

Figure 36:
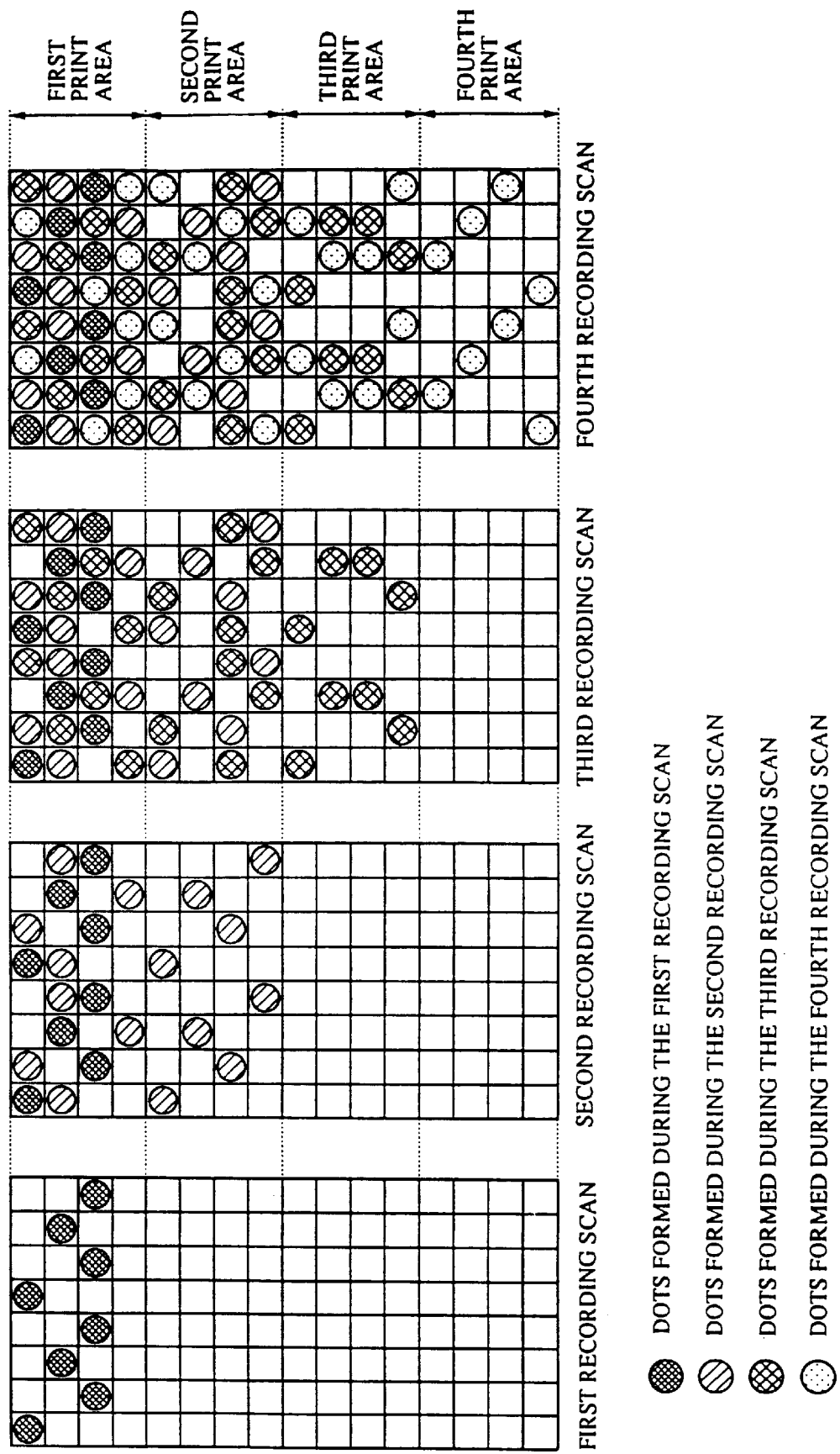
FIG. 36 is an explanatory diagram concerning the process of producing an image using different masks for each print area according to the eighth embodiment.

Next, a process of printing respective print areas to produce an image will be described in conjunction with FIG. 36. FIG. 36 shows a process of producing an image by performing recording scans during four-pass printing of this embodiment. First, the first print area is recorded with print pixels thinned out using a specified mask during the first recording scan. During the second recording scan, a mask different from that used during the first recording scan is used to record different print pixels. During the third recording scan, a mask different from those used during the first and second recording scans is used to record different print pixels. Finally, during the fourth recording scan, a mask different from those used during the previous recording scans is used to record different print pixels. Thus, recording of all the print pixels in the first print area is completed.

Recording of the second print area starts with the second recording scan. The recording is completed by following the same steps as that of the first print area. However, different masks are selected. The same applies to the third and fourth print areas. Masks different from those selected for other print areas are used for recording.

As described above, according to this embodiment, when the ink-jet recording apparatus is used to perform multi-pass recording in which printing is achieved with a plurality of movements and recording scans, a plurality of masks can be specified for each print area according to the number of recording scans or passes. Different masks unique to respective print areas are used for recording. This enables control of the periodicity of density nonuniformity in which density nonuniformity recurs every other print area having a certain width to be minimized. That is to say, the periodicity of density nonuniformity is controlled so that density nonuniformity will be indiscernible to human eyes. Herein, the point does not lie in suppression of density nonuniformity itself. Thus, high-definition images can be recorded.

Theoretically, even if print data gets synchronous with a mask, the synchronism occurs only in the print area to which the mask is applied and will not occur in the other print areas. If the cycle in which print data becomes synchronous with a print area is, for example, several tens of lines or so long such that the synchronism is unrecognizable, density nonuniformity will be indiscernible. Periodicities of masks may be varied so that the masks will appear according to different cycles. This makes density nonuniformity indiscernible. A moire pattern resulting from cyclic appearance of a mask can be confined to a limited area of an image, so that it will hardly be identified. Thus, when different masks are specified for respective print areas, periodicity of density nonuniformity can be controlled. Consequently, high-definition images can be recorded.

Ninth Embodiment

Next, the ninth embodiment will be described. The ninth embodiment provides a four-pass printing method in which printing is achieved by controlling periodicities of masks specified for respective print areas.

Figure 37:
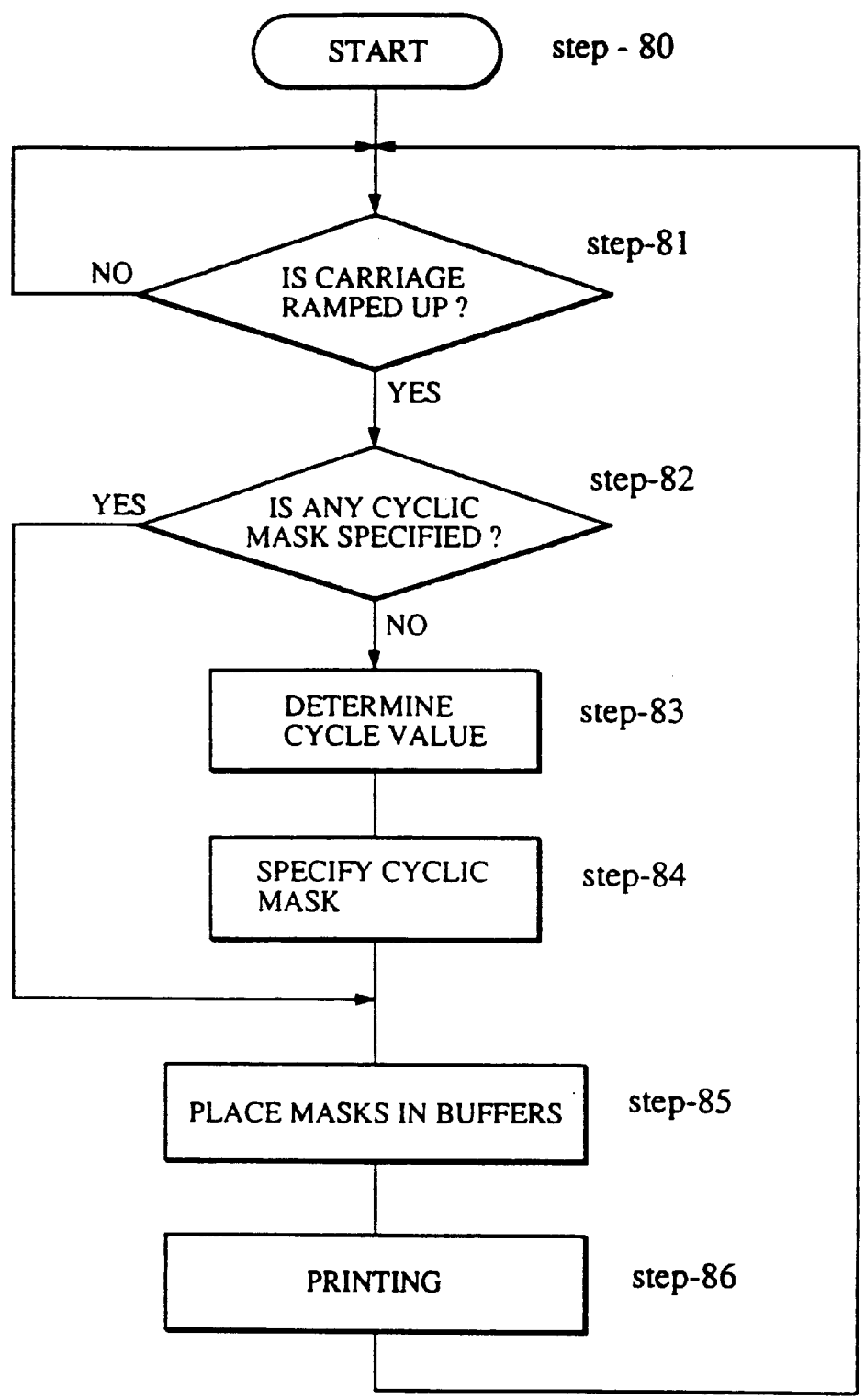
FIG. 37 shows a sequence for specifying cyclic masks according to the ninth embodiment.

FIG. 37 shows a sequence of controlling periodicities of masks specified for respective print areas which is executed by the CPU 11. This sequence is initiated when print data has been inputted. When it is confirmed that print data has been transmitted, the carriage is then ramped up. When the carriage is ramped up at step 81, the CPU 11 determines whether masks have already been specified. If masks have been specified, the masks are buffered at step 85. Printing is then executed using the masks at step 86. If no mask has been specified, a cycle value for use in specifying masks is determined at step 83. The masks are then specified at step 84. The masks are cyclic and therefore referred to as cyclic masks.

The cyclic masks are buffered at step 85. Printing is executed using the cyclic masks at step 86. Control is then returned to step 81. In this sequence, cyclic masks can be specified for each print area. If no mask has been specified, cyclic masks are specified at steps 83 and 84. If masks have already been specified, control skips from step 82 to a printing step.

Examples of the masks are the seven kinds of masks A to G shown in FIGS. 5(A)–5(G). The masks are pre-set in the ROM 12 or RAM 13. Alternatively, if a rewritable storage area is available, it may be preprogrammed that a plurality of masks are created when power is turned on. In this embodiment, seven kinds of masks are employed. The larger the number of kinds of masks the larger the number of options. Consequently, the randomness in selecting masks gets higher. The masks A to G are grouped in fours. Every four of the masks A to G can realize 100% furnishing.

FIG. 38 shows reorganization of cyclic masks resulting from a change in cycle value. With cycle 1, the masks A to G are specified sequentially. This is regarded as a reference cycle. With cycle 2, the masks A to G are specified alternately. With cycle 3, the masks A to G are specified so that every third mask will be selected. With cycle 4, the masks A to G are specified so that every fourth mask will be selected. By changing cycle values, the order of the masks A to G can be varied. With this in mind, when cyclic masks are specified according to the sequence of FIG. 7, the periodicities of cyclic masks to be specified can be controlled by designating a cycle value.

As described above, when the ink-jet recording apparatus is used to perform multi-pass recording in which printing is achieved with a plurality of movements and record scans, the periodicities of masks to be specified uniquely to each print areas are controlled. Periodicity of density nonuniformity can thus be controlled.

Tenth Embodiment

Next, the tenth embodiment will be described. The tenth embodiment provides a printing method in which masks are placed in a single ring buffer.

Figure 39:
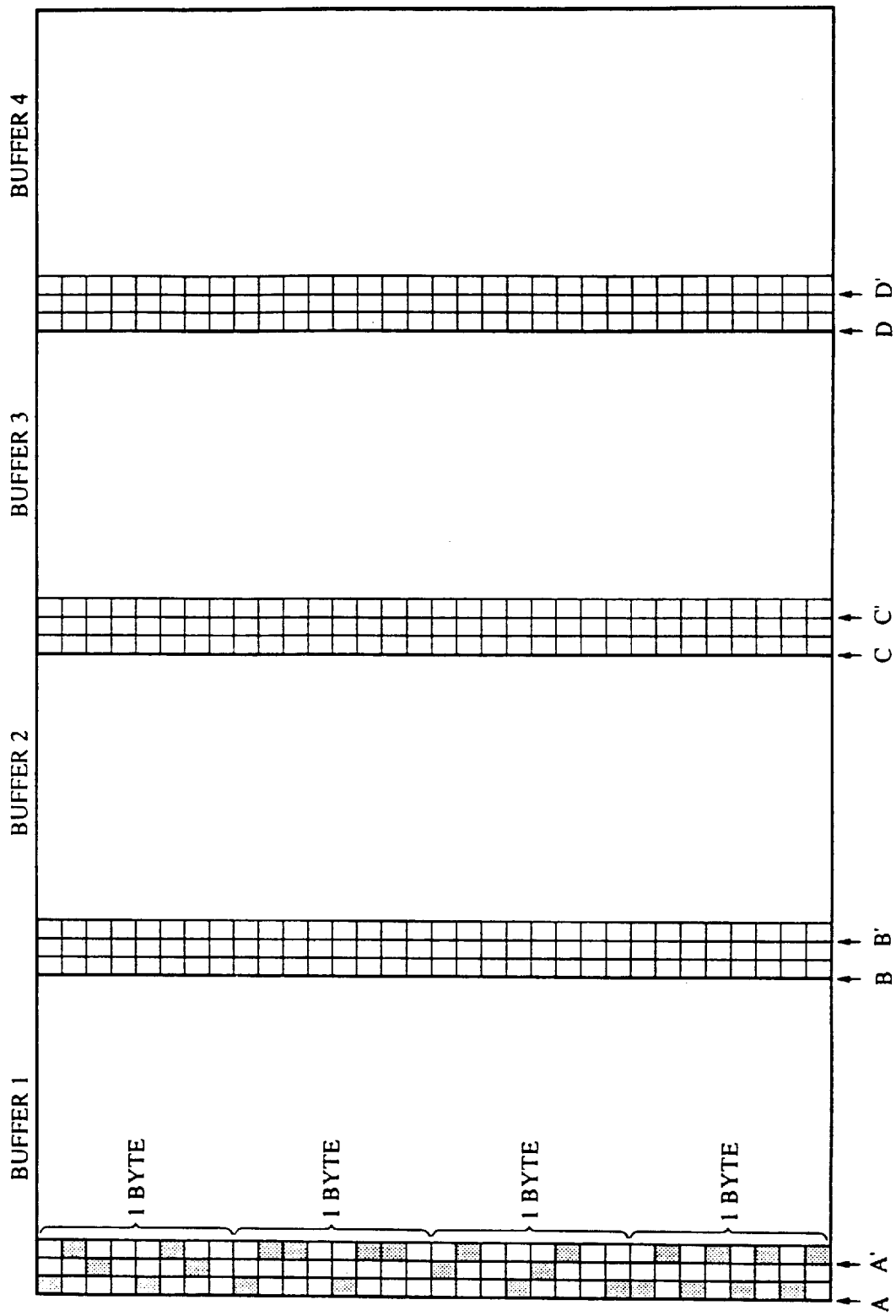
FIG. 39 is an explanatory diagram concerning creation of masks using a ring buffer in the tenth embodiment.

FIG. 39 shows a ring buffer. The ring buffer is a cyclic storage area, wherein after buffer 1, buffer 2, buffer 3, and buffer 4 are used in that order, the buffer 1 is reused. In this embodiment, a single mask is stored in this ring buffer. When masks are needed, the buffered mask is read out from a different position. Thus, masks created based on the buffered mask look as if they were retrieved independently.

The ring buffer shown in FIG. 39 is four bytes deep (associated with 32 nozzles), so that it can be employed for four-pass printing using the recording head having 128 nozzles. The size, depth by width, of the ring buffer depends on the configuration of the recording apparatus. In this embodiment, the size of the ring buffer is determined to provide a storage capacity of several kilobytes. The buffer 1, buffer 2, buffer 3, and buffer 4 contain masks which permit 100% furnishing. The four masks are concatenated to form a large mask. For a print area, the mask is read from read-out positions A, B, C, and D that are the leading addresses of the buffers in FIG. 39. Thus, masks permitting 100% furnishing can be created. For another print area, the read-out positions of the mask are displaced. Thus, masks can be created as if they were retrieved from the buffer independently. The read-out positions A, B, C, and D are thus displaced by two columns to A', B', C', and D'.

As mentioned above, a single mask is placed in the ring buffer in this embodiment, and the read-out positions of the mask are displaced from print area to print area. Thus, various masks can be specified for respective print areas. When the ring buffer has a larger storage capacity, masks to be specified for respective print areas lose periodicity.

A circuitry for data transfer in the aforesaid embodiments 8 to 10 is found in FIG. 26. Another sequence of specifying different masks for respective print areas has been described in conjunction with FIGS. 27 to 30.

According to the aforesaid embodiments 8 to 10, masks each having non-print pixel locations and print pixel locations arrayed are specified uniquely for each print area. This exerts an effect of varying periodicities of thinning-out masks. Thus, the periodicity of density nonuniformity resulting from unequal numbers of print pixels to be printed in the same print area during several passes of conventional multi-pass recording is varied so that density nonuniformity will be inconspicuous in a produced image. Consequently, high-definition images can be produced.

Eleventh Embodiment

Next, the eleventh embodiment will be described. In the eleventh embodiment, when the ink-jet recording apparatus is used to produce an image, masks are expanded.

Figure 40:
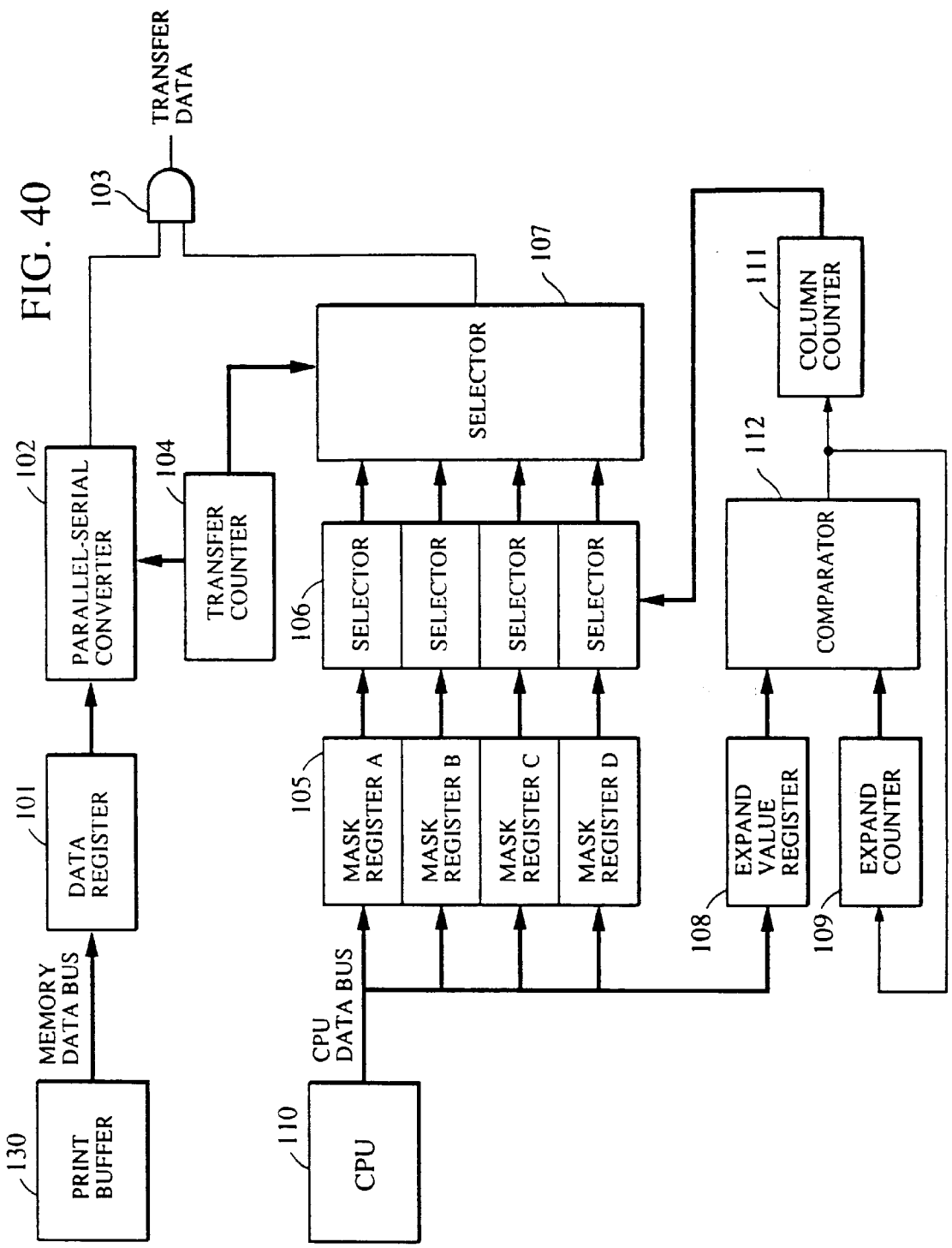
FIG. 40 is a block diagram showing circuit elements of a data transfer circuit in the eleventh embodiment of the present invention.

FIG. 40 is a block diagram showing circuit elements of a data transfer circuit in which the present invention is implemented. Circuit elements identical to those in FIG. 26 (sixth embodiment) are assigned the same reference numerals, of which description will be omitted.

Reference numeral 108 denotes a register connected over the CPU data bus and used to determine a quantity of expansion, 109 denotes a counter for counting the number of expansions, 112 denotes a comparator for comparing a value set in the expand value register 108 and a value set in the expand counter 109 and 111 denotes a counter for use in managing a column position.

The expand value register 108 is a 4-bit register for storing a quantity of Expansion written by the CPU 110. In the expand value register 108, 1 to 16 can be set as quantities of expansion. The expand counter 109 increments a count value at every receipt of a print command signal sent from the CPU 110. The comparator 112 compares a value in the expand value register 108 and a value in the expand counter 109. If the values agree with each other, the expand counter 109 is cleared to zeros and the value in the column counter 111 is incremented. The column counter 111 is a 2-bit counter and counts up from 0 to 3 repetitively.

Figure 41:
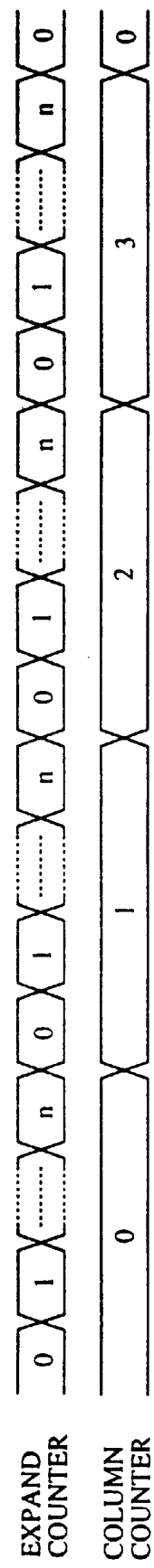
FIG. 41 is a timing chart showing an action of an expand counter for use in expanding masks and that of a column counter in the eleventh embodiment.

FIG. 41 is a timing chart showing the actions of the expand counter 109 and column counter 111. The expand counter 109 increments a count value at every receipt of a print command signal sent from the CPU 110. If a value in the expand counter 109 agrees with a value n in the expand value register, the expand counter 109 is cleared to zeros. The column counter 111 increments a count value by one. The count value in the column counter 111 is reset to zero when it comes to 3.

Figure 42:
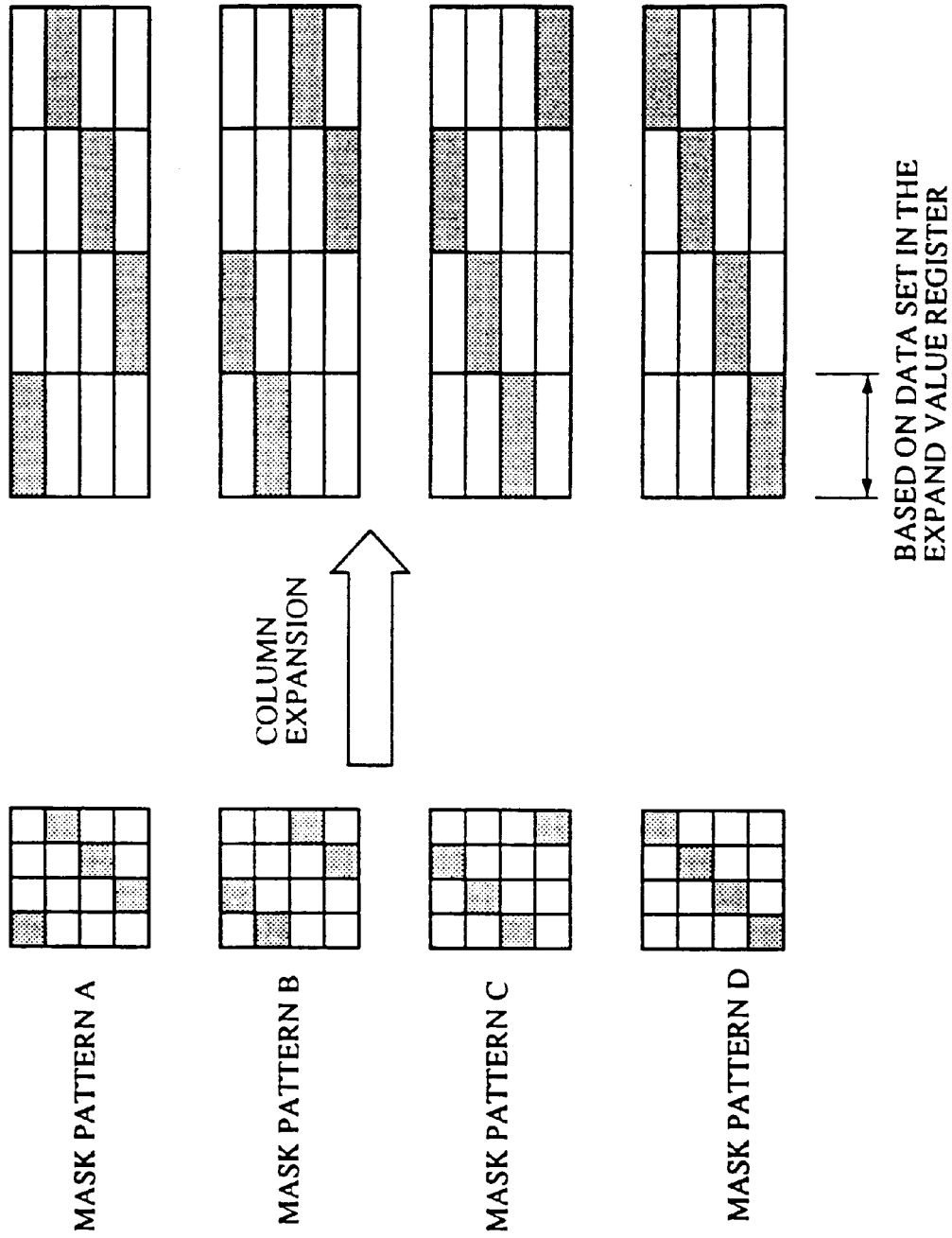
FIG. 42 is an explanatory diagram concerning expansion of four masks each having a size of 4 by 4 dots.

FIG. 42 shows setting of masks in the mask registers A, B, C, and D. Each mask is four dots deep and four dots wide. Black dots in FIG. 42 indicate that the pixel locations are not masked. White dots therein indicate that the pixel locations are masked. During print data transfer, print data for pixels corresponding to the black dots are transferred to the recording head as they are, and therefore printed in the form of a bit pattern in the print buffer. Print data for pixels corresponding to white dots are masked by the AND gate 103, and therefore are not printed regardless of the contents of the print buffer.

As described previously, a column position of a mask is determined with a value in the column counter 111. The column counter 111 shows the same value repeatedly by the frequency defined with a value set in the expand value register 108. An actual mask is therefore expanded horizontally according to the value set in the expand value register 108 as shown in FIG. 42.

Figure 43:
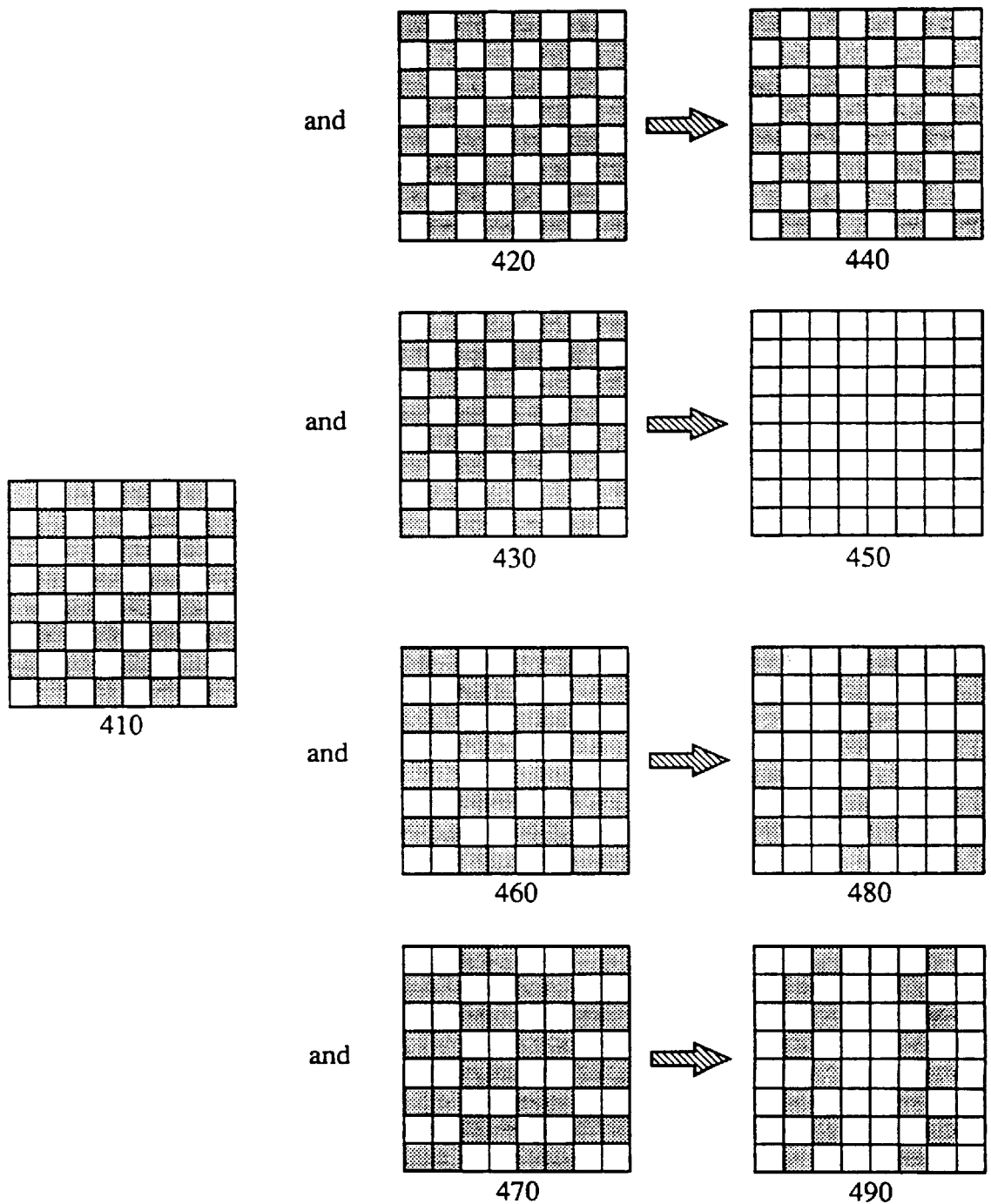
FIGS. 43 and 44 show examples of results of printing data, which is thinned out at duty ratios of 50% and 62.5% respectively, using expanded masks in the eleventh embodiment.

Next, an example of expanding masks will be described. FIG. 43 shows an example of expanding in which expanded masks each offering a 50%-print duty ratio are used for thinning out. Numeral 410 denotes binary data having been buffered and arrayed. The binary data 410 is Bayer type print data which is used generally for binary-coded dithering. Numeral 420 denotes a checker-pattern mask defining locations of pixels printable during the first pass, 430 denotes an inverse-checker pattern mask defining locations of pixels printable during the second pass and 440 and 450 denote illustrations showing pixels printed during the first and second passes, respectively. In this embodiment, 2 is set as a quantity of expansion. Numeral 460 denotes a mask made by expanding the checker-pattern mask, wherein locations of pixels printable during the first pass are defined, 470 denotes a mask made by expanding the inverse-checker pattern mask, wherein locations of pixels printable during the second pass are defined and 480 and 490 denote illustrations showing pixels printed during the first and second passes, respectively.

When checker-pattern and inverse-checker pattern masks are used for recording, printing is achieved during one pass, but not performed during another pass. A produced image is therefore affected by differences in the individual nozzles. That is to say, the aforesaid density nonuniformity appears to deteriorate image definition. In contrast, when masks made by expanding the checker-pattern and inverse-checker pattern masks are employed, as shown in the illustrations 480 and 490, print data is equally distributed and recorded between the first and second passes. Thus, the influence of differences of nozzles from one another can be minimized and the density nonuniformity or any other fault can be avoided.

Figure 44:
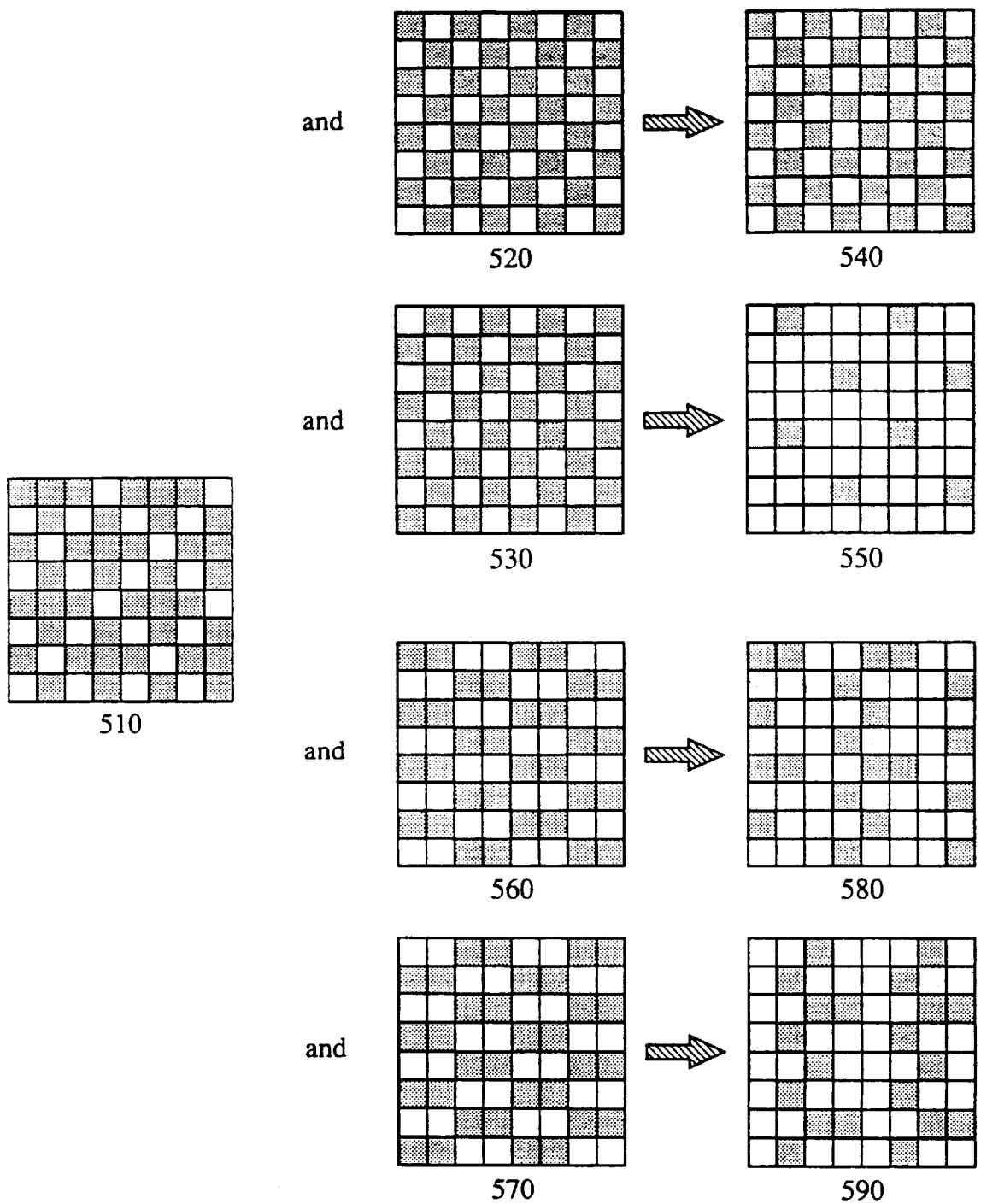

FIG. 44 shows an example of expanding in which data offering a 62.5%-print duty ratio is printed. Print data 510 is also Bayer type binary data. Similarly to FIG. 43, when printing is performed using checker-pattern and inverse-checker pattern masks, there is a great difference in the number of print dots between the first and second passes. However, when printing is performed using masks made by expanding the checker-pattern and inverse-checker pattern masks, as shown in illustrations 580 and 590, the print data is equally distributed and recorded between the first and second passes.

Figure 45:
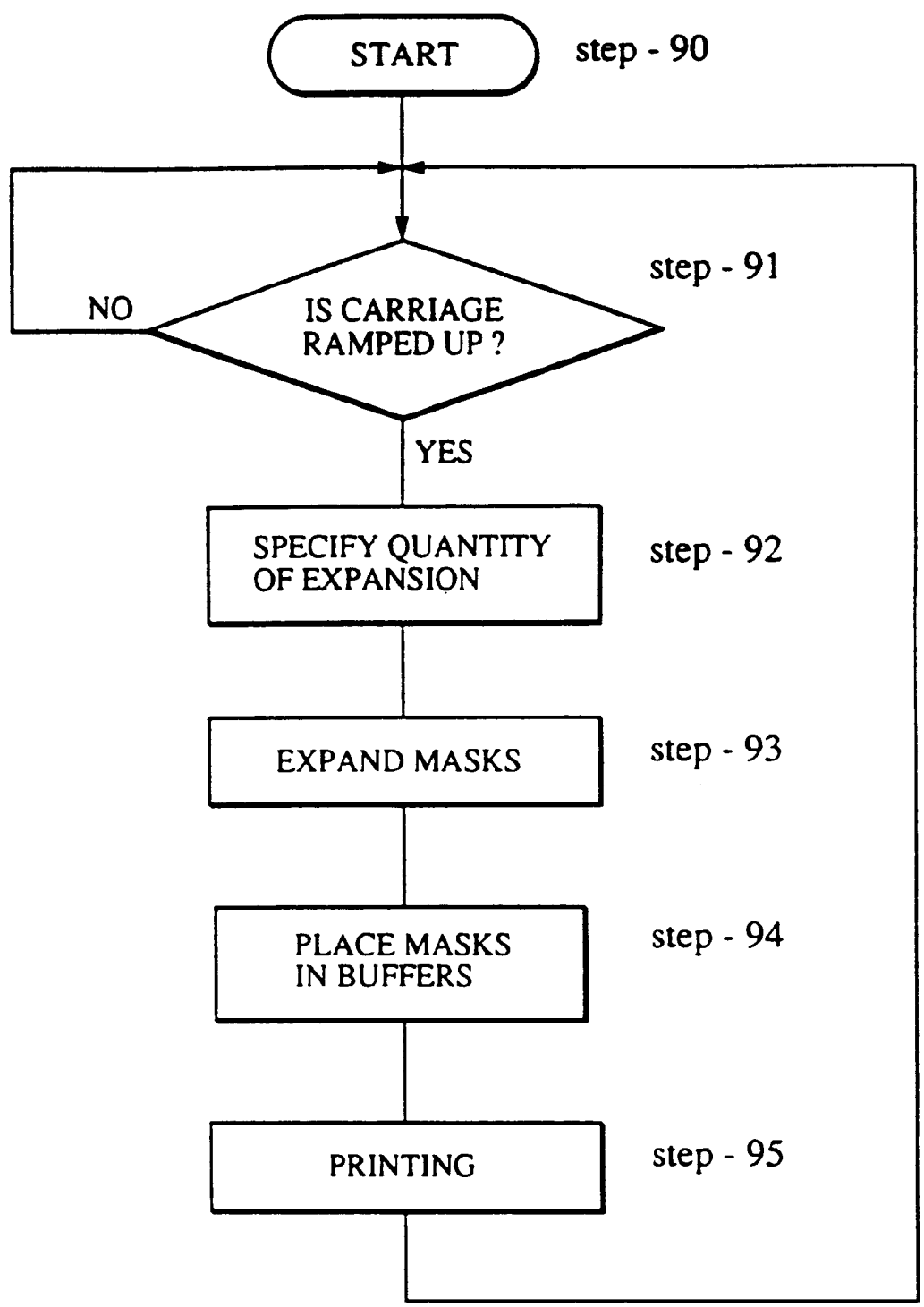
FIG. 45 shows a sequence of expanding masks according to the eleventh embodiment.

Next, the timing according to which the CPU 11 creates masks for each print area will be described. FIG. 45 shows a sequence to be initiated when print data has been inputted. When it is confirmed that print data has been transmitted, the carriage is ramped up. When the carriage is ramped up, masks are created. The carriage is ramped up at step 91. A quantity of expanding masks is set in the expand value register at step 92. At step 93, masks are expanded by the quantity of expansion. Masks are pre-set in a storage area in the ROM 12 or the like in the recording apparatus. The masks are retrieved for use. Various quantities of expansion can be set. It is therefore unnecessary to store a plurality of masks. If only one reference set of masks are stored, a plurality of masks can be created by changing quantities of expansion. At step 94, the masks are placed in buffers (registers). At step 95, printing is executed. Control is then returned to step 91, and recording is continued.

As mentioned above, when a mask is synchronous with print data, the mask need not be replaced with another one but is expanded. Merely by expanding the mask, the synchronism with print data is canceled out. Deterioration of image definition can be prevented. Since it is unnecessary to hold many additional masks, a storage area that is large enough to store the additional masks need not be defined in the ROM 12 or the like. This is cost-effective. This embodiment has been described in conjunction with Bayer type binary data. This embodiment will prove effective for print data subjected to other dithering. In this embodiment, any quantity of expanding masks can be adopted. This enables selection of an optimal quantity of expansion. In this embodiment, a mask is expanded horizontally to the recording scan direction. Alternatively, a mask may be expanded perpendicularly to the recording scan direction. This will lead to higher expandability.

Twelfth Embodiment

Next, the twelfth embodiment will be described. In the twelfth embodiment, quantities of expansion are changed according to print data and specified for respective print areas, and then printing is executed.

Figure 46:
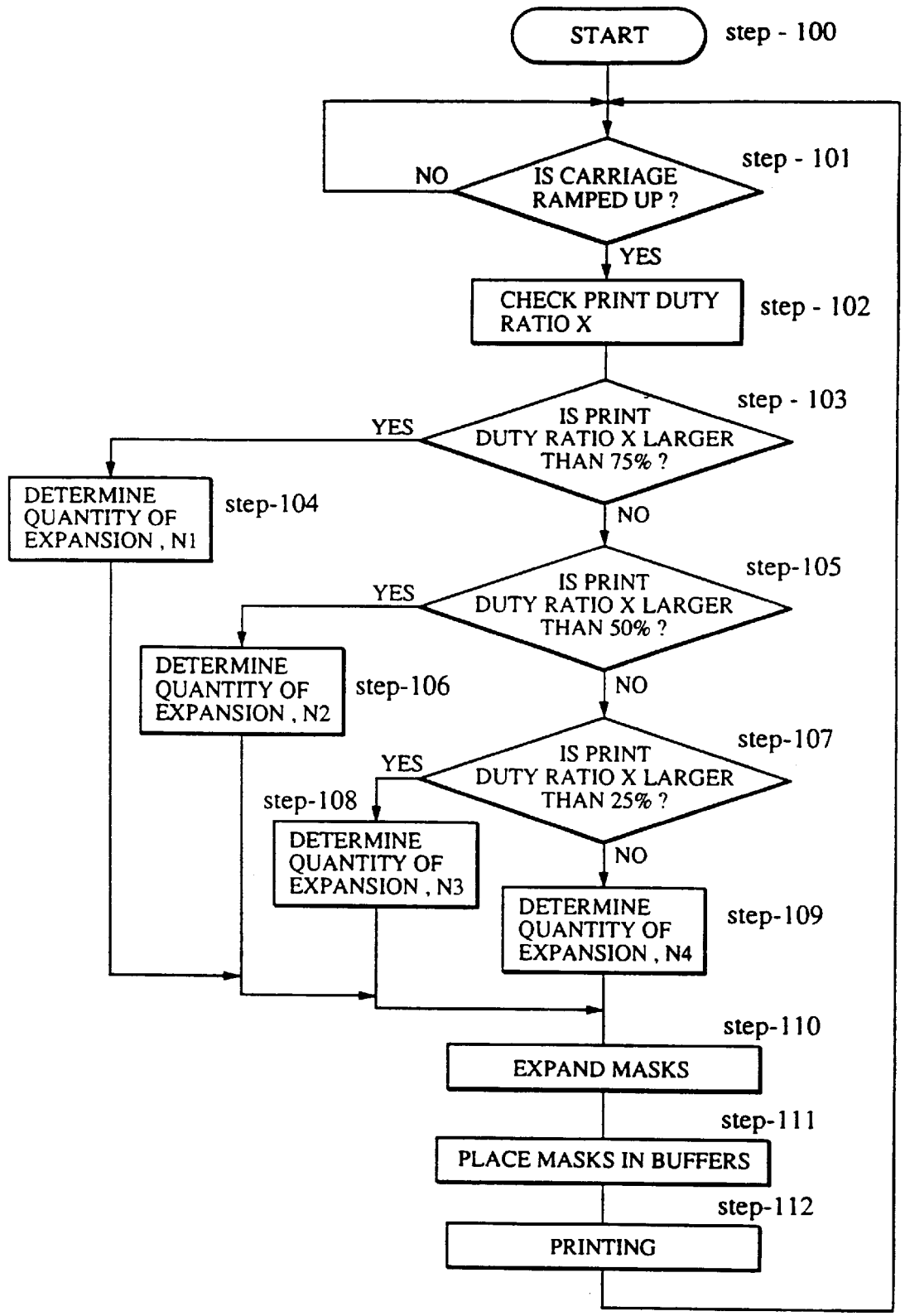
FIG. 46 shows a sequence of specifying a quantity of expansion for masks relative to a duty ratio according to the twelfth embodiment.

In this embodiment, a format of printable data is detected, and then the CPU 11 specifies an optimal quantity of expansion. FIG. 46 shows a sequence of creating masks in which this embodiment is implemented. First, it is confirmed that print data has been transmitted. At step 101, the carriage is ramped up. When the carriage is ramped up, masks are created. After the carriage is ramped up, the print data received is checked for a print duty ratio X at step 102. Print data for a print area that is recorded by one divided area of the recording head during one scan is checked to find out a print duty ratio. At step 103, if the print duty ratio X indicates 75% or higher, the print duty ratio for the print area is recognized as ranging from 75 to 100%. At step 104, a quantity of expansion N1 is determined. If the print duty ratio X does not indicate 75% or higher, control is passed to step 105. If the print duty ratio X indicates 50% or higher, the print duty ratio for the print area is recognized as ranging from 50 to 75%. At step 106, a quantity of expansion N2 is determined. If the print duty ratio X does not indicate 50% or higher, control is passed to step 107. If the print duty ratio X indicates 25% or higher, the print duty ratio for the print area is recognized as ranging from 25 to 50%. At step 108, a quantity of expansion N3 is determined. If the print duty ratio X does not indicate 25% or higher, the print duty ratio for the print area is recognized as ranging from 0 to 25%. At step 109, a quantity of expansion N4 is determined.

At step 110, masks are expanded by the quantity of expansion determined relative to the print duty ratio. The masks are pre-set in a storage area in the ROM 12 or the like in the recording apparatus. When needed, the masks are retrieved for use. At step 111, the masks are then placed in the buffers (registers) associated with print areas. At step 112, printing is executed. Control is then returned to step 101. Recording is continued. Thus, a quantity of expansion can be determined relative to a print duty ratio for a print area.

Figure 47:
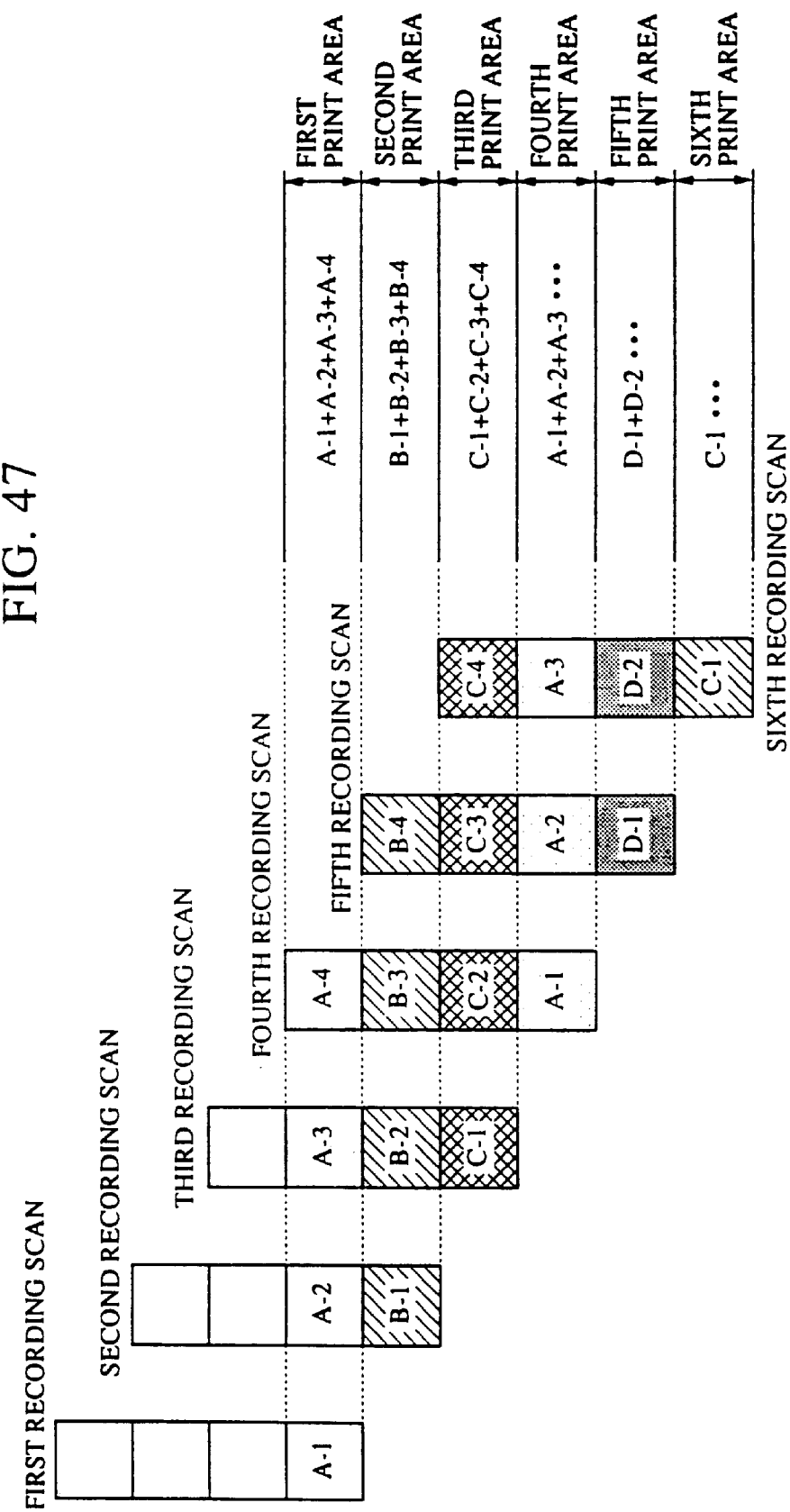
FIG. 47 is an explanatory diagram showing specification of masks for each print area performed as recording proceeds according to the twelfth embodiment.

Specification of masks for each print area performed as recording proceeds will be described in conjunction with FIG. 47. This embodiment adopts four-pass printing in which recording of a print area is completed with four recording scans. Masks employed are thinning-out masks each offering a 25%-print duty ratio. Whether or not a pixel is to be printed is specified for each print pixel location in each mask. Masks expanded by a quantity of expansion associated with the 25%-print duty ratio are regarded as masks A-1, A-2, A-3, and A-4. Masks expanded by a quantity of expansion associated with a print duty ranging from 25 to 50% are regarded as masks B-1, B-2, B-3, and B-4. Masks expanded by a quantity of expansion associated with a print duty ratio ranging from 50 to 75% are regarded as masks C-1, C-2, C-3, and C-4. Masks expanded by a quantity of expansion associated with a print duty ratio ranging from 75 to 100% are regarded as masks D-1, D-2, D-3, and D-4. Thus, a set of thinning-out masks each offering a 25%-print duty ratio are expanded to create many masks.

First, the first print area is recorded using mask A-1 during the first recording scan. Next, during the second recording scan, the first print area is recorded using mask A-2 and the second print area is recorded using mask B-1 different from that for the first print area. During the third recording scan, the first print area is recorded using mask A-3, the second print area is recorded using mask B-2, and the third print-area recorded using mask C-1 different from those for the first and second print areas. During the fourth recording scan, the first print area is recorded using mask A-4. Thus, recording of the first print area is completed. Similarly, recording of the second print area is completed with masks B-1, B-2, B-3, and B-4. Recording of the third print area is completed with masks C-1, C-2, C-3, and C-4. Recording of the fourth print area proceeds using masks A-1, A-2, and A-3. Thus, each print area is recorded using masks expanded relative to a print duty ratio for the print area.

This embodiment provides an example of specifying four quantities of expansion. The same quantity of expansion is specified for the first and fourth print areas. The same masks are therefore shared between the first and fourth print areas. The same quantity of expansion is specified for the third and sixth print areas. The same masks are therefore shared between the third print and sixth print areas. The print areas between which the same masks are shared are determined depending on the number of kinds of masks. Thus, recording can be performed by expanding masks relative to a print duty ratio for each print area.

Figure 31:
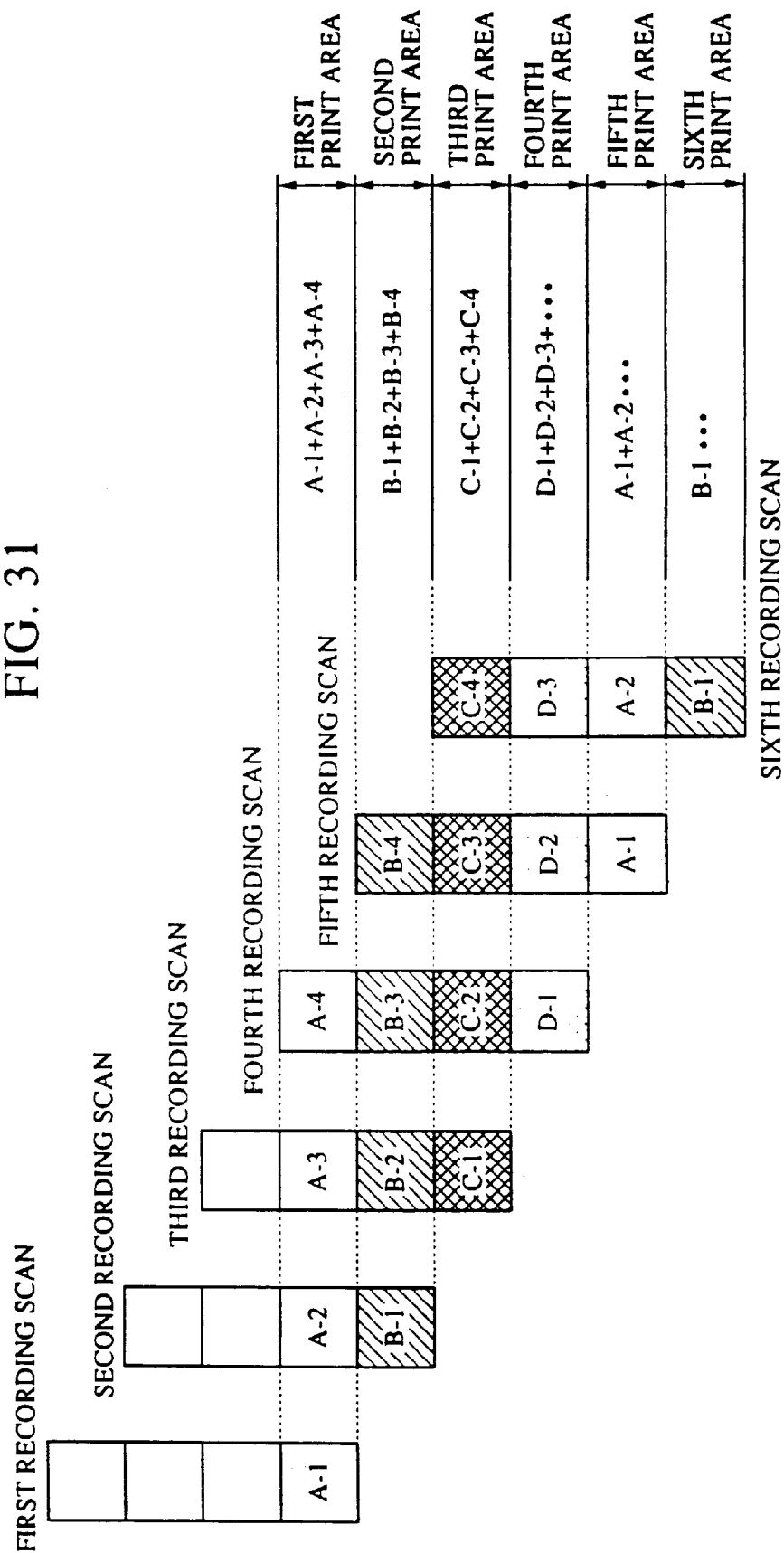
FIG. 31 shows specifications of different masks for each print area according to the eighth embodiment of the present invention.
Figure 32A:
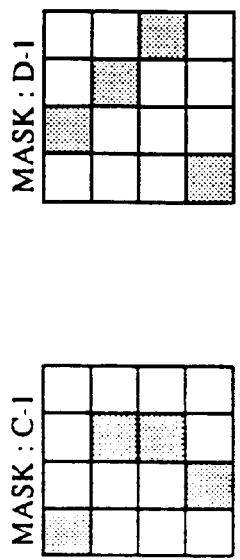
FIGS. 32(A)–32(D) show examples of 4-by-4 thinning-out masks each offering a duty ratio of 25% in the eighth embodiment.
Figure 32B:
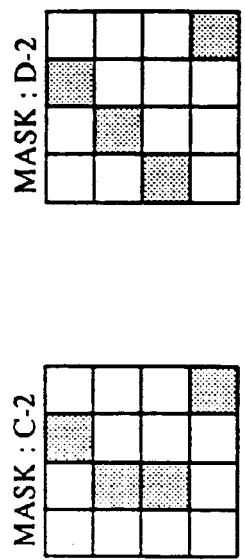
Figure 32C:
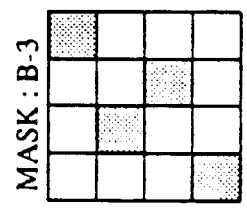
Figure 32D:
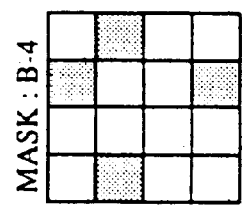

The recording head for which masks are set has the same construction as that described in conjunction with FIG. 31. Divided areas in the recording head are regarded as divided areas L1, L2, L3, and L4, for which different masks are set. For example, for the fourth recording scan in FIG. 47, mask A-4 is set for divided area L4, mask B-3 is set for divided area L3, mask C-2 is set for divided area L2, and mask A-1 is set for divided area L1. For the fifth recording scan, mask B-4 is set for divided area L4, mask C-3 is set for divided area L3, mask A-2 is set for divided area L2, and mask D-1 is set for divided area L1. Thus, different expanded masks are set uniquely for respective divided areas.

As described above, masks can be expanded according to a print duty ratio for each print area and set independently for respective divided areas. Masks can be expanded optimally to print data. In this embodiment, a print duty ratio of print data is checked. When it comes to character data, after character data is identified, a quantity of expansion may be set uniquely.

Thirteenth Embodiment

Next, the thirteenth embodiment will be described. In the thirteenth embodiment, a quantity of expanding masks is determined according to a type of recording medium.

In this embodiment, a type of recording medium is recognized by analyzing information entered by a user. A quantity of expanding masks is then determined. For enabling a user to enter information, a button or switch for use in designating a type of recording medium may be installed in the recording apparatus so that a user himself or herself can designate a type of recording medium. Alternatively, a feature for determining a type of recording medium may be incorporated in a printer driver so that a user can designate a type of recording medium through a screen on a host computer.

Figure 48:
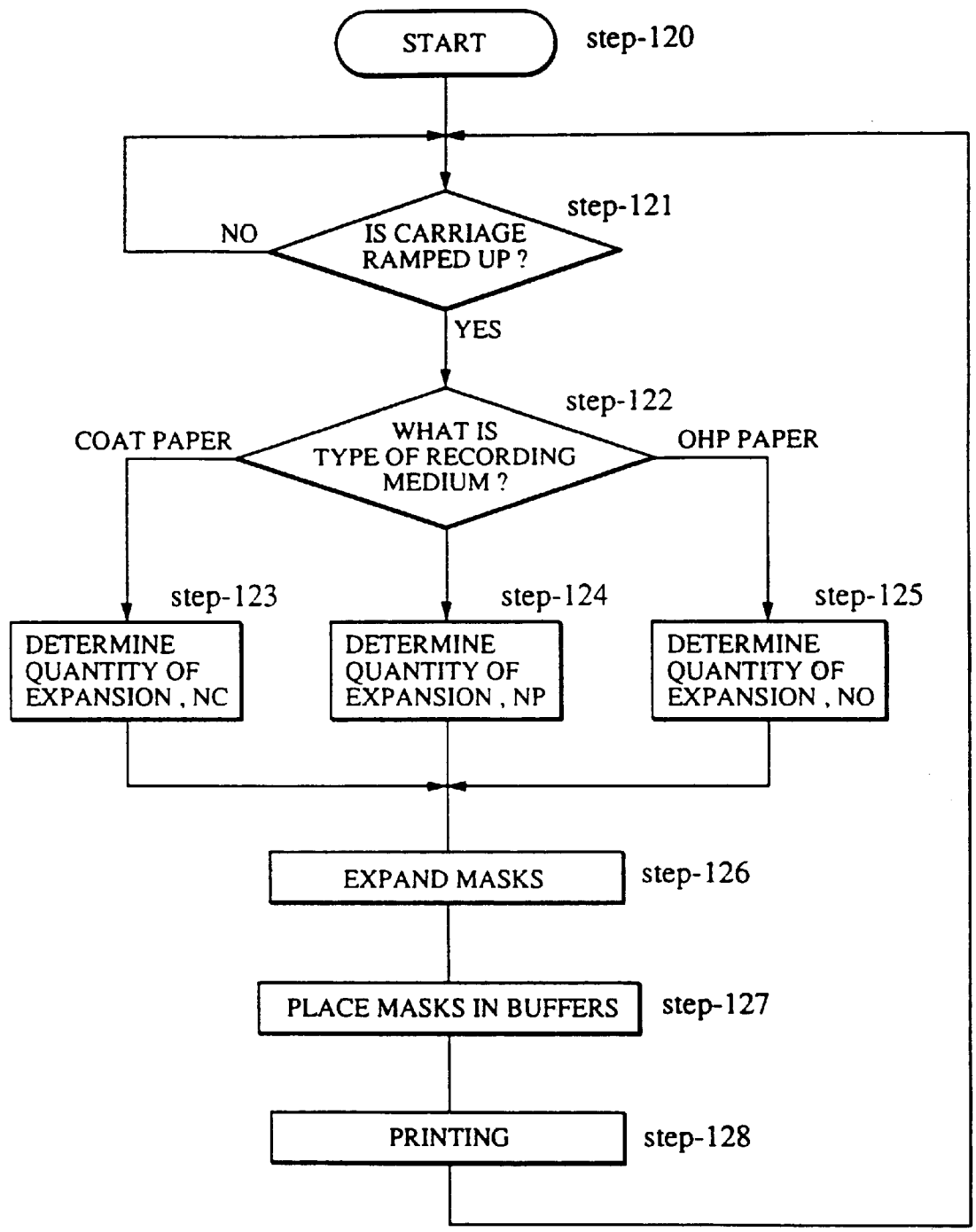
FIG. 48 shows a sequence of specifying a quantity of expansion for masks relative to a type of recording medium according to the thirteenth embodiment.

FIG. 48 shows a control sequence for creating masks in which this embodiment is implemented. Three types of recording media, that is, plain paper, coated paper, and OHP paper, can be used selectively. First, it is confirmed that print data has been transmitted, and then the carriage is ramped up. When the carriage is ramped up at step 121, masks are created. After the carriage is ramped up, a type of recording medium loaded is identified at step 122. Depending on the type of recording medium, a quantity of expanding masks is placed in the expand value register at step 123, 124, or 125. The quantities of expansion can be set to any values according to the properties of recording media.

As long as coated paper is concerned, since shot ink droplets quickly permeate into the superficial layer of the coated paper, dots to be recorded at one time should preferably be distributed and not be congested. A quantity of expansion NC is set to 1 or 2. As for plain paper, ink does not permeate into plain paper as quickly as it does into coated paper. Ink stays in the surface of plain paper and permeates thereunto slowly. Some adjoining ink droplets can be shot simultaneously. A quantity of expansion NP is therefore set to any of 2 to 4. When it comes to OHP paper, ink does not fuse until it dries up on the surface of OHP paper. It therefore takes much time for ink to fuse. This means that ink stays on the surface of OHP paper for a prolonged period of time. Dots are easily affected with the manner of printing adjoining dots. In order to prevent occurrence of a seam or any other drawback in an image, some adjoining ink droplets should preferably be ejected simultaneously in the form of a bolus so that the ink will not flow into other areas. A quantity of expansion, NO, is set to any of 3 to 5. A plurality of adjoining ink droplets are shot simultaneously in the form of a bolus so that the ink droplets will be attracted to one another. Thus, the quantities of expansion are determined based on the properties of the recording media.

Next, masks are expanded by the set quantity of expansion at step 126. The masks are pre-set in a storage area in the ROM 12 or the like in the recording apparatus and retrieved for use. At step 127, the masks are placed in buffers (registers). At step 128, printing is executed. Control is then returned to step 121. Recording is continued.

As described above, when a means for identifying a type of recording medium is included, a recording apparatus can identify a type of recording medium by analyzing data entered by a user, and set an optimal quantity of expansion for the type of recording medium. In this embodiment, reaction of ink against the surface of a recording medium is taken into consideration in predetermining quantities of expansion. The reaction of ink depends largely on a property of ink or printing environments. It is therefore preferable to predetermine quantities of expansion according to the property of ink. When a feature for sensing printing environments such as temperature and humidity is used in combination with this embodiment, the advantage of this embodiment will be intensified. The feature for determining a quantity of expansion according to print data, which has been described in the twelfth embodiment, may be used in combination with this embodiment. Thus, the advantage of this embodiment will also be intensified so that masks can be expanded more properly.

According to the aforesaid embodiments 11 to 13, masks each defining an array of non-print pixel locations and print pixel locations are expanded. This exerts an effect of varying the periodicities of masks. Density nonuniformity resulting from unequal numbers of print pixels to be printed in the same print area during several passes of conventional multi-pass recording can therefore be prevented from occurring in a produced image. According to the aforesaid embodiment, high-definition images can be produced. Furthermore, a plurality of sets of masks need not be stored. Thus, cost-effectiveness can be improved.

The aforesaid embodiments 1 to 13 are not limited to ink-jet recording but may apply to all recording methods including heat sensitive recording, thermal transfer recording, and wire-dot recording. Next, an advantage gained when random masks are used for a serial printer or when masks are specified for each print area will be described.

Division (multi-pass) recording has been described previously, wherein a plurality of different recording elements are used to print data for one raster so that the differences in property (causing a twist or a dot size) among the recording elements are averaged in order to make density nonuniformity in one print area indiscernible. This advantage of division recording is hardly exerted within a single raster when print data gets synchronous with a mask in many recording elements. In order to destroy the synchronism with data, random masks or masks that differ from print area to print area are used. Consequently, division printing can be achieved effectively.

What is described above is true for all types of dot-matrix printers. When binary data representing the on and off states of recording elements responsible for dots are used to render a pseudo-gray scale, the recording elements must be controlled to be consistent-with one another in terms of properties. In this case, division printing using random masks or division printing in which different masks are specified for respective print areas will prove effective.

For a recording apparatus using heat for printing (thermal transfer recording apparatus), division printing is effective because it helps suppress a temperature rise in a recording head. Even in this case, a temperature rise is concentrated at part of the recording head corresponding to a portion of a thinning-out mask synchronous with print data. Density nonuniformity (unequal dot diameters) occurs in line with the thermal distribution in the recording head. Division recording using random masks or division recording in which different masks are specified for respective print areas will prove effective in overcoming the above drawback.

In a color recording apparatus in which a plurality of recording heads are lined up in the scanning direction of a carriage, a tone varies depending on the printing order of dots. The synchronism between print data and a thinning-out mask is reflected on a tone. This results in recording of an image whose tone is different from the one a user wants to express. For example, as long as thermal transfer recording is concerned, if previously-printed dots (ink layer) are present in a recording medium, dots to be transferred succeedingly are hardly transferred. On the other hand, when it comes to ink-jet recording, if-highly-permeable ink is employed, the dye of previously-discharged ink is absorbed into an ink hold layer of a recording medium or fibers thereof, and the dye of ink shot succeedingly is hardly absorbed. The tone of dots printed previously is therefore intensified. When less-permeable ink is employed, the dye of ink discharged succeedingly does not flow out but accumulates on the previous layer. The tone of dots printed succeedingly is therefore intensified. Division recording using random masks or division recording in which different masks are specified for respective print areas will effectively cope with the above phenomena, in other words, will suppress inharmonious tones from a macroscopical viewpoint.

Fourteenth Embodiment

Next, the fourteenth embodiment will be described in conjunction with the drawings. In the fourteenth embodiment, pseudo-random numbers are used in a print mode designed for transparent film.

When the use of transparent film is designated, a multi-pass print mode using masks containing pseudo-random numbers is selected automatically. This helps minimize occurrence of beading. Even if beading occurs, the orientation of beading is not dependent on the presence of a fixed-pattern mask or twist which is oriented on a fixed basis. The orientation of beading is randomized based on the printing order defined with pseudo-random numbers and therefore becomes inconspicuous. A printer or any other printing apparatus usually has an error in printing precision. Even when a shooting position is displaced from a reference position due to a speed of a carriage that is unequal to a reference speed, beading is oriented at random by the quantity of displacement. This embodiment provides an actual image that is macroscopically more uniform than an image produced by arranging regular masks with high precision.

In this embodiment, similarly to the aforesaid eighth embodiment, masks are specified for each print area and then an image is produced.

A ring buffer described in the tenth embodiment may be employed. Alternatively, a data transfer circuit described in the sixth embodiment may be employed. Anyhow, any of the sequences described previously may be employed to specify different masks for respective print areas.

Figure 49:
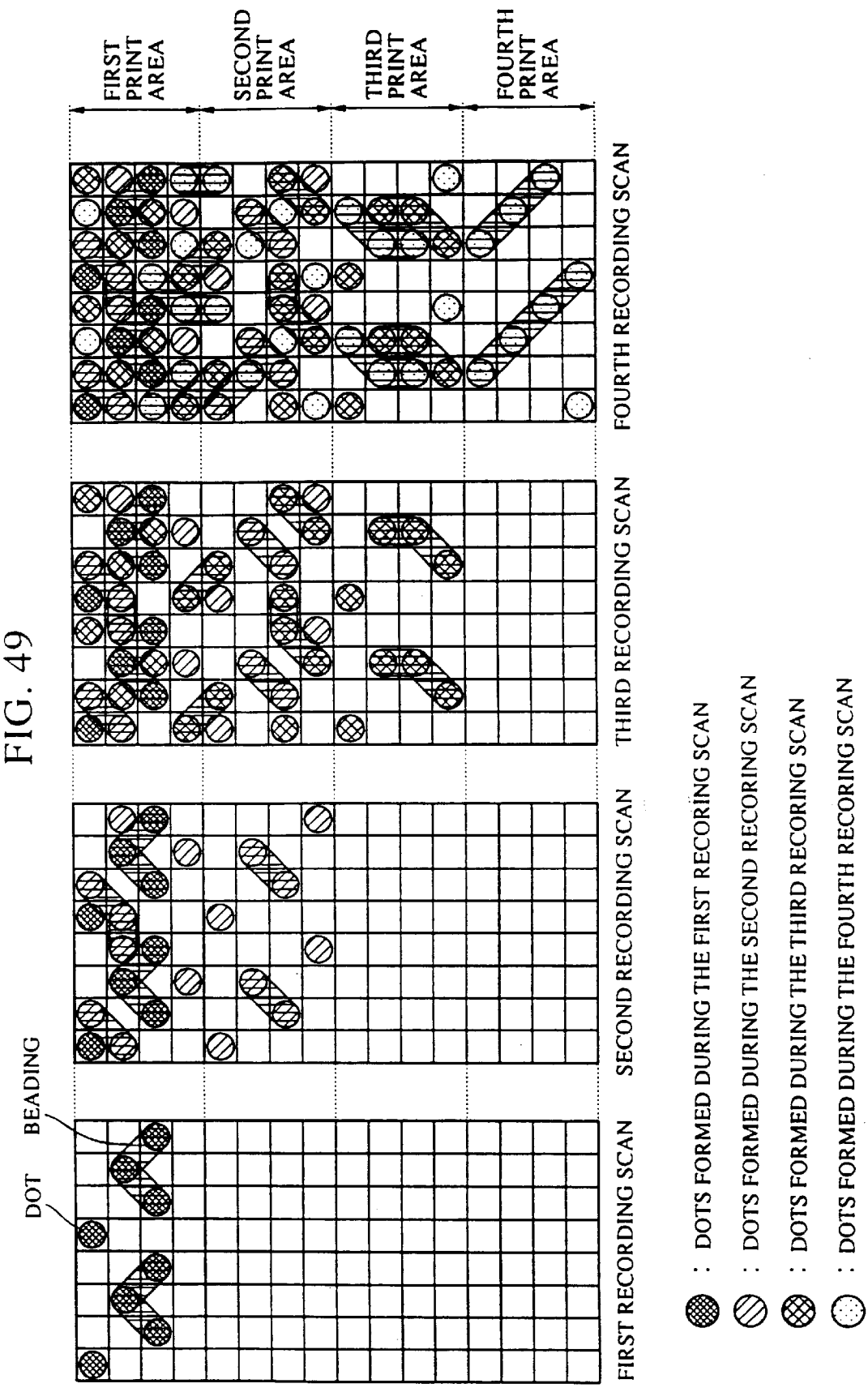
FIG. 49 is an explanatory diagram showing the occurrence of beading in the fourteenth embodiment.

The printed states in this embodiment will be described in conjunction with FIG. 49. Pixels recorded during the first recording scan will be discussed first. This embodiment will be described on the assumption that transparent film is greatly liable to be blotted with ink when a quantity of discharged ink is somewhat large. Adjoining ink droplets discharged simultaneously supposedly cause beading because they are absorbed into the transparent film slowly. During the second recording scan and thereafter, adjoining ink droplets cause beading. Beading occurs according to a mask containing pseudo-random numbers, wherein the orientations and shapes of beading are randomized based on pseudo-random numbers.

By the time printing is achieved with the third recording scan, microscopic beading is completed to some extent in the first print area. It can be seen from FIG. 49 that new beading hardly occurs. Even when dots adjoin askew, if beading has already occurred perpendicularly to the askew direction and the ink has been absorbed almost completely, another beading does not occur or dots are printed in any other state.

With the fourth recording scan, an image for the first print area is completed under the same circumstance as that mentioned above. The second print area is completed sequentially in the similar manner. The third and fourth print areas are completed using different masks containing pseudo-random numbers. Different beading patterns defined with the pseudo-random numbers are produced in the respective print areas. Macroscopically, a uniform image without regularity is produced.

This embodiment has been discussed concerning 100%-solid black printing. The embodiment can also apply to half-tone printing. The advantage of this embodiment will be intensified in a half-tone area of an image having a half-tone ratio ranging from 50 to 100% in which more adjoining dots are printed.

Fifteenth Embodiment

The fourteenth embodiment puts emphasis on the occurrence of beading based on a mask containing pseudo-random numbers. The fifteenth embodiment provides a method of controlling the occurrence of beading.

In practice, what is commercialized under the general name of transparent film is diverse in terms of properties. The ink absorbance differs from film to film. Accordingly, the state of beading is diversified. Even in the same transparent film, the state of absorption differs greatly with an ambient temperature and humidity. Depending on the ambient conditions, print masks are created with different pseudo-random numbers and a quantity of discharged ink is varied.

FIG. 50 is a table according to which a quantity of discharged ink is controlled with respect to an ambient humidity which is the most influential factor. FIG. 51 is a table according to which a quantity of discharged ink is selected according to a type of recording medium or according to the fusibility and beading characteristic of the transparent film.

In principle, when the transparent film employed is less absorbent or drying is considered to proceed more slowly under relevant ambient conditions, a smaller quantity of discharged ink is adopted. If ink is hardly absorbed and remains on the transparent film in large quantities, ink droplets discharged during different passes of multi-pass printing cause beading. The resultant beading pattern may be different from the expected one defined with pseudo-random numbers.

A quantity of discharged ink is reduced by controlling ink-jet pulses for multi-pass printing. In principle, a temperature sensor and a humidity sensor are installed in a recording apparatus so that the temperature and humidity can be optimized. Moreover, when a switch formed on a recording apparatus or a printer driver is used to identify a type of transparent film, an optimal selection table listing quantities of discharged ink can be selected in order to provide optimal quantities of control.

In this embodiment, a quantity of discharged ink is selected automatically relative to an ambient temperature or humidity. Alternatively, a control mode may be preprogrammed so that a user can analyze a state of beading and designate a quantity of discharged ink. This embodiment is concerned with the control of a quantity of discharged ink resulting in optimal occurrence of beading.

Sixteenth Embodiment

Figure 52:
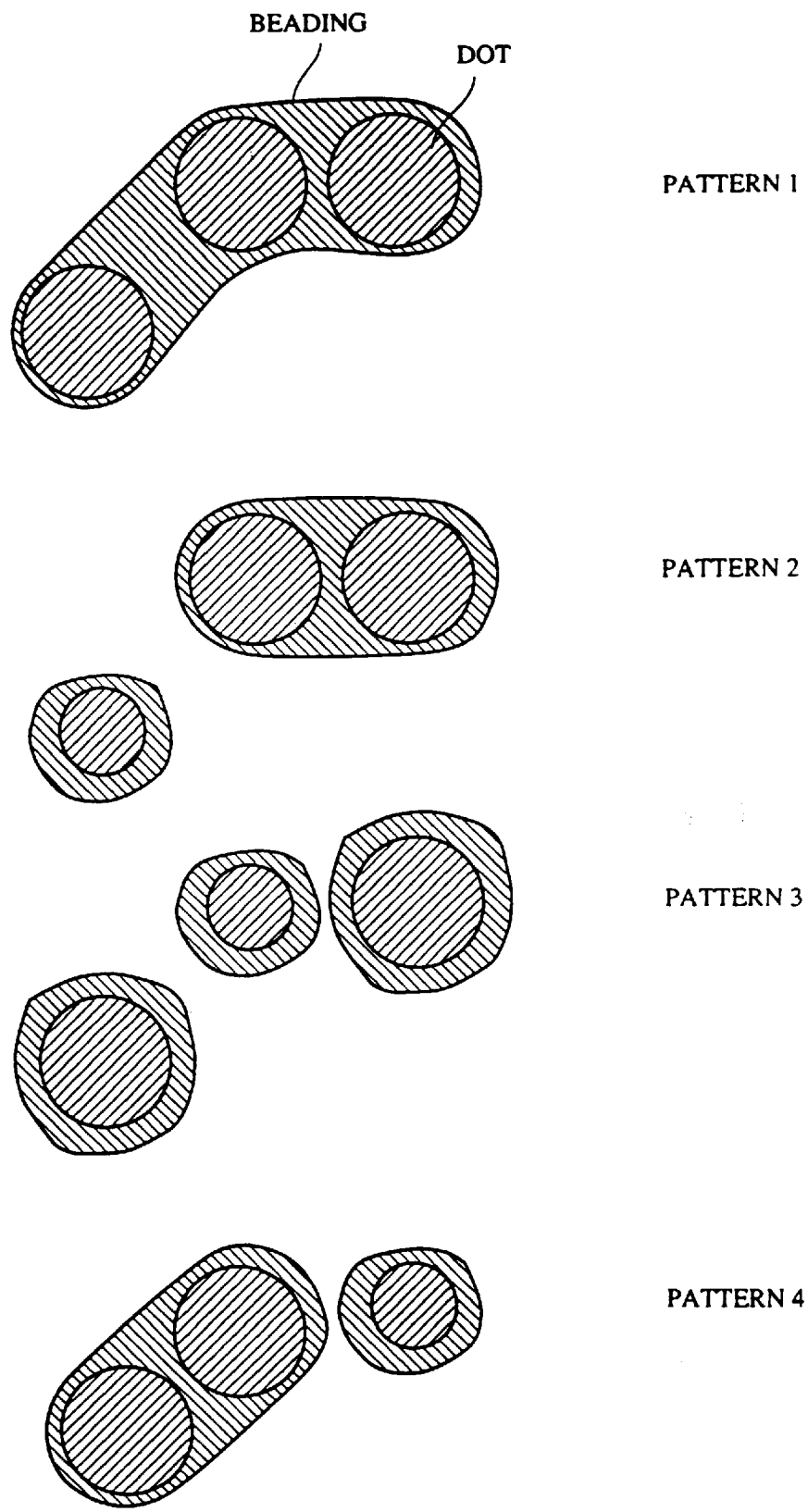
FIG. 52 shows a change of a beading pattern resulting from a dot-by-dot variation of a quantity of ink discharge in the sixteenth embodiment.

The sixteenth embodiment tackles a large difference in absorbance. Specifically, a duration of each print pass is prolonged and dot sizes (diameters) are made even using pseudo-random numbers. Dot sizes themselves are determined with random numbers. Thus, occurrence of beading is further randomized by varying dot sizes. FIG. 52 shows a transition of beading patterns resulting from a variation of a quantity of discharged ink from dot to dot.

When dot sizes are randomized using random numbers, two procedures are conceivable. One of the procedures is such that dot sizes are differentiated by varying them for respective passes of multi-pass printing. In this procedure, a large dot size is specified for the first pass and diminished gradually for the second pass and thereafter. As long as the first pass or a state in which only a small number of dots are printed is concerned, a probability of occurrence of beading due to dots created during different passes is low. A large quantity of discharged ink is therefore permitted. Since the dot sizes specified for the subsequent passes are getting smaller, occurrence of beading is prevented. Herein, the print area concerned is still furnished 100%. Alternatively, dot sizes may be set at random but not set in a regularly diminishing manner from pass to pass.

The second procedure is to randomize quantities of discharged ink for respective nozzles from pass to pass. In this procedure, the randomness of masks and the randomness of dot sizes are multiplied mutually. In order to implement this procedure, the recording head and control circuitry must be designed so that quantities of discharged ink can be changed among ink-jet nozzles. It will be more effective when this procedure is used in combination with a procedure of controlling occurrence of beading due to dots printed during different passes by increasing a wait time between passes.

According to the aforesaid embodiments 14 to 16, when a recording medium used for recording is of a predetermined type, for example, transparent film that is prone to beading, not only a thinning-out recording mode is selected but also masks whose pixel locations are thinned out using pseudo-random numbers that permit higher randomness are employed as thinning-out masks. The thinning-out masks will therefore not be applied cyclically to a plurality of lines. Moreover, when orientations and distributions of beading are randomized, beading becomes inconspicuous. Consequently, high-quality images can be produced.

In the description of the present invention, the term "random numbers" does not have a statistical meaning but has a meaning of pseudo-random numbers. Any numbers that do not have regularity may be employed as long as the advantages of the present invention can be provided fully. Printing or recording according to the present invention is not restricted to production of images or the like but also applies to creation of some patterns.

The present invention is particularly suitably usable in an ink-jet recording head and recording apparatus, wherein thermal energy by an electrothermal transducer, laser beam or the like is used to cause a change of state of the ink to eject or discharge the ink. This is because the high density of the picture elements and the high resolution of the recording are possible.

The typical structure and the operational principle are preferably the ones disclosed in U.S. Pat. Nos. 4,723,129 and 4,740,796. The principle and structure are applicable to a so-called on-demand type recording system and a continuous type recording system. Particularly, however, it is suitable for the on-demand type because the principle is such that at least one driving signal is applied to an electrothermal transducer disposed on a liquid (ink) retaining sheet or liquid passage, the driving signal being enough to provide such a quick temperature rise beyond a departure from nucleation boiling point, by which the thermal energy is provided by the electrothermal transducer to produce film boiling on the heating portion of the recording head, whereby a bubble can be formed in the liquid (ink) corresponding to each of the driving signals. By the production, development and contraction of the bubble, the liquid (ink) is ejected through an ejection outlet to produce at least one droplet. The driving signal is preferably in the form of a pulse, because the development and contraction of the bubble can be effected instantaneously, and therefore, the liquid (ink) is ejected with quick response. The driving signal in the form of the pulse is preferably such as disclosed in U.S. Pat. Nos. 4,463,359 and 4,345,262. In addition, the temperature increasing rate of the heating surface is preferably such as disclosed in U.S. Pat. No. 4,313,124. The structure of the recording head may be as shown in U.S. Pat. Nos. 4,558,333 and 4,459,600, wherein the heating portion is disposed at a bent portion, as well as the structure of the combination of the ejection outlet, liquid passage and the electrothermal transducer as disclosed in the above-mentioned patents. In addition, the present invention is applicable to the structure disclosed in Japanese Laid-Open Patent Application No. 123670/1984 wherein a common slit is used as the ejection outlet for plural electrothermal transducers, and to the structure disclosed in Japanese Laid-Open Patent Application No. 138461/1984 wherein an opening for absorbing pressure waves of the thermal energy is formed corresponding to the ejecting portion. This is because the present invention is effective to perform the recording operation with certainty and at high efficiency irrespective of the type of the recording head.

The present invention is effectively applicable to a so-called full-line type recording head having a length corresponding to the maximum recording width. Such a recording head may comprise a single recording head and plural recording heads combined to cover the maximum width.

In addition, the present invention is applicable to a serial type recording head wherein the recording head is fixed on the main assembly, to a replaceable chip type recording head which is connected electrically with the main apparatus and can be supplied with the ink when it is mounted in the main assembly, or to a cartridge type recording head having an integral ink container.

The provisions of the recovery means and/or the auxiliary means for the preliminary operation are preferable, because they can further stabilize the effects of the present invention. As for such means, there are capping means for the recording head, cleaning means therefor, pressing or suction means, preliminary heating means which may be the electrothermal transducer, an additional heating element or a combination thereof. Also, means for effecting preliminary ejection (not for the recording operation) can stabilize the recording operation.

As regards the variation of the recording head mountable, it may be a single head corresponding to a single color ink, or may be plural heads corresponding to a plurality of ink materials having different recording colors or densities. The present invention is effectively applicable to an apparatus having at least one of a monochromatic mode for recording mainly with black, a multi-color mode for recording with different color ink materials and/or a full-color mode for recording with a mixture of the colors, which may use an integrally formed recording unit or a combination of plural recording heads.

Furthermore, in the forgoing embodiment, the ink has been liquid. It may be, however, a ink material which is solidified below the room temperature but liquefied at the room temperature. Since the ink is controlled to be within the temperature not lower than 30° C. and not higher than 70° C. to stabilize the viscosity of the ink to provide the stabilized ejection in usual recording apparatuses of this type, the ink may be such that it is liquid within the temperature range when the recording signal is applied. However, the present invention is applicable to other types of ink. In one type, a temperature rise due to the thermal energy is positively prevented by consuming the thermal energy for the state change of the ink from the solid state to the liquid state. Another ink material is solidified when it is left unused, to prevent the evaporation of the ink. In either of the cases, upon the application of the recording signal producing thermal energy, the ink is liquefied, and the liquefied ink may be ejected. Another ink material may start to solidify at the time when it reaches the recording material. The present invention is also applicable to such an ink material that is liquefied by the application of the thermal energy. Such an ink material may be retained as a liquid or solid material in through holes or recesses formed in a porous sheet as disclosed in Japanese Laid-Open Patent Application No. 56847/1979 and Japanese Laid-Open Patent Application No. 71260/1985. The sheet is faced to the electrothermal transducers. The most effective system for the ink materials described above is the film boiling system.

The ink jet recording apparatus may be used as an output terminal of an information processing apparatus such as computer or the like, as a copying apparatus combined with an image reader or the like, or as a facsimile machine having information sending and receiving functions.

The individual components shown in outline or designated by blocks in the drawings are all well-known in the image recording arts and their respective construction and operation are not critical to the operation or best mode for carrying out the invention.

While the invention has been described with reference to the structures disclosed herein, it is not confined to the details set forth and this application is intended to cover such modifications or changes as may come within the purposes of the improvements or the scope of the following claims.

What is claimed is:

1. A recording apparatus for recording using a recording head having a plurality of recording elements, said apparatus comprising:

scan controlling means for controlling the recording head to scan the same record area of a recording medium a plurality of times;

creating means for creating masks each having a predetermined size and defining an array of non-record pixel locations and record pixel locations;

expanding means for expanding said masks created by said creating means;

thinning-out means for thinning out record data using said masks expanded by said expanding means, said masks being utilized as thinning-out masks for each record area; and record controlling means for forming thinned-out images by recording the record data thinned out by said thinning-out means, during respective scans, and thus completing an image.

2. A recording apparatus according to claim 1, wherein said creating means creates said masks independently for each recording scan.

3. A recording apparatus according to claim 1, wherein said expanding means determines a quantity of expansion for each recording scan.

4. A recording apparatus according to claim 1, further comprising identifying means for identifying a type of print data, wherein said expanding means determines a quantity of expansion according to the type of print data identified by said identifying means.

5. A recording apparatus according to claim 1, wherein said expanding means determines a quantity of expansion according to a type of recording medium.

6. A recording apparatus according to claim 1, further comprising the recording head, wherein said recording head discharges ink from a plurality of ink-jet nozzles.

7. A recording apparatus according to claim 6, wherein said recording head discharges the ink by way of heat.

8. A recording apparatus according to claim 1, wherein said recording apparatus is incorporated in a copying machine.

9. A recording apparatus according to claim 1, wherein said recording apparatus is incorporated in a facsimile machine.

10. A recording apparatus according to claim 1, wherein said recording apparatus is incorporated in a computer terminal.

11. An ink-jet recording apparatus for recording using a recording head having a plurality of ink-jet nozzles for discharging ink, said recording apparatus being operable in a normal recording mode and a thinning-out recording mode, said apparatus comprising:

scan controlling means for controlling the recording head to scan the same record area of a recording medium once in the normal recording mode, while controlling said recording head to scan the same record area of the recording medium a plurality of times in the thinning-out recording mode;

record controlling means for controlling complete recording of an image by recording record data during one scan in the normal recording mode, and by recording thinned-out images using said created thinning-out masks during respective scans in the thinning-out recording mode; and thinning-out controlling means for selecting the thinning-out recording mode and for setting masks resulting from thinning-out based on pseudo-random numbers in said record controlling means when a recording medium used for recording is of a predetermined type.

12. An ink-jet recording apparatus according to claim 11, further comprising identifying means for identifying a type of recording medium to be recorded.

13. An ink-jet recording apparatus according to claim 11, wherein the predetermined type of recording medium comprises a type prone to beading.

14. An ink-jet recording apparatus according to claim 11, wherein the predetermined type of recording medium comprises media other than coated paper and plain paper.

15. An ink-jet recording apparatus according to claim 11, wherein the predetermined type of recording medium comprises transparent film.

16. An ink-jet recording apparatus according to claim 11, wherein said thinning-out controlling means sets said masks for respective divided areas of the recording head.

17. An ink-jet recording apparatus according to claim 11, wherein said masks comprise a plurality of complementary masks produced from a single mask.

18. An ink-jet recording apparatus according to claim 11, wherein said record controlling means varies a quantity of discharged ink depending on an ambient temperature or humidity.

19. An ink-jet recording apparatus according to claim 11, wherein said record controlling means varies a quantity of discharged ink for each record area.

20. An ink-jet recording apparatus according to claim 11, wherein said record controlling means varies a quantity of discharged ink for each ink-jet nozzle of the recording head.

21. An ink-jet recording apparatus according to claim 11, further comprising said recording head, wherein said recording head discharges ink by way of heat.

22. An ink-jet recording apparatus according to claim 11, wherein said recording apparatus is incorporated in a copying machine.

23. An ink-jet recording apparatus according to claim 11, wherein said recording apparatus is incorporated in a facsimile machine.

24. An ink-jet recording apparatus according to claim 11, wherein said recording apparatus is incorporated in a computer terminal.

25. A recording method for recording using a recording head having a plurality of recording elements, said method comprising the steps of:

creating masks each having a predetermined size and defining an array of non-record pixel locations and record pixel locations;

expanding the created masks;

thinning out record data using the expanded masks, the masks being utilized as thinning-out masks for each record area; and controlling the recording head to scan the same record area of a recording medium a plurality of times, forming thinned-out images by recording thinned-out record data during respective scans, and thus completing an image.

26. A recording method according to claim 25, wherein during image forming, the recording head discharges ink from a plurality of ink-jet nozzles.

27. A recording method according to claim 26, wherein the recording head discharges the ink by way of heat.

28. An ink-jet recording method for recording using a recording head having a plurality of ink-jet nozzles for discharging ink, said recording method being operable in a normal recording mode and a thinning-out recording mode, said method comprising the steps of:

controlling the recording head to scan the same record area of a recording medium once in the normal recording mode, while controlling the recording head to scan the same record area of the recording medium a plurality of times in the thinning-out recording mode; and controlling complete recording of an image by recording record data during one scan in the normal recording mode, and by recording thinned-out images using created thinning-out masks during respective scans in the thinning-out recording mode, wherein when a recording medium used for recording is of a predetermined type, the thinning-out recording mode is selected and masks resulting from thinning-out based on pseudo-random numbers are utilized as the thinning-out masks.

29. An ink-jet recording method according to claim 28, wherein during recording the recording head discharges ink by way of heat.

* * * * *

UNITED STATES PATENT AND TRADEMARK OFFICE
CERTIFICATE OF CORRECTION

PATENT NO. : 6,042,212
DATED : March 28, 2000
INVENTOR(S) : Kiichiro Takahashi et al.

It is certified that error appears in the above-identified patent and that said Letters Patent is hereby corrected as shown below:

Column 3,
Line 53, "a example" should read -- an example --; and
Line 54, "an" should read -- a --.

Column 4,
Line 3, "formity ." should read -- formity. --.

Column 16,
Line 50, "been-inputted" should read -- been inputted --.

Column 21,
Line 61, "locations" should read -- location --.

Column 24,
Line 29, "masks" should read -- masks, --; and
Line 49, "areas" should read -- area --.

Column 25,
Line 43, "of which" should read -- and their --; and
Line 53, "Expansion" should read -- expansion --.

Column 29,
Line 36, "long" should read -- far --.

UNITED STATES PATENT AND TRADEMARK OFFICE
CERTIFICATE OF CORRECTION

PATENT NO. : 6,042,212
DATED : March 28, 2000
INVENTOR(S) : Kiichiro Takahashi et al.

It is certified that error appears in the above-identified patent and that said Letters Patent is hereby corrected as shown below:

Column 31,
Line 11, "if-highly-permeable" should read -- if highly-permeable --.

Column 35,
Line 9, "a" should read -- an --.

Signed and Sealed this

Thirteenth Day of November, 2001

Attest:

*Attesting Officer*

NICHOLAS P. GODICI
*Acting Director of the United States Patent and Trademark Office*